United States Patent
Yang et al.

(10) Patent No.: US 11,638,853 B2
(45) Date of Patent: May 2, 2023

(54) AUGMENTED COGNITION METHODS AND APPARATUS FOR CONTEMPORANEOUS FEEDBACK IN PSYCHOMOTOR LEARNING

(71) Applicant: Shane Yang

(72) Inventors: Shane Yang, San Jose, CA (US); Richard K. Williams, Cupertino, CA (US)

(73) Assignee: Live View Sports, Inc., San Jose, CA (US)

( * ) Notice: Subject to any disclaimer, the term of this patent is extended or adjusted under 35 U.S.C. 154(b) by 111 days.

(21) Appl. No.: 16/743,337

(22) Filed: Jan. 15, 2020

(65) Prior Publication Data

US 2020/0222757 A1    Jul. 16, 2020

Related U.S. Application Data

(60) Provisional application No. 62/792,875, filed on Jan. 15, 2019.

(51) Int. Cl.
*A63B 24/00*    (2006.01)
*G09B 5/06*    (2006.01)
(Continued)

(52) U.S. Cl.
CPC .......... *A63B 24/0006* (2013.01); *G09B 5/065* (2013.01); *G09B 5/12* (2013.01); *G09B 19/0038* (2013.01); *A63B 2024/0015* (2013.01)

(58) Field of Classification Search
CPC .............. G09B 19/003; G09B 19/0038; A63B 24/0006; A63B 24/0015; A63B 2024/0015
See application file for complete search history.

(56) References Cited

U.S. PATENT DOCUMENTS

| 2010/0303303 A1 | 12/2010 | Shen et al. |
| 2011/0276153 A1* | 11/2011 | Seiner ................ A63B 69/3623 700/91 |

(Continued)

FOREIGN PATENT DOCUMENTS

| WO | 2008023250 A1 | 2/2008 |
| WO | 2009061283 A2 | 5/2009 |

OTHER PUBLICATIONS

Hettig J. et al., Assessing surgical augmented reality visualizations in a steerable virtual reality environment, Comput Assist Radiol Surg., Nov. 2018, pp. 1717-1725.

(Continued)

*Primary Examiner* — Peter R Egloff
(74) *Attorney, Agent, or Firm* — Patentability Associates; David E. Steuber

(57) ABSTRACT

A method of creating a scalable dynamic jointed skeleton (DJS) model for enhancing psychomotor leaning using augmented cognition methods realized by an artificial intelligence (AI) engine or image processor. The method involves extracting a DJS model from either live motion images of video files of an athlete, teacher, or expert to create a scalable reference model for using in training, whereby the AI engine extracts physical attributes of the subject including arm length, length, torso length as well as capturing successive movements of a motor skill such as swinging a gold club including position, stance, club position, swing velocity and acceleration, twisting, and more.

21 Claims, 47 Drawing Sheets

(51) Int. Cl.
    *G09B 19/00*    (2006.01)
    *G09B 5/12*    (2006.01)

(56) References Cited

U.S. PATENT DOCUMENTS

| | | | | |
|---|---|---|---|---|
| 2017/0177930 | A1* | 6/2017 | Holohan | H04M 1/72403 |
| 2018/0001177 | A1* | 1/2018 | Nicora | A63F 13/27 |
| 2018/0261010 | A1* | 9/2018 | Kudirka | A63B 37/02 |
| 2019/0019321 | A1* | 1/2019 | Thielen | G06F 3/167 |
| 2020/0005544 | A1* | 1/2020 | Kim | G06T 7/75 |

OTHER PUBLICATIONS

Kai S. Lehmann et al., A Prospective Randomized Study to Test the Transfer of Basic Psychomotor Skills From Virtual Reality in a Comparable Training Setting; Ann Surg. Mar. 2005; pp. 442-449, abstract, fig. 1.

Neverova N., Deep Learning for Human Motion Analysis, Artificial Intelligence, Universite de Lyon, 2016, abstract, p. 15, fig. 5.

* cited by examiner

AUGMENTED COGNITION METHODS AND APPARATUS FOR CONTEMPORANEOUS FEEDBACK IN PSYCHOMOTOR LEARNING

CROSS-REFERENCE TO RELATED APPLICATIONS

This application claims the priority of Provisional Application No. 62/792,875, filed Jan. 15, 2019, which is incorporated herein by reference in its entirety.

BACKGROUND OF INVENTION

Studies show that learning speed, proficiency, retention are enhanced by "active learning", where the student actively participates in the instructive process. This principle is particularly true when acquiring new skills involving a coordination of vision and movement as known as psychomotor learning or kinematics. In athletic training or in developing specialized psychomotor skills like learning neurosurgery, rapid feedback is an important element in the learning process. This principle is depicted in the retention pyramid 1 graphic shown in FIG. 1 illustrating various levels of learning and retention [https://en.wikipedia.org/wiki/learning#/media/file:learning_retention_pyramid.jpg] comprising passive learning involving 'receiving' 2, active learning involving 'participating' 3, and active learning involving 'doing' 4.

In passive learning involving receiving 2 the participant learns through lectures, reading, or audiovisual presentations. Retention varies between 20% and 75% but typically less than 40%. And although studying may assist a student better understand what they are doing, it does little to improve to reveal "how" the task should be performed. Receiving is particularly ineffective in teaching psychomotor skills involving eye-hand coordination since the student has no chance "to try it out" themselves.

Participating 3, a low level of active learning involves a student being tested or encouraged to play and perform exercises after being taught by demonstration or through actively participating in online courses. Retention is better than receiving 2, but rarely exceeds 75%. In psychomotor training for sports or manual tasks, the student is still unable to execute the real motions thereby impairing learning. Throwing a shot put, for example, cannot be learning by online testing. Until a person picks up a shot put it is difficult to image how heavy it is or how to throw it without injuring oneself. Tasks such as learning to fly an airplane using computer-based training may emulate the operation of the cockpit instruments but still lacks the accelerative forces a pilot feels in a real airplane or in a professional flight simulator.

Greater learning retention and faster learning involves the student actively participating in the learning process by doing 4 generally through coaching or a live trainer's instruction followed by timely practicing. In doing based learning, the student alternates between coaching instructors showing 'what to do' followed by the student trying to emulate the action when the coach is present and again when they are on their own. Coaching or personal trainer instruction through doing 4 generally accelerates a student or athlete's rate of progress while improving retention over 75% but suffers from high cost, the inconvenience of scheduling appointments and instructor availability, and by lack of feedback during solitary practice times.

The repeated application of a teacher's demonstration followed by a student's attempt to repeat the same motions, vis-à-vis a "seeing-doing . . . sequence" forms the basis for active psychomotor learning today. Allegedly the repetitive nature training under a coach inculcates behavior via neural programming of a stimulus response (SR) pattern in the brain. Neural programming facilitating psychomotor learning (popularly referred to as "muscle memory") occurs in three stages comprising (i) the cognitive phase, (ii) the associative phase, and (iii) the autonomous phase. In the cognitive phase, educator-coach explains and describes the task likely with demonstrations and the student executes their first attempts.

In the associative phase, the student practices the gesture with diminishing degrees of coaching or teacher intervention. The associative phase, which comprises the longest interval in psychomotor learning, is at risk that the fledgling athlete may practice the action incorrectly, i.e. learning a bad habit that may be difficult to correct unless the problem is detected and corrected quickly. In the autonomous phase, the student has internalized the skill and is able to perform the psychomotor task unconsciously. If, however, the skill was learned incorrectly during the associative phase, it is nearly impossible to undo and correct in the autonomous phase. This fact is purported in the old adage "you can't teach an old dog new tricks".

Once solution to reduce the risk of a student developing bad psychomotor behavior during the associative phase is to increase the frequency of evaluation and active feedback when it's needed most. While such a premise is theoretically sound, pragmatically speaking it is nearly impossible to facilitate. For example, after training camp when a rookie football player has just learned the coach's plays and strategic "system" and is most amenable to put what they have learned to good use, suddenly the preseason games begin and the coaching staff has no time to concentrate on a particular player's needs. In essence the rookie is left to practice on his own when he needs guidance most.

Timing is a key factor in learning and retention. Research in education and training has shown that the learning process involves two opposing mechanisms—a 'learning curve' and a 'forgetting curve'. Forgetting starts the moment that instruction stops. As an example, FIG. 2 reveals an exponential decline 10 in retention starting with 58.2% initial retention 11 and declining to 21.1% retention 12 after 31 days [http://www.elearningcouncil.com/learning-theory/overcoming-ebbinghaus-curve-how-soon-we-forget/]. As a simple exponential decay model first proposed by Ebbinghaus, the model characterizes forgetting using a single time constant $\tau$ indicating decay to a retention level 13 representing a magnitude $1/e$ or roughly 37% of the original retention 11. In the example shown, this time constant $\tau$ is approximately 7 hours, a value that varies with the strength of the initial learning and retention.

Retention can be improved by repetition as illustrated in FIG. 3 where initial forgetting curve 16 decaying from 100% of the initial retention 15 to a value 17 before a 'refresher' recovers the memory 18 [https://twitter.com/davidwees/status/984131508058243072], followed by a new forgetting curve 19, repeated thereafter by forgetting curve 20. The longer the duration between "practice sessions", the farther down the forgetting curve the student's retention slides, erasing the benefits of previously and laboriously climbing the learning curve. If the training sessions occur infrequently because of instructor availability, the results of active learning education are not significantly better than passive learning.

FIG. 4 illustrates various types of learning retention curves and their associated forgetting curves [https:// www.researchgate.net/publication/288000042_the_need_for_a_standardized_and_common_way_of process_training], including learning by classroom training 33 and coaching 30. In the example shown, classroom learning 33 achieved a higher degree of learning shown by retention 34 but experienced a faster decline shown by forgetting curve 32 than learning through coaching 30 resulting in a peak retention 31 and a slower forgetting curve 35. One common solution used by coaches to supplement their personal instruction with audio-video images and e-training as part of the learning process. As shown peak retention 31 may decay to 36 then be boosted to retention 37. The overall learning may decline to retention 38 but remains far above the coaching-only forgetting curve 35.

The simplest form of electronic training is performed by having a student watch videos to supplement their personalized training. While this method may be useful for learning topical and conceptual subject matter such as TED talks, the method is less beneficial in psychomotor learning. Although watching videos of Tom Brady throwing a pass, Tiger Woods teeing off, or Venus Williams serving a tennis ball might be insightful to study a pro's form or technique, a student cannot properly practice their movements while watching the video because they cannot see themselves. In such cases, the trainee must alternate watching the video demonstration then try practicing what they learned. Without the ability to make contemporaneous comparisons, however, there is a greater risk the student or trainee may learn the psychomotor skill incorrectly.

Through the use of videos, a side-by-side image comparison of a professional athlete's movements and a trainee's live image can be concurrently superimposed using two video images, ostensibly, facilitating the means for contemporaneous visualization by superimposing the student's motion image on top of or beside the pro athlete while repeatedly looping the motion. Video image overlays for A-B comparisons can be displayed using commonly available display mediums shown in FIG. 5 such as flat panel TVs and monitors 40, virtual reality (VR) goggles 41, or glasses with projection or mirrors as a heads-up display 42. While the idea sounds appealing, these video-based image overlays don't work well in psychomotor training for innumerable reasons, one of the most significant being the fact that the heights of two people are unlikely to match, making it difficult to overlay the images in a meaningful or useful way. The height mismatch problem is illustrated in FIG. 6 where golfer 50 with a height of 170 cm is displayed alongside a second golfer 60 having a height of 201 cm. As shown, the height difference of two golfers makes instructive comparison difficult as every key body feature differs in its length, including spine lengths 51 versus 61 and waist height 57 versus 67.

Moreover, different height athletes require different sized equipment. In order for shorter golfer 50 to maintain the same desired angle θ between golf club 52 and ground 59 as tall golfer 60 achieves with golf club 62, i.e. to match angles 56 and 66, the length 55 of club 52 must be shorter than the length 65 of club 62. Other differences between club 62 and 52 likely include the length of the grip, the shape of the head, and the club's construction. As such, the two images cannot be simply superimposed but must be scaled in dimension.

Simple linear scaling to match a reference video to a live camera view can also be problematic. In FIG. 7 for example, video 70 of a pro golfer 71 taking from a distance, possibly in a golf tournament, must be scaled to a larger dimension to facilitate an A-B comparison to a live golfer. If however the image resolution of the original video is insufficient, a common case for older videos, scaling the image of pro golfer 71 to a larger size 72 invariably will cause image 'pixilation', resulting in a blurry image useless for study. Aside from resolution issues, the angle of the original reference video source may be a problem. As depicted in FIG. 8, the line of sight 77 of video camera 76 is only able to capture an image of the backside of golfer 75. In such cases, a trainee is unable to see what golfer 75 is doing prior to his swing, rendering an A-B video comparison useless.

Even in cases where a reference video of a pro golfer employs a relevant camera angle and is sufficient in resolution to scale without pixilation, video image overlays can be problematic. Golf swing training [http://oukas.info/?u=ben+hogans+golf+swing+secret] relying on A-B image comparisons can be aggravated by dissimilar body proportions even for golfers of comparable heights. For example, FIG. 9 illustrates images of two golfers of similar heights, golfer trainee 80 and golfer reference 85, but with different body proportions. For example trainee 88 has a slightly longer torso 81, shorter leg length 83, and a lower waist 82 while reference 85 has a shorter torso 86, a longer leg length 87, and a higher waist 88. Because of the differing proportions, a meaningful visual overlay for active learning is difficult to achieve even if the height of reference 85 is linearly scaled to perfectly match trainee 80. Linear scaling means every dimension is scaled in the same ratio from its original. A 10% linear shrink, for example means the image height is scaled to 90% of its original, as are the length of the torso, arms, legs, etc.

Linear image scaling, however, assume the length of a human's body and appendages are proportionate to their height. FIG. 10 however illustrates this simplifying assumption is not correct. A sample of body silhouettes ranked monotonically from silhouette 90a to 90f in order of diminishing height reveals a diverse range of height present across the human species, exemplified by lines 91a, 91e and 91f. For example, height 91e corresponding to the top of the head of silhouette 90e intersects the neck portions of silhouettes 90a and 90b while intersecting the cranial portions of silhouettes 90c and 90d. Height 91f corresponding to the top of the head of shortest silhouette 90f barely covers the shoulders of silhouettes 90d and only reaches the torso of silhouettes 90b, 90c, and 90d. As such there is no easy way to compare the motion of a golfer having the body build of silhouette 90a to that of silhouette 90f. Moreover, the length of a person's thorax (trunk), arms, and legs do not necessarily scale proportionately with their height.

One important attribute in golfing is rotation of the spine during a golf swing. While the upper twelve vertebrae of the spine known as the thoracic spine can twist as much as 40°, the spine's lower portion, the lumbar attached to the top of the pelvis and sacrum corresponding to the bottom S1 to S5 vertebrae of the spine can only rotate around 12° without the risk of over-extension [https://experiencelife.com/article/expert-answers-on-spine-rotation/]. Since this inflexible portion of the spine limits the spine's ability to twist, the height of the lumbar above the ground is an important factor in determining and limiting an individual's golf swing. This consideration means it is ill advised to train a short golfer using a tall golfer as a reference. As an indirect measure of a person's leg and hip length, the height of the lumbar does not necessarily vary in proportion to an athlete's height. For example, lumbar height 92b of silhouette 90b is quite similar to silhouettes 90a despite their corresponding differences in height. Similarly the lumbar height 92e of silhouette 90e is similar to silhouettes 90c and 90d despite their height differences. The lumbar height 92f of silhouette 90f is shorter than the leg length of most of the other silhouettes shown.

Another consideration is the distance between a golfers hands and the ground. This height affects their swing and also influences their selecting a suitable golf club. For example height 94a of hands 93a corresponds to the hips of silhouette 90a, height 94e of hands 93e are above the hips of silhouette 90e, while height 94f of hands 93f are below the hips of silhouette 90f. Accordingly there can be no pre-defined assumption about the length of a persons arms, legs, thorax, or height, meaning linear image scaling cannot be used to achieve contemporaneous visualization superimposing a live image atop of a reference image.

The complex motions required by athletes in a tennis serve, pitching a baseball, or hitting a golf ball further exacerbates the problem of scaling video image overlays. The golf drive shown in images 98a through 98f of FIG. 11 illustrates the complex motion involved comprising aligning the club 98a; beginning a backswing 98b; fully extending the club behind the head 98c; beginning the downswing 98d; approaching contact at the bottom of the downswing 98e; striking the ball 98f; and comfortably completing the swing carried by the clubs momentum 98g. Aside from the aforementioned scaling issues, this complex motion is extremely difficult to mimic, especially synchronized to a video loop.

FIG. 12 depicts the motion of the described golf swing of golfer 100 graphically in sequence [http://lh3.ggpht.com/_hk_qorjidk/sv7u21yrkyi/aaaaaaaaahu/bfll7hxsmd0/s1600-h/image %5b7%5d.png] by tracking the rotational speeds of the gofer's pelvis 101a, thorax 102a, arm 103a, and club 104a (shown in °/s) with corresponding curves 101b, 102b, 103b, and 104b. In the graph, a backswing motion is represented as a negative number and a positive number represents the downswing. A zero rotational speed shown by time 105 corresponds to maximum height extension of the backswing just prior to commencing the downswing, a position shown by position 98c in FIG. 11. The analysis shows acceleration in the backswing followed by a brief moment to change direction at time 105 and then a rapid forward acceleration.

The challenge of a golfer trying to match a pro golfer's swing in a reference video in complex, especially when the video endlessly loops. This issue is illustrated by the graphic of FIG. 13 comparing an early swing and late swing to the reference swing the trainee wishes to emulate. In the early swing the trainee starts the swing before the video golfer commences, reaching the fully extent of the backstroke shown at time 106a well before the reference video golfer reaches the same point in the swing at time 105. Unless the trainee interrupts his swing at time 106a, an action potentially causing injury, then the trainee's downswing will commence ahead of reference downswing 104b completing well ahead of the video and rendering the comparison useless. In the case of a late swing example shown, the trainee performs their backswing relatively synchronize to the reference swing but then takes longer to commence the downswing at time 107a and not reaching peak positive acceleration 107b until well after reference swing 107b. Since the swing ends late, chances are the golfer will miss the next practice swing in the video loop too because the video will be starting the next loop while the trainee is still completing the last swing. In short there is no way to naturally synchronize the trainee to the static video loop.

Another set of problems in visual overlays for psychomotor training occurs in the means by which to overlay the video content and the real image. As shown in FIG. 14, raw video images of the trainee 110a and of the reference video 110b are displayed side-by-side on the screen or in the VR goggle. Since the color, size, location of trees, angle of the golfer's stance in the reference video all differ from the live video stream, there is really no way for the trainee to naturally perceive the images or compare the actions. In essence, the method is like watching two different but similar movies at the same time. The only result of this A-B video image overlay visualization method will be the golfer getting a headache. The problem with such an approach is that both images show information the golfer doesn't care about (like trees) but clutters the images obscuring clear visuals ad important information the trainee wants to see, i.e. comparative body movements.

Using optical processing to highlight the golfers relative to their backgrounds doesn't really help either. For example, in an attempt to improve image contrast, processed image 111a comprises the content of raw image 110a after performing a mathematical operation for edge detection. Although the process does recognize portions of the golfer, parts of the neck 113a merge into the image of the golf course trees, indicator lines used to show club angles such as line 112a are also lost in the background image, and portions of the leg 114a are lost altogether (a dashed line was added to clarify the portion lacking any edge detection). The same problems occur for the edge detection image 111b processed from the raw reference video 110b, except that the video may be even worse. As in the love video portions of the golfer's back 113b and indicator lines 112b merge into the background landscape, portions of the leg 114a are missing, and even part of the golf club 112c disappears.

Using a ghost video image overlay, i.e. a transparent copy of the two golfers 121a and 121b superimposed on a merged image background as shown in image 120 of FIG. 15 only makes matters worse in that (i) it becomes more difficult to see the golfers, and (ii) the backgrounds merge together further reducing image contrast. Applying edge detection to create processed image 122 fails altogether, unable to identify portions of a golfer's back 123a, head 124b, legs 125a, arms 126b, and even the clubs 127a, and 127b. As such edge detection is useless in processing ghost video image overlays.

In summary A-B image overlays are not useful for psychomotor learning for a variety of uncorrectable conditions including the following:

The student's body size does not match the size of the expert, e.g. one is taller, bigger, etc.;

Available videos of the expert may be limited to poor resolution and taken at great distances, i.e. comprising a small image size that can't be scaled to a larger size;

Available videos of the expert may be taken at an angle incapable of producing a face forward motion images usable for training;

The expert's physical features are disproportionate compared to the student so that even if the height is scaled, the legs, arms, or torso doesn't match the student, i.e. images don't scale proportionally;

Visual overlays using videos lack the ability to synchronize the motion images of the expert and student, uncomfortably forcing the student to mimic the video in speed and repetition rate;

Videos lack metrics of the expert's motion and of the student attempts, and offer no means to quantitatively compare the two.

The impact of these aforementioned limitations is that video based visual overlays have limited utility in psychomotor learning. The use of heads-up displays and augmented reality glasses adapted from video games (i.e. augmented reality) do not correct the fact that the source material, i.e. videos of professionals and experts, is unsuitable in both form and function for psychomotor learning.

Other attempts to gather information about a student's psychomotor training progress have involved the use of sensors embedded in a body suit or vest. The sensors may be used for force (acceleration) measurements of for simple motion tracking. Motion tracking, an innovation adapted from filmmaking has been used extensively to more-realistically animate the movement of non-human characters such as Gollum in Lord of the Rings. While motion tracking suits are amendable to film making within the controlled environment of a closed movie set, adapting such methods to outdoor sports and competitive athletics remains problematic for many reasons including cost, complexity, durability (breakage), and inconvenience. Moreover, body suits limit the range of motion of an athlete affecting a golfer's swing, a pitcher's throw, and running back's mobility, etc. Despite the hype, wearable electronics have not been commercially successful. Not only are wearable electronics difficult to clean and maintain hygienically, the field failure rate of the devices is orders of magnitude higher than rigid enclosure electronics.

Another method to obtain active feedback data for psychomotor training involves installing sensors into sports apparatus, for example adding a radio transmitter and sensor into golf balls, baseballs, footballs, soccer balls; to place them on golf clubs, baseball bats, cricket rackets, hockey sticks; or into ice skates, skis, sails, etc. This strategy also raises many issues. For example, adding a sensor into a ball can change the trajectory of the ball. Training using sensor balls while playing games with non-sensor balls may aversely impact an athlete's performance in real competition. It is also unclear if any sports teams will embrace the idea of allowing the use of sensors in balls or clubs. Even if the teams like the idea, it remains unclear if the use of sensors violates league regulations. The use of active sensors in school and professional sports competition also opens the possibility of data hacking. In such scenarios, hacked sensor data could be used to challenge an official's ruling, cast doubt on the winner of a game, or lead to litigation. Hacked sensor data could also be used to influence gambling in legal and illicit sport books.

In summary, there is no technology available today well suited for improving psychomotor training and learning. What is needed is a convenient yet effective means to provide active feedback to students or athletes striving to learn new skills or autonomously improve their performance using psychomotor learning without the need for a personal coach, trainer, instructor, or by requiring the use of any complex, expensive, or invasive apparatus or sensors.

SUMMARY OF THE INVENTION

In summary, a novel method of creating a scalable dynamic jointed skeleton (DJS) model for enhancing psychomotor leaning using augmented cognition methods realized by an artificial intelligence (AI) engine or image processor is described. The method involves extracting a DJS model from either live motion images or video files of an athlete, teacher, or expert to create a scalable reference model for using in training, whereby the AI engine extracts physical attributes of the subject including arm length and, torso length as well as capturing successive movements of a motor skill such as swinging a gold club including position, stance, club position, swing velocity and acceleration, twisting, and more. During practice, a live image of a student or athlete in training is captured by a video camera or smartphone and processed by an artificial intelligence (AI) engine and analyzed to extract model parameters required to scale the DJS model to match the size and shape, i.e. the physical attributes of the live athlete's image.

The DSJ model is then scaled in size and played dynamically like a movie frame by frame overlaid upon the real-time video image of the live athlete. The composite image of the DJS model playback and the live camera image of the athlete are overlaid and displayed on a heads-up display, standing screen, augmented reality glasses or other visual device, connected via wired or wireless link, allowing the student to observe their motions in comparison to that of the reference model's actions, accelerating learning by providing real-time visual feedback, especially during practice comprising repeated attempts. For enhanced real time performance the live image of the athlete transmitted for display may comprise a low resolution image or even a glow or silhouette while the DJS model's skeleton my comprise a white or contracting color image. Unfiltered high-resolution camera data may be retained and uploaded to a database later for more detailed analysis.

In repeated loop training, the DJS model can be looped repeatedly with each playback cycle as triggered by the athlete commencing action, e.g. starting their backswing. In another embodiment used for synchronization to discontinuous actions, the DSJ model playback can be triggered by more than one event, e.g. commencing a first playback sequence corresponding to the beginning of a golfer's backswing, stopping playback at the top of the swing for an indeterminate period, then triggering a second DJS playback sequence of the drive commencing at the beginning of the downswing.

Using methods of enhanced cognition, i.e. where the AI engine learns about the student while the student is learning from the psychomotor training system, the AI engine can initially adapt to more closely match the student's movements then gradually change to the reference DJS model's swing playback to more accurately reflect the expert's stroke. In addition to dynamic adjustment of the swing, the DJS model can also be rotated in a range of 360° to closely match the camera angle of the live image source. In another embodiment, the live image may comprise video images from multiple cameras. Other information may also be collected from sources other than a video camera, including a ball launch monitor using LIDAR or ultrasound, or from sensors detecting ball position, club velocity, and tilt (torque). This information can be used to improve the instructive value of the DJS model playback and to compensate for systematic errors such as hitting the ball off angle, e.g. slicing the ball.

In another embodiment swing dynamics and/or ball trajectory can be used to assess an athlete's performance, project where a ball will land in a course, or be scored against an expert or against other golfers in a game or tournament. The performance criteria may also be used for gamification or gambling applications or for earning credits or tokens redeemable at participating golf courses or player leagues.

The same method of augmented cognition for psychomotor learning can be applied to other sports such as tennis or baseball, or used in training students in technical motor skills such as surgery, chiropractic methods, product assembly, or even engine repair.

GLOSSARY

Figure 1:
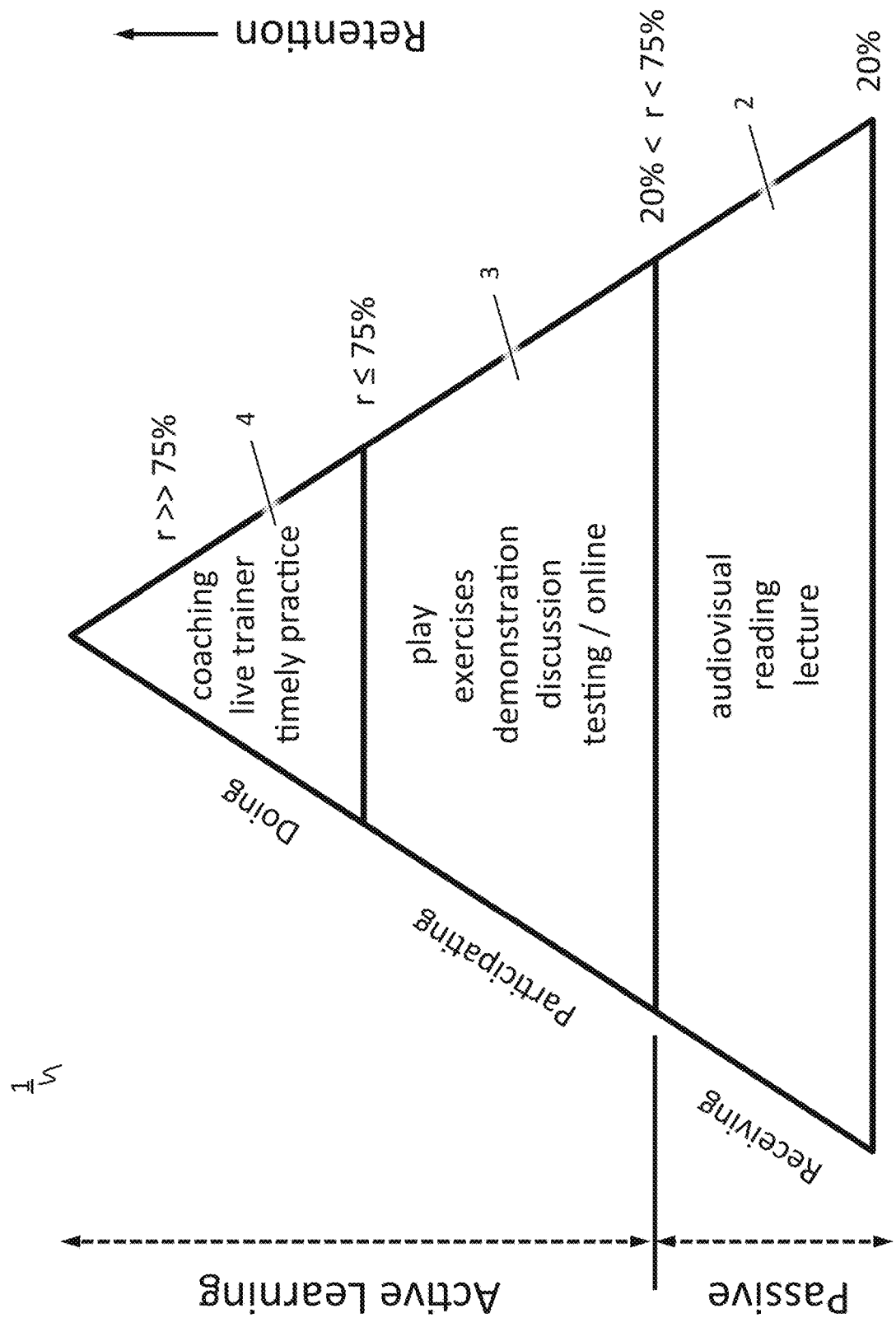
FIG. 1: Diagram of learning retention pyramid.
Figure 2:
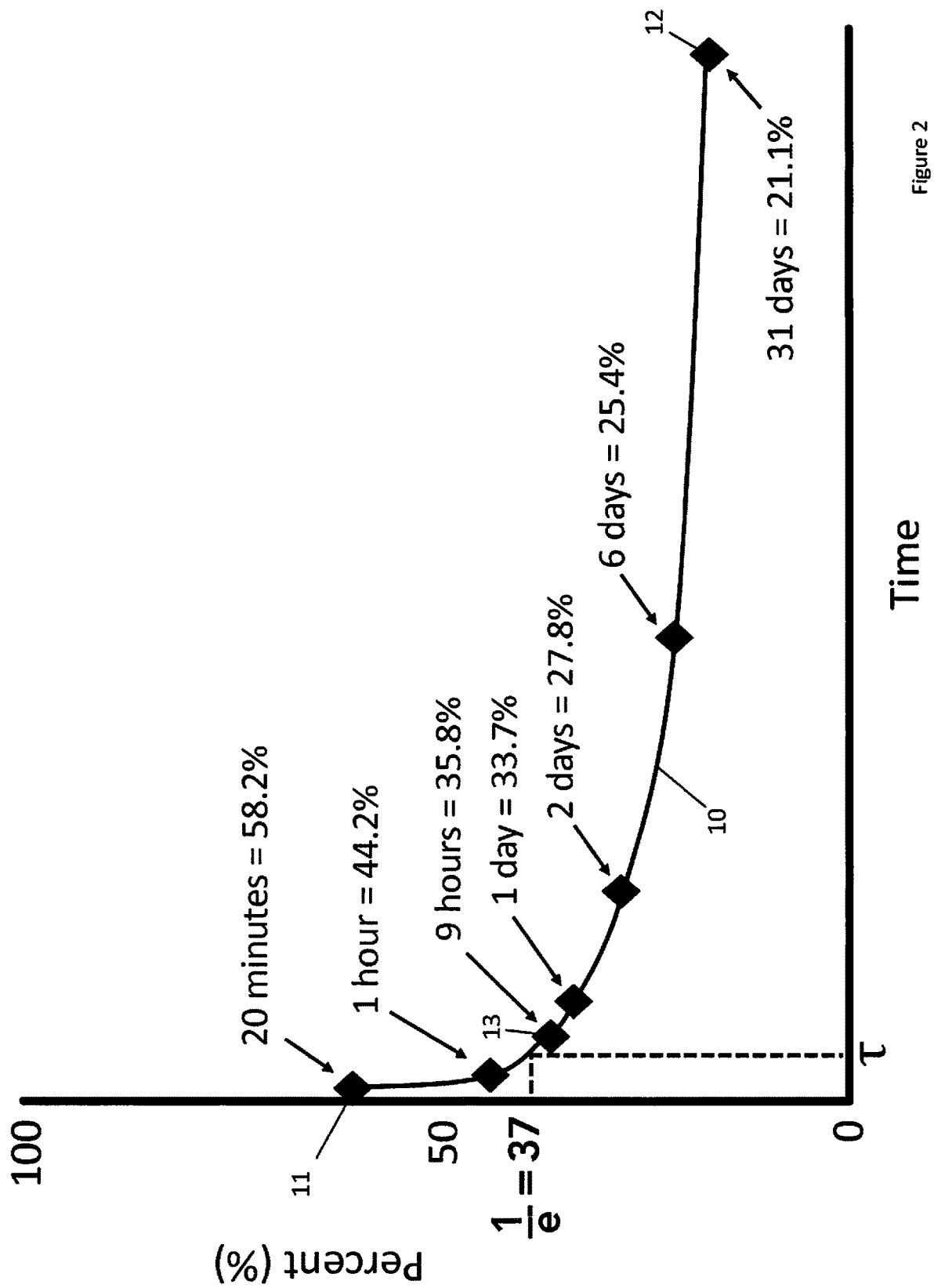
FIG. 2: Graph of Ebbinghaus forgetting curve.
Figure 3:
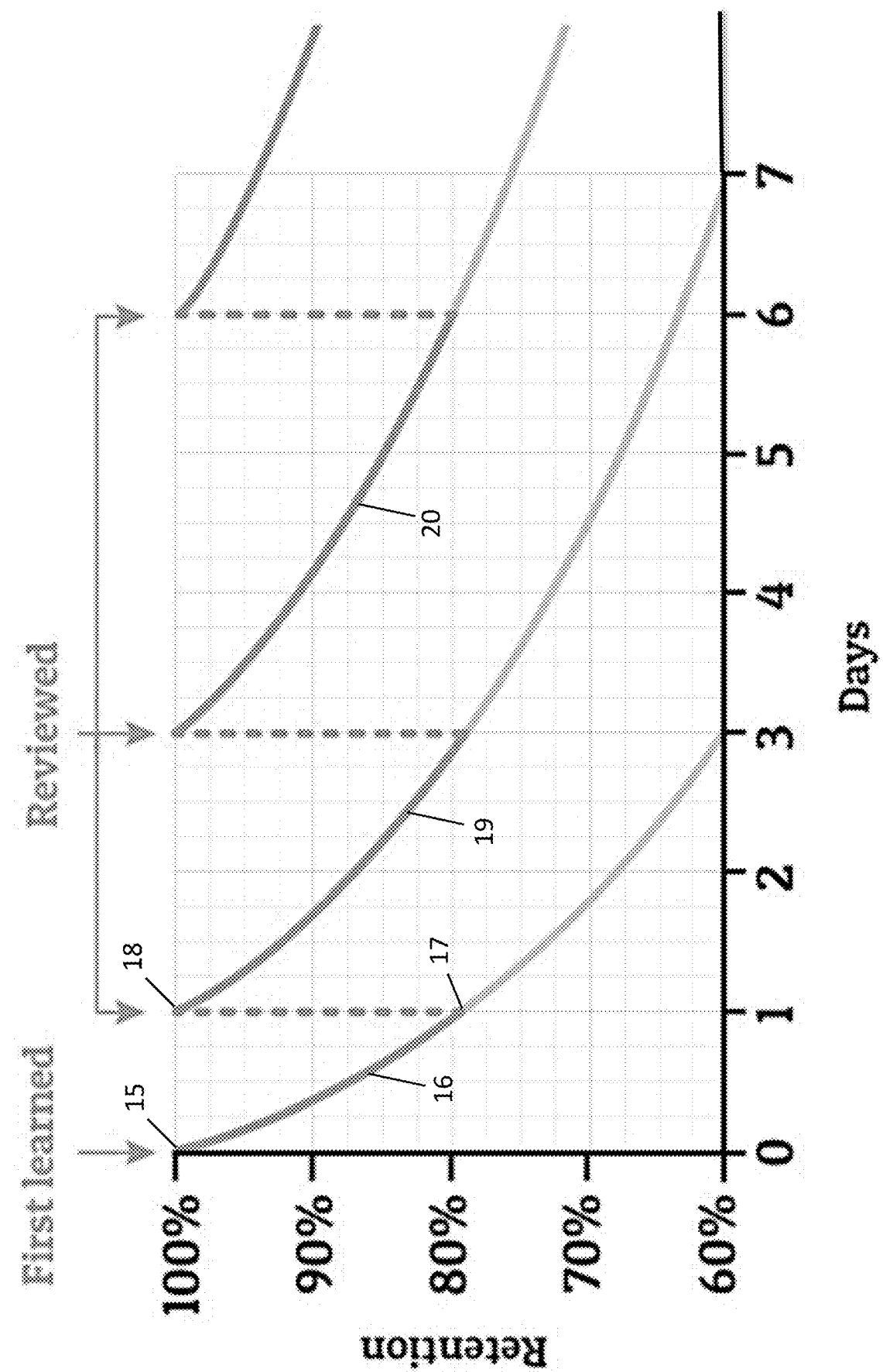
FIG. 3: Graph of Ebbinghaus forgetting curve with repeated reviews.
Figure 4:
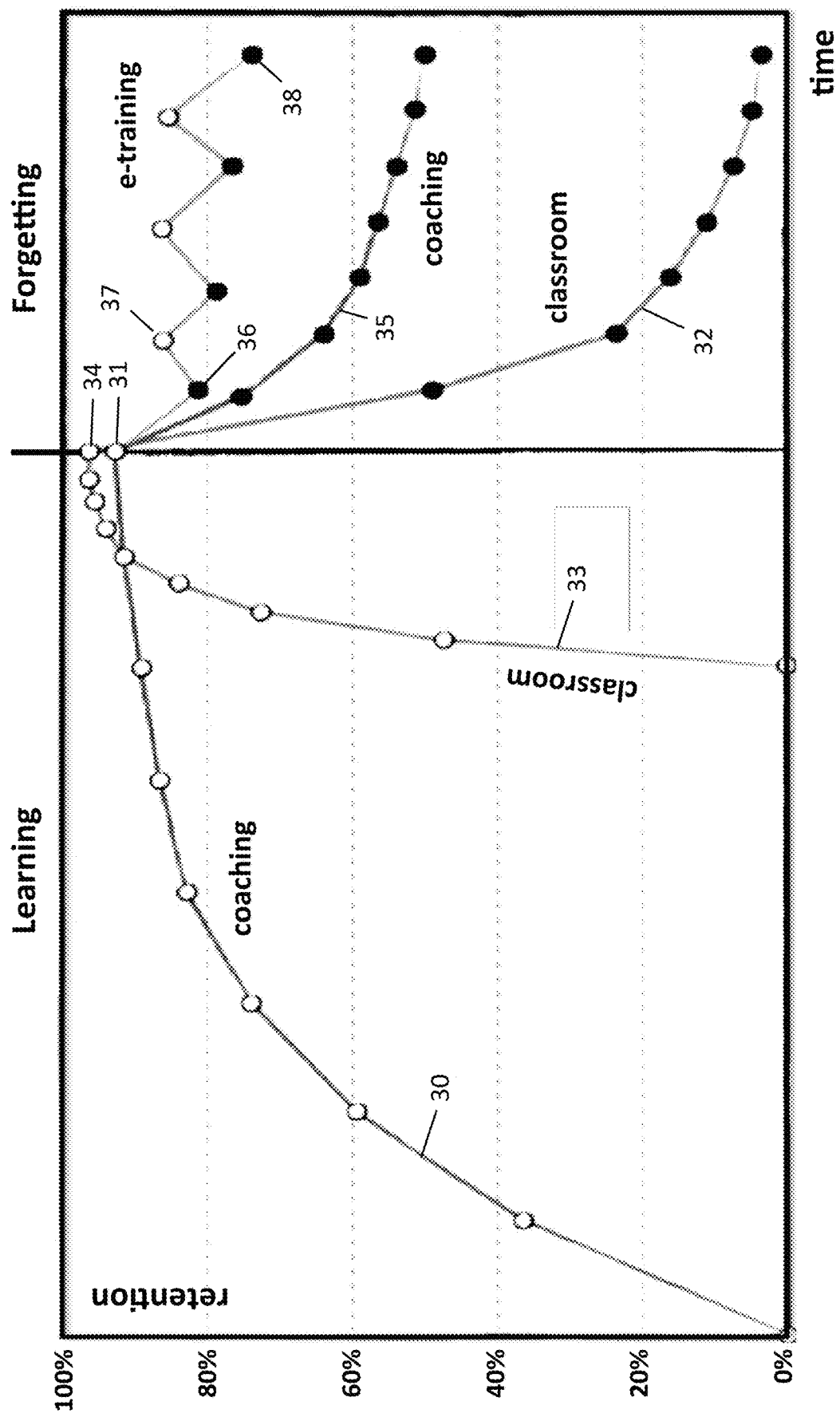
FIG. 4: Graph of various learning and forgetting curves.
Figure 5:
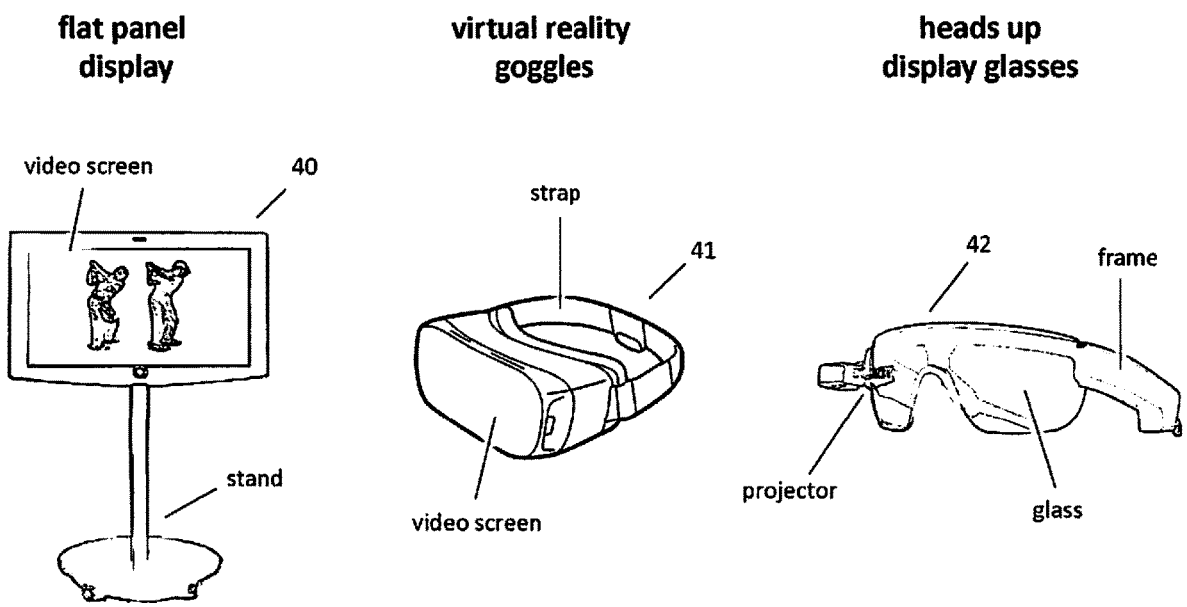
FIG. 5: Examples of visual display devices.
Figure 6:
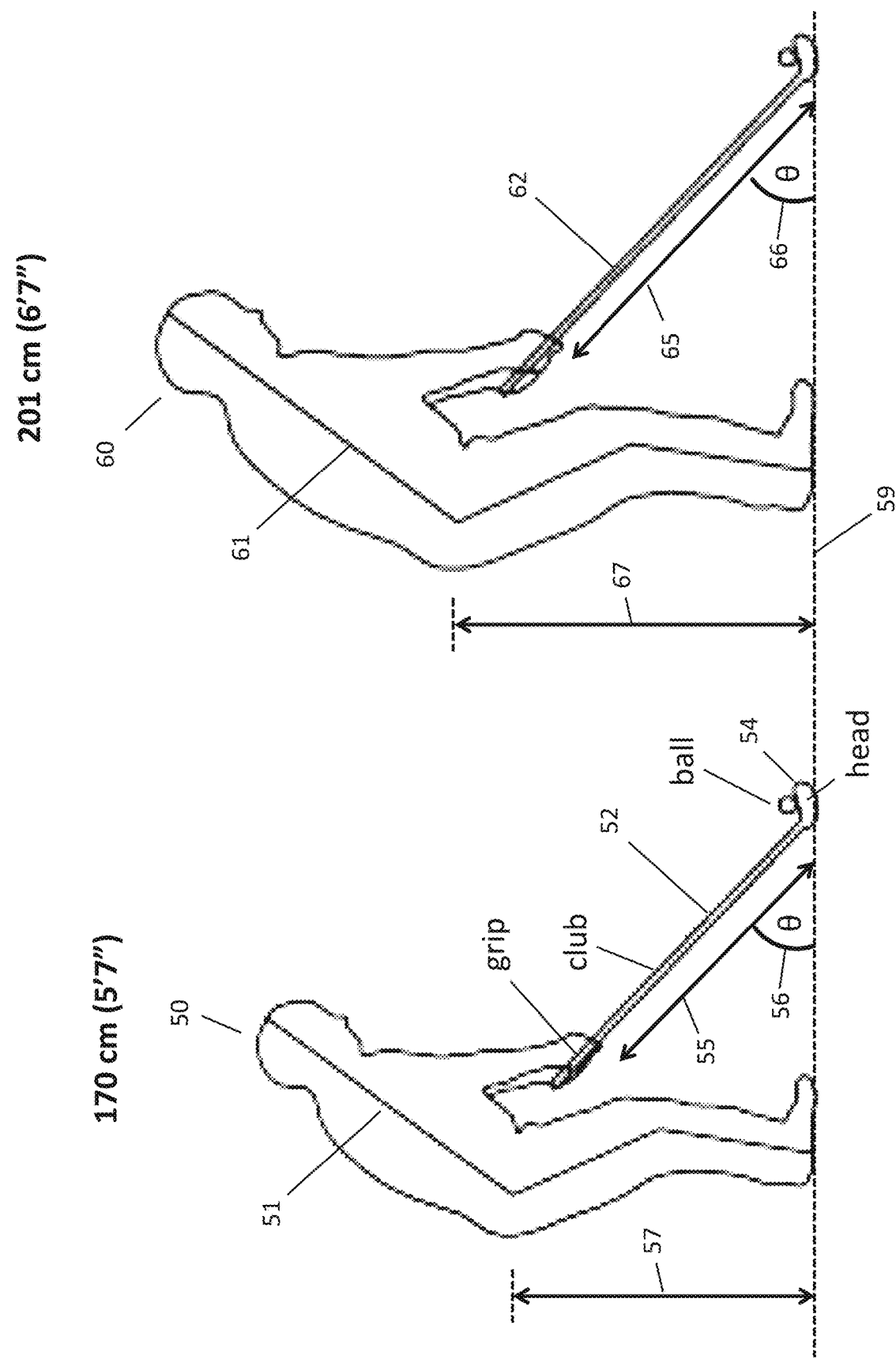
FIG. 6: Comparison of different height golfers.
Figure 7:
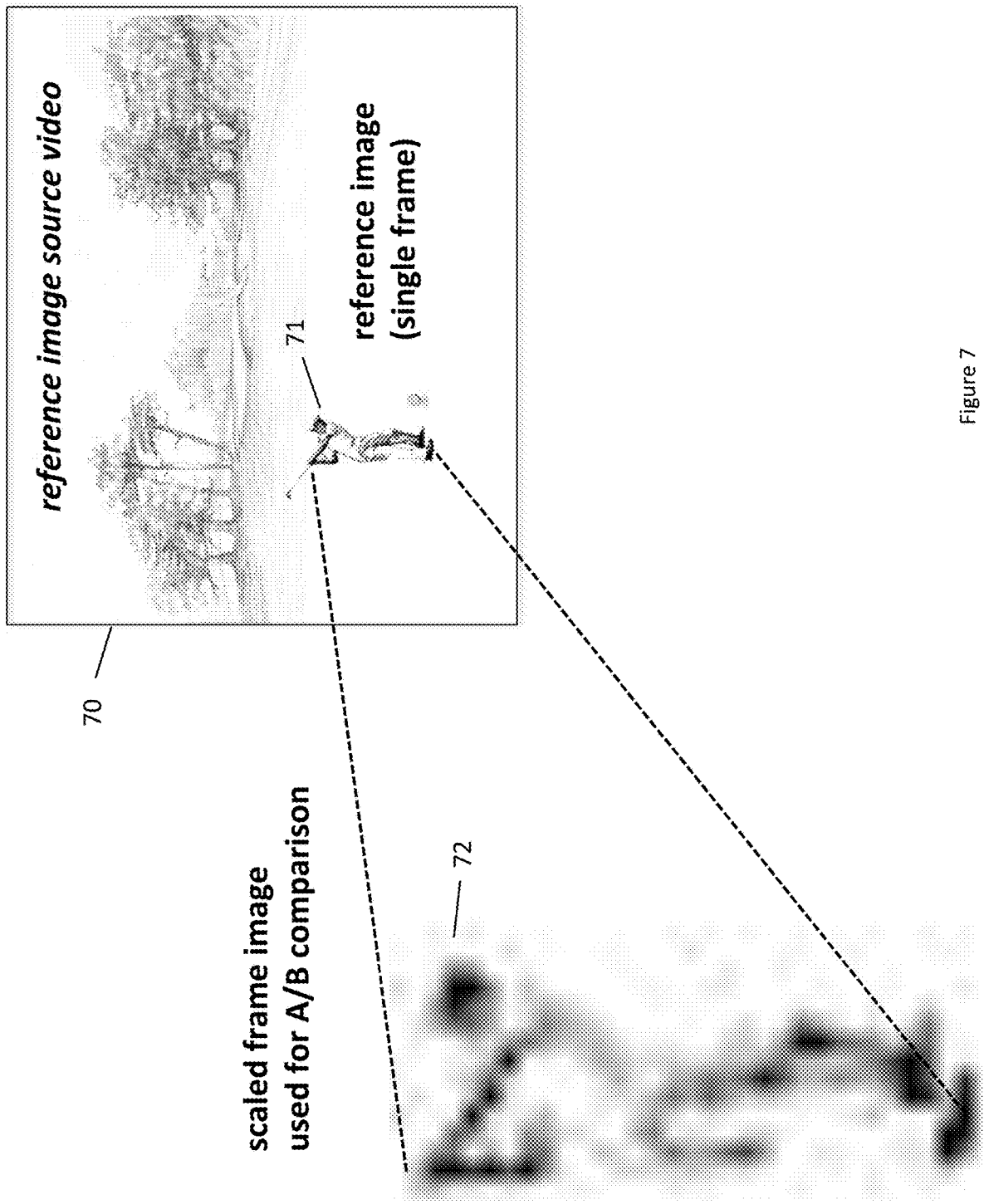
FIG. 7: Pixilation resulting from image scaling.
Figure 8:
FIG. 8: Poor angle reference image capture.
Figure 8:
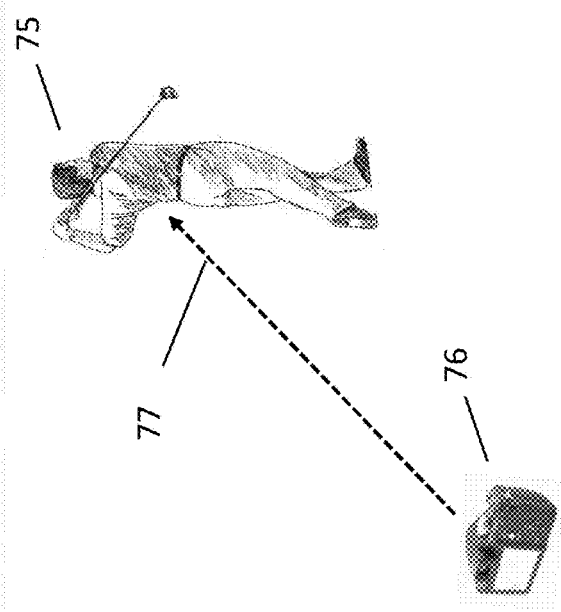
Figure 9:
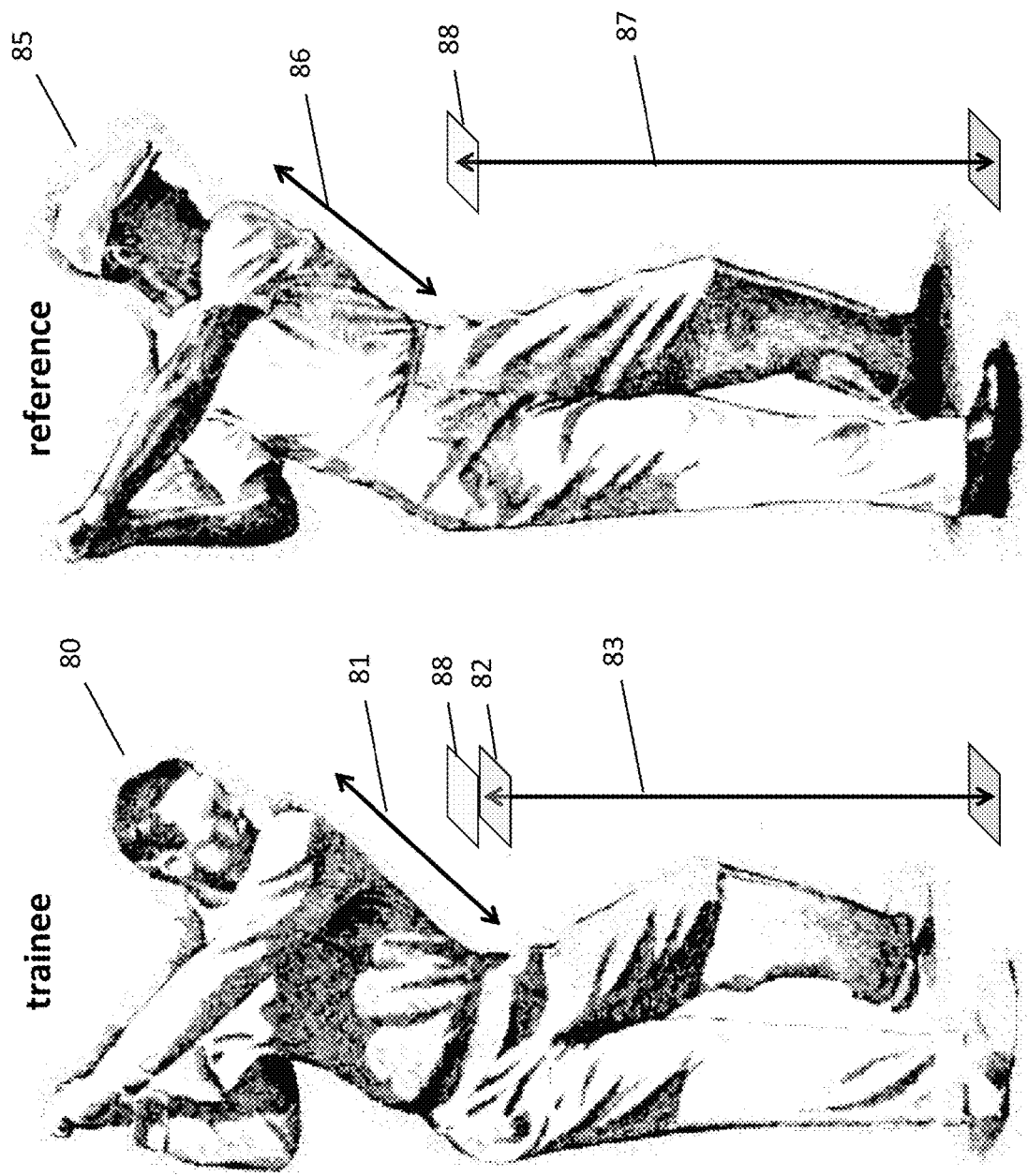
FIG. 9: Comparison of two similar sized golfers.
Figure 10:
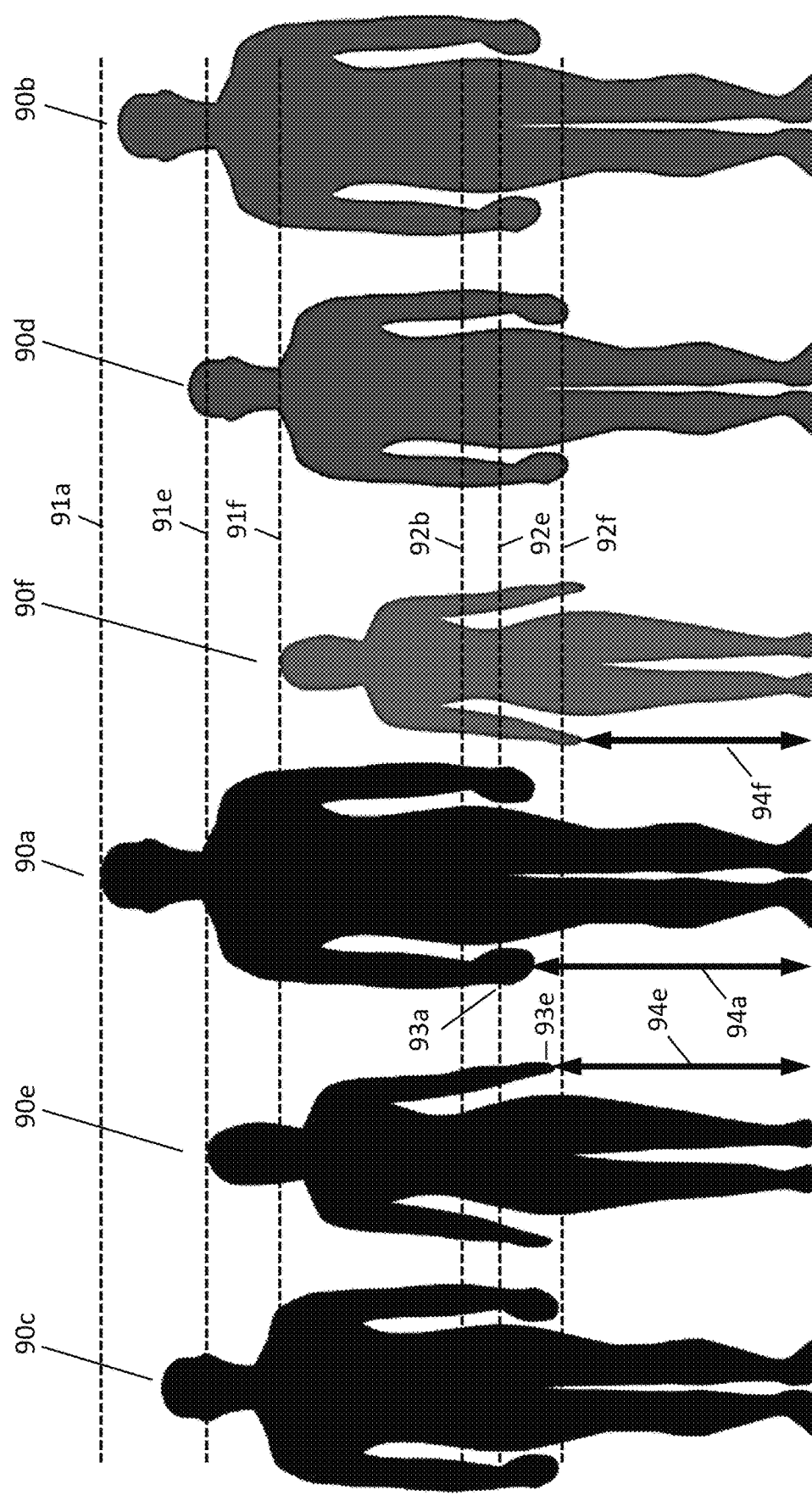
FIG. 10: Comparison of various body types in height and proportion.
Figure 11:
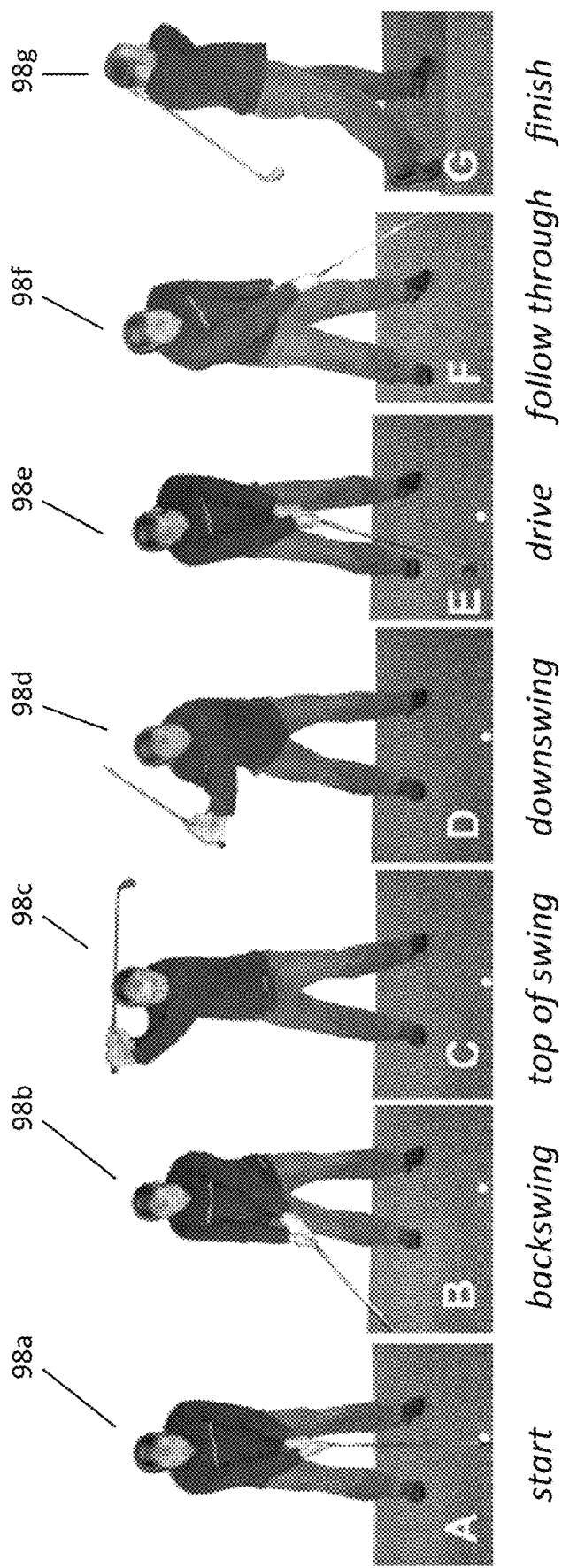
FIG. 11: Illustration of a stepwise golf swing.
Figure 12:
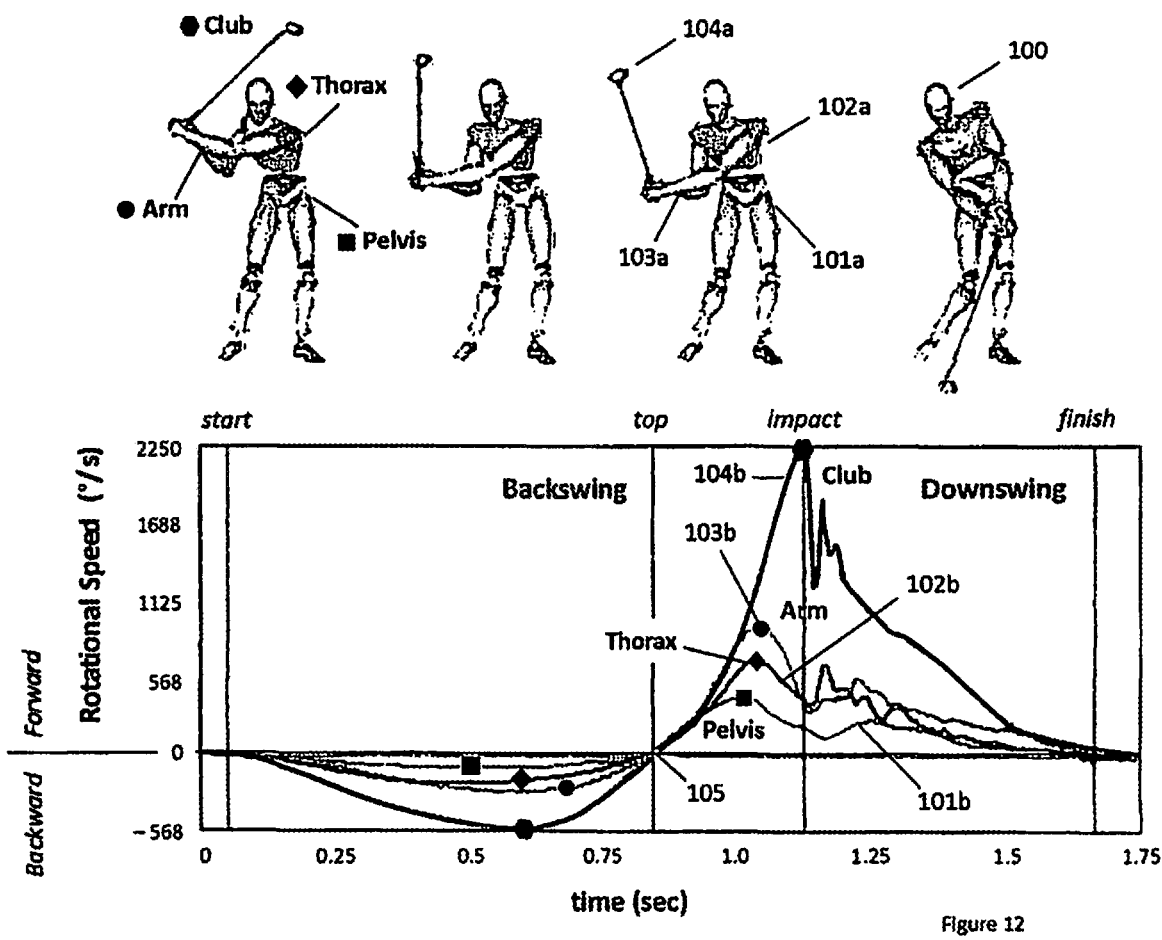
FIG. 12: Graph of rotational speed of a golf swing.
Figure 13:
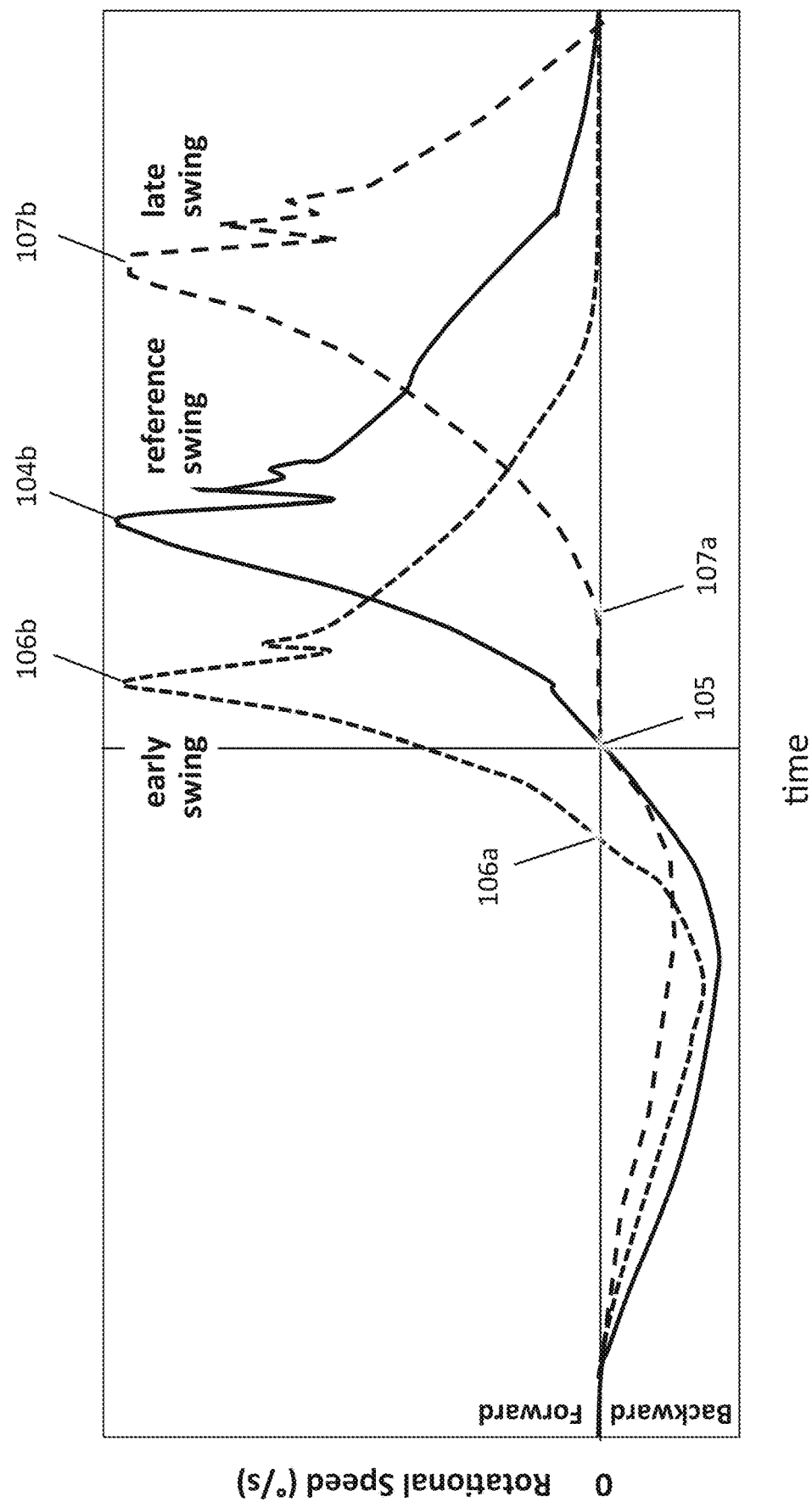
FIG. 13: Graph of rotational speeds of various golf swings.
Figure 14:
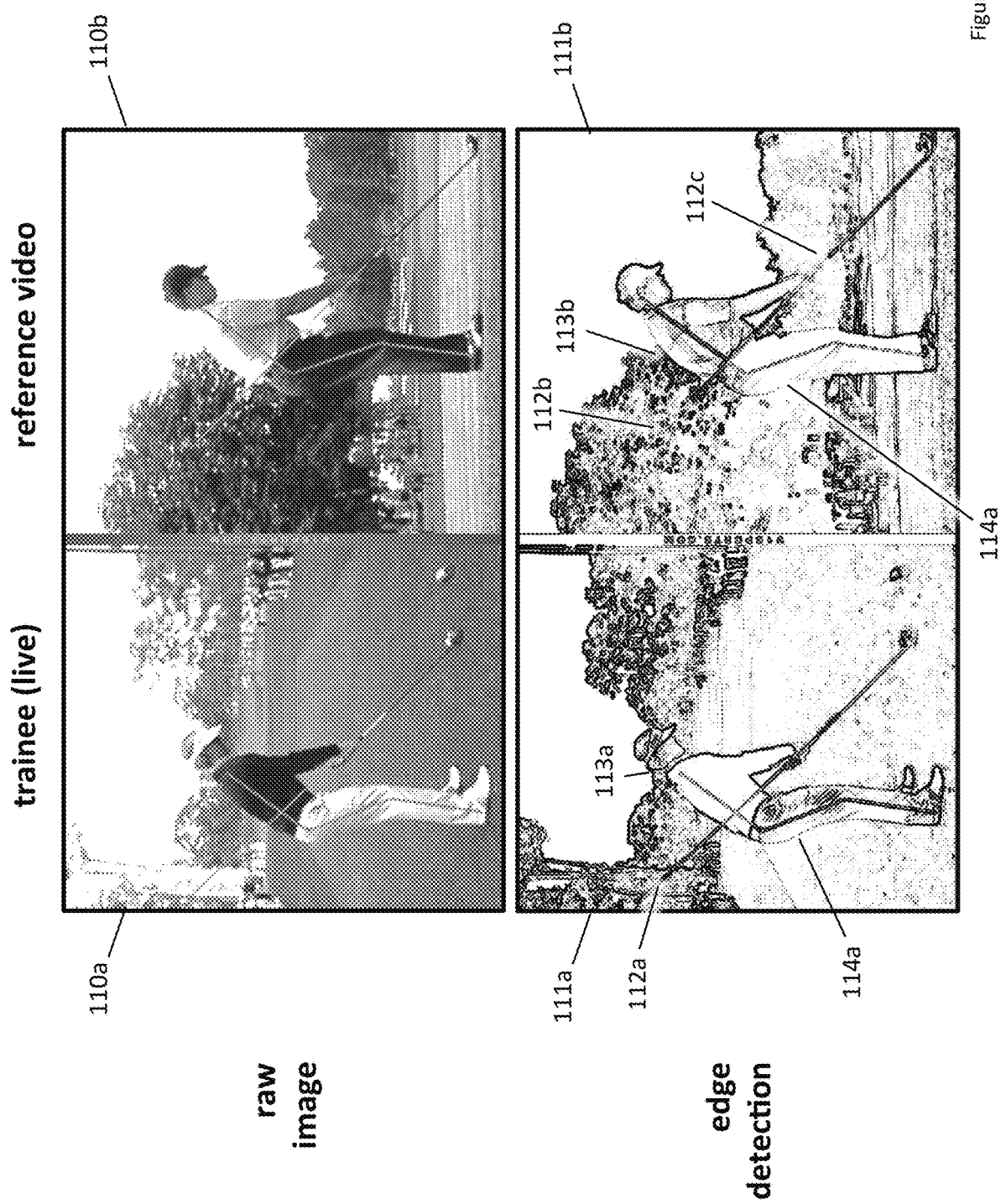
FIG. 14: A-B side-by-side video image overlays comprising raw images and edge detection.
Figure 15:
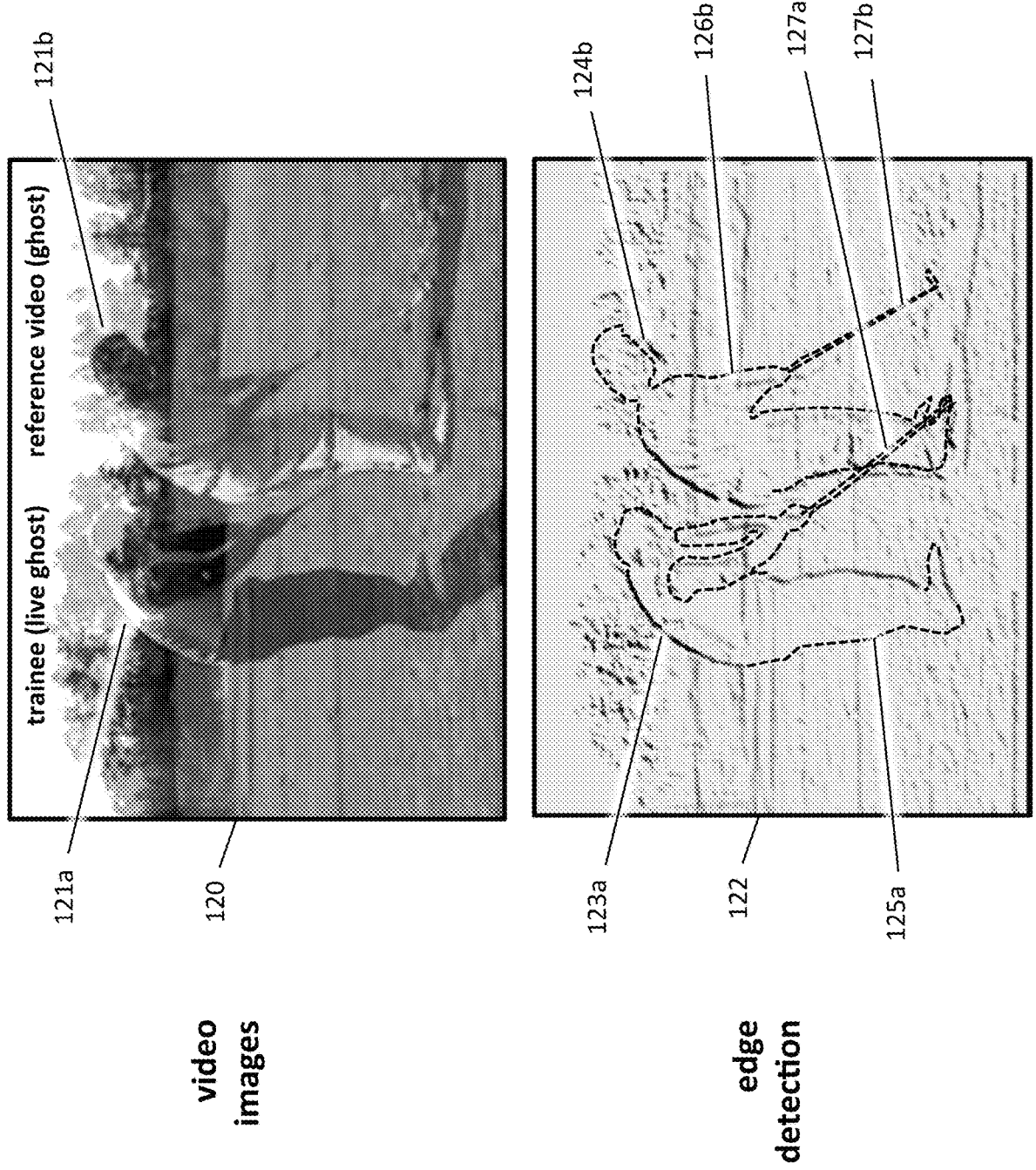
FIG. 15: A-B ghost image video overlay comprising raw images and edge detection.

AR Glasses: Wearable Augmented Reality (AR) devices that are worn like regular glasses and merge virtual information with physical information in a user's view field. AR Glasses, also known as smart glasses, are usually worn like traditional glasses or are mounted on regular glasses.

Artificial Intelligence (AI): A branch of computer science dealing with the simulation of intelligent behavior in computers, or alternatively the capability of a machine to imitate intelligent human behavior. The Turing Test is one measurement of the successful realization of AI.

Augmented Cognition: A form of human-systems interaction in which a tight coupling between user and computer is achieved via physiological and neurophysiological sensing of a user's cognitive state or through audio-visual sensing and feedback.

Augmented Reality (AR): A technology that superimposes a computer-generated image on a user's view of the real world, thus providing a composite view.

Cognition: The mental action or process of acquiring knowledge and understanding through thought, experience, and the senses. Cognition may be achieved biologically in the brain or may be emulated through Artificial Intelligence.

Contemporaneous Feedback: Information feedback comprising electrical, visual, auditory, or other sensory mechanisms occurring in real time, i.e. with minimum delay, from the action or event being monitored or measured.

Heads-up display (HUD): A transparent or miniaturized display technology that does not require users to shift their gaze from where they are naturally looking. A HUD should not obstruct the user's view. Some, but not all, AR Glasses may be considered as HUDs.

Image Capture: The process of obtaining a digital image from a vision sensor, such as a camera, or a camera phone. Usually this entails a hardware interface known as a frame grabber capturing a succession of video frames, converting the image's analog values (gray scale) to digital, and transfers the files into computer memory or transmitted across a communication network. The conversion process is often accompanied with image compression.

Image Overlay: A type of process or technology combining multiple images into a common graphical representation displayed on a video screen, or via VR headset or AR glasses. A dynamic image overlay performs image overlay on a frame-by-frame basis for rapid or real time playback.

Kinesthesia: In biology, a sense mediated by receptors located in muscles, tendons, and joints and stimulated by bodily movements and tensions, or in robotics the application of sensory data to control the movement of mechanical appendages or prosthesis. Also known as kinesthesis or kinesthetic control. Kinesthesia based learning is also referred to as Psychomotor Learning.

Latency: In computer and communication networks, the amount of time delay before a transfer of data begins following an instruction for its transfer. In discontinuous or sporadic processes, Latency may be considered as start-up delay.

Learning: The acquisition of knowledge or skills through experience, study, teaching, training, and practice.

Machine Learning: The application of artificial intelligence (AI) that provides systems the ability to automatically learn and improve from experience without being explicitly programmed.

Model Parameters: Variables used to match a mathematical model to measured data and to predict behavior, stimulus-response patterns, and Kinesthesia.

Muscle Memory: The learning and repeated reinforcement of psychomotor skills where an athlete or student is able to consistently repeat a movement or skill without being consciously aware of their learned actions. The repetitious practice and psychomotor learning, gymnasts, drummers, golfers, and baseball pitchers and batters exhibit muscle memory.

Propagation Delay: In computer and communication networks, the amount of time it takes for a signal to travel from its source or sender to a receiver or recipient. It can be computed as the ratio between the link length and the propagation speed over the specific medium. Propagation Delay may be considered as transport time for a data packet across a communication link or through a network and does not generally include Latency.

Psychomotor Control: The closed loop control of muscles and movement where afferent nerves detect skeletomuscular movement, position, or force, and via nerve transduction through the peripheral nervous System (PNS) and central nervous system (CNS) informing the brain of muscle action, and where the brain cognitively responds to the stimulus by sending instructions to corresponding efferent nerves on the same muscle tissue to adjust movement.

Psychomotor Learning: The process of learning involved in developing motor skills such as movement, coordination, manipulation, dexterity, grace, strength, and speed used in athletic activity, or needed in the operation of tools or instruments.

Turing Test: A method of inquiry in artificial intelligence (AI) for determining whether or not a computer is capable of thinking like a human being. Turing proposed that a computer is said to possess Artificial Intelligence if it can mimic human responses under specific conditions.

Virtual Reality (VR): The computer-generated simulation of a three-dimensional image or environment that can be interacted with in a seemingly real or physical way by a person using special electronic equipment, such as a helmet with a screen inside or gloves fitted with sensors. Also referred to as "artificial reality".

VR Headset: A head-worn apparatus that completely covers the eyes for an immersive 3D experience. VR headsets are also referred virtual reality glasses or goggles.

DESCRIPTION OF THE INVENTION

Given the innumerable problems in producing video image overlays that match the size and proportions of a student or trainee to a reference or expert's movement or timing, the application of video images, scaled or unscaled, is not applicable or useful for psychomotor learning. Moreover, such video content lacks the contrast or camera angle for a trainee to clearly observe the movements of the instructor, reference, or coach's actions. Recorded videos, in fact, contains superfluous images such as trees, landscapes, crowds, weather and other artifacts that only obscure the important content and impede the use of image enhancement technology.

Figure 16:
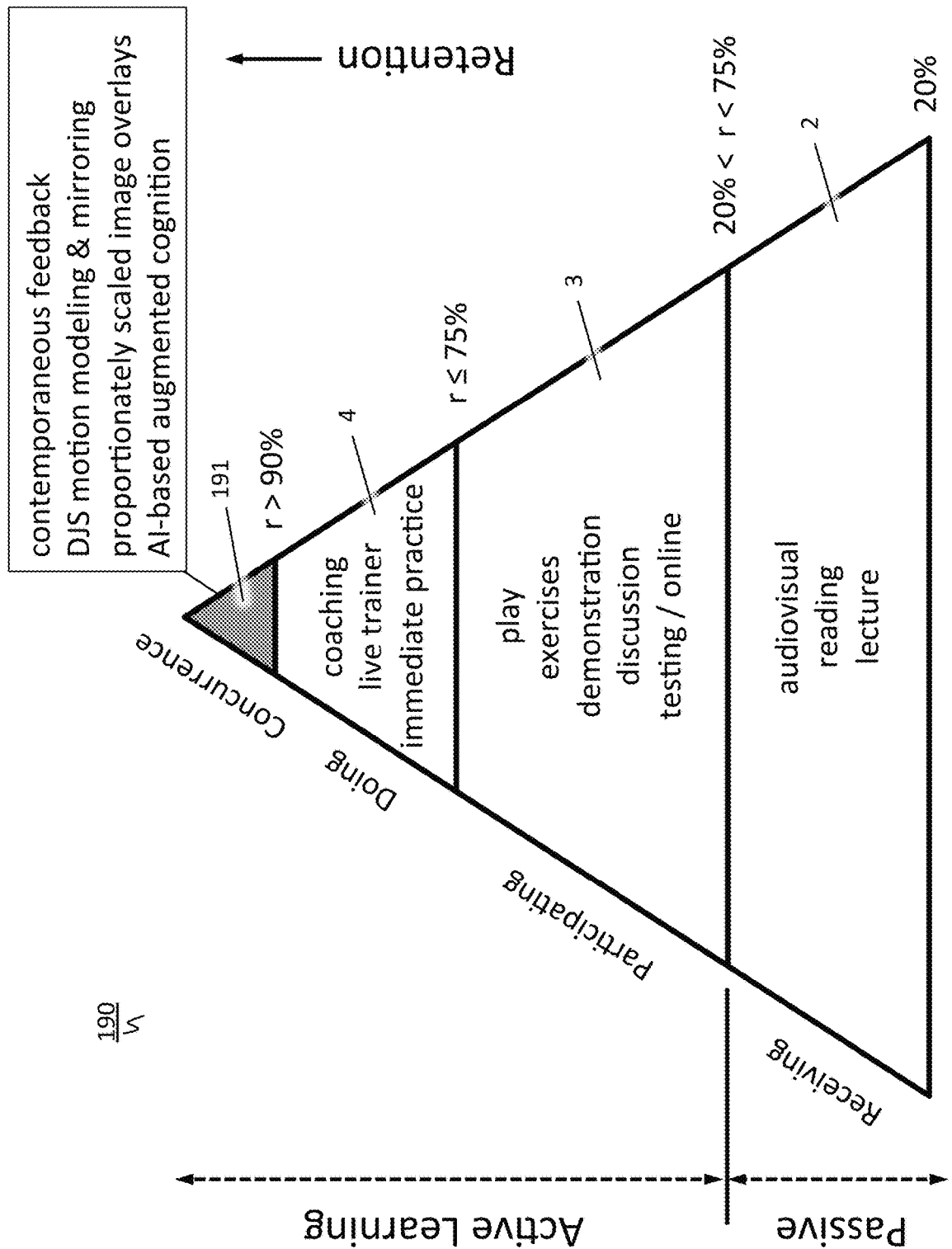
FIG. 16: Diagram of modified learning retention pyramid including augmented cognition.

As described herein we propose an inventive method and apparatus to achieve contemporaneous feedback for psychomotor learning through the application of dynamic jointed skeleton (DJS) motion modeling and mirroring enhanced by AI-hosted augmented cognition technology, methods used to adapt the training procedures to the user's learning. Referring to FIG. 16, as shown by the modified retention pyramid 190, the enablement of concurrent psychomotor learning accelerates the acquisition of new skills while improving learning retention. Enabled by artificial intelligence and machine learning to improve training process efficiencies, contemporaneous feedback for psychomotor learning offers the potential of improving retention beyond 85% to 90%, as illustrates by the topmost pyramid piece 191. In this sense, as the student learns from the system, the system adapts, learning the student's behaviors and adapting its training process thereto. For example, if a golfer spends a longer duration at the top of their swing, i.e. with the club above their head, than other golfers, the system will realize their behavior and not commence the downswing demonstration so quickly. In this manner the golfer doesn't feel rushed or uncomfortable with the instructive training images needed for psychomotor learning.

The method of contemporaneous feedback for psychomotor learning through augmented cognition involves two fundamental steps. In the first step, referred to herein as "image capture and model extraction" reference content, generally a video of an expert or coach, is converted into a behavioral model and stored in a model library for later or possibly contemporaneous use. During this process, a reference video of an expert or coach is converted by an artificial intelligence (AI) engine into a dynamic jointed skeleton (DSJ) model—a physical and behavioral model capable of producing a sequence of images that describe the essential elements of the instructor's actions and motions. In the absence of sufficient information, the AI engine extracts a model to the best of its ability given the quality of its input, generally video content. With access to a library of prior model extractions, the AI engine adapts its model extraction algorithms using machine learning (ML) to improve the efficiency and accuracy of the model over time.

The addition of physics-based models and equipment specification libraries further improves the intelligence of the AI used in the extraction process. The resulting model represents a kinesthetic description of an expert or instructor's actions scalable to match the size and proportions of a student. In one such model, described here as a "dynamic jointed skeleton" or DSJ, the model parameters are converted to graph elements of varying length edges and vertices that define the allowed motions of one edge to another. The model parameters comprise numeric variables used to match the Dynamic Joint Skeleton's mathematical model to measured data. Once calibrated to maximize model accuracy, the DJS model can be used to visually depict complex movement, to predict kinesthetic behavior, and stimulus-response patterns. While the disclosure relies on the use of a DSJ model, the disclosed method may be adapted to other forms of dynamic motion models, for example holographic 3D models, as they become available.

In the second step, referred to here as "image DJS overlay and augmented cognition" a live or processed image of an athlete is displayed in a visualization device superimposed with an interactive image of the dynamic joint skeleton or other applicable image renderings (such as a hologram), whereby the trainee can mimic the actions of the reference model, the dynamic model scaled to the exact proportions of the trainee's body. The dynamic model includes event triggers and employs synchronization methods, adapting the model's movement to synchronize to the trainee's actions, incrementally adjusting the model to the expert's actions until the trainee and the model are both executing the same actions in accordance with the trainer or expert's actions used to create the reference model. Since the image DJS overlay is dynamic, i.e. involving movement of both the reference DJS model and the trainee, the AI visualization system adapts its instruction methods to better instruct the trainee in a step-by-step process.

Machine learning of an AI system based on the bidirectional data flow of an AI-based instructor teaching a student and the student's actions affecting the way the AI instructor provides instruction is referred to herein as "augmented cognition." Moreover, since the image DJS overlay occurs in real time, i.e. comprising "contemporaneous feedback" to the trainee, the learning curve is accelerated and the subsequent forgetting curve depth and duration is minimized even in the extended absence of a live coach. Using the disclosed methods adapting augmented cognition to contemporaneous feedback through visual based image DJS overlays, psychomotor learning is thereby accelerated. Other forms of feedback to the trainee may also be employed including tactile, haptic, audible or other methods.

In its advanced form, evolution of the AI engine may ultimately lead to the synthesis of an AI reference model that outperforms experts in the field used to educate the ML system during AI pattern imprinting. Later, these same behavioral models may be used to direct the actions of robots, for example, leading to a robotic golfer or tennis player with expert skills.

Image Capture Sequence and Model Extraction—

Figure 17:
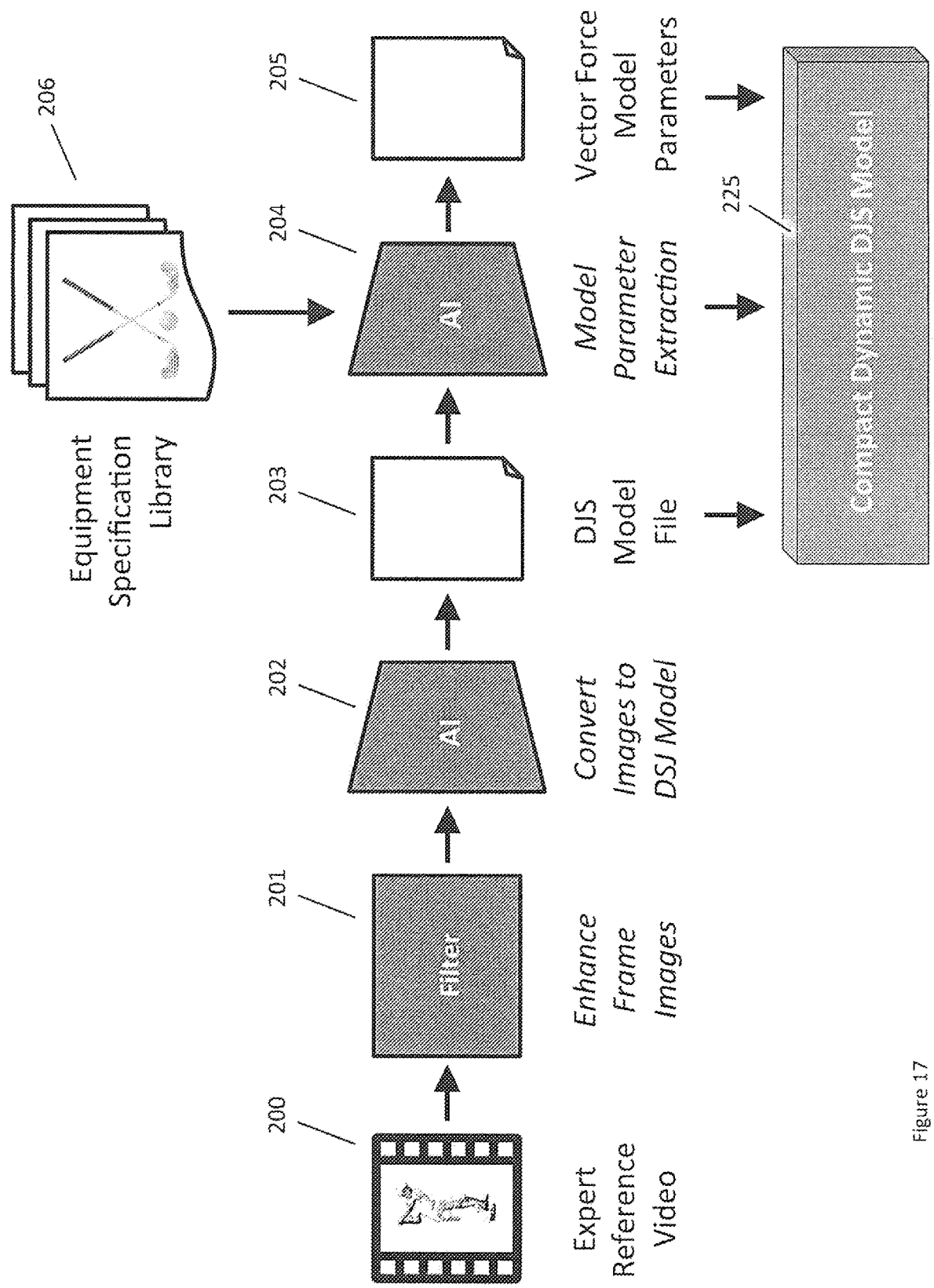
FIG. 17: Flow chart of image capture sequence and model extraction.
Figure 18:
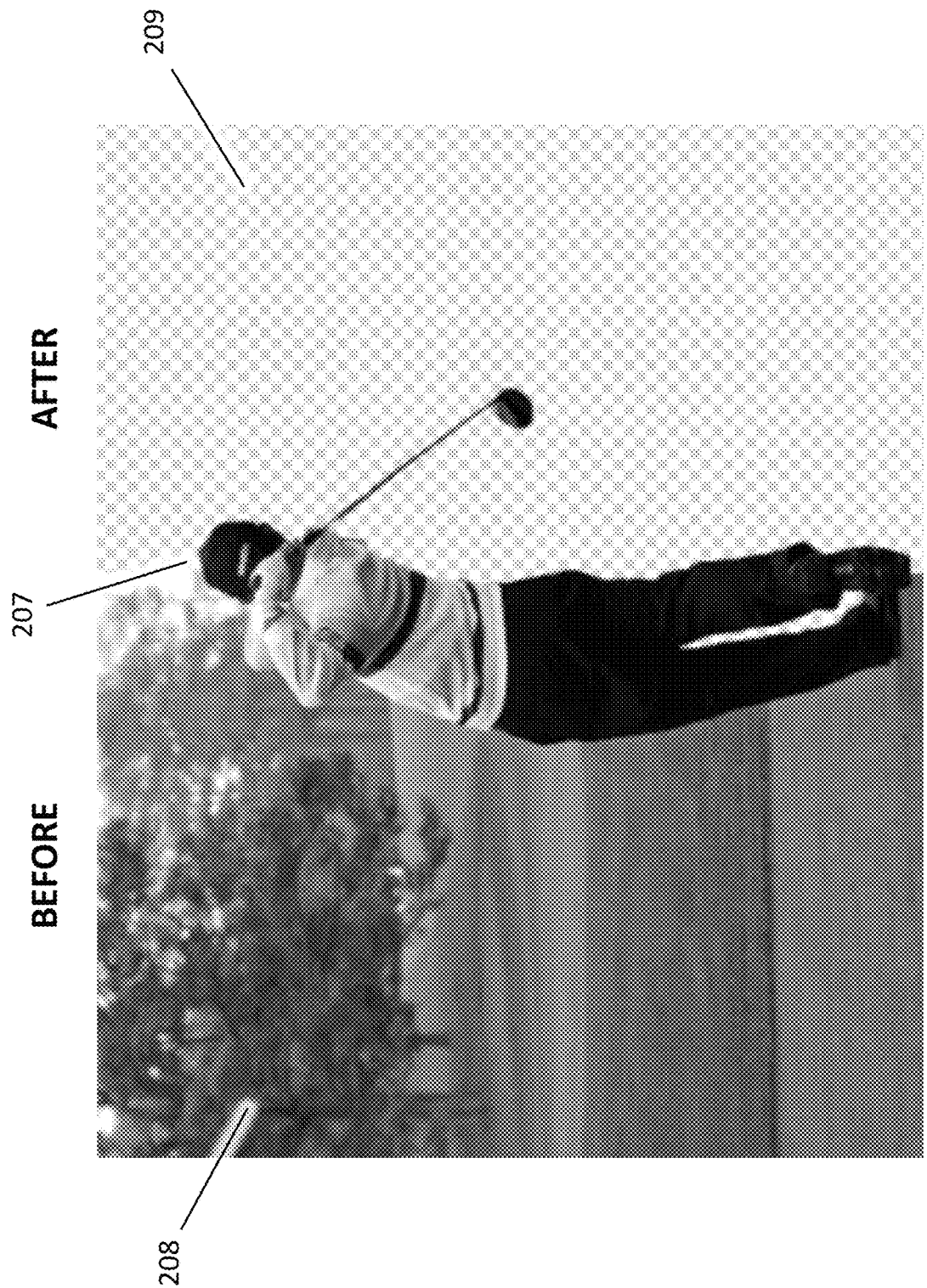
FIG. 18: Filtering used to remove superfluous content from video images.

The first step in the disclosed method and apparatus for augmented cognition for psychomotor learning involves the extraction of a behavioral model. As shown in the flow chart of FIG. 17, the process starts with a video of an expert, trainer, or coach as a reference video 200. The video content may be prerecorded or comprise a live video stream from a camera recording a demonstration, teaching session, instruction, or from a live competitive event. A digital filter process 201 then optionally modifies the image to improve contrast and enhance the images on a frame-by-frame basis by removing or diminishing the presence of extraneous background features. For example, digital filtering shown in FIG. 18 is able to completely remove background content 208 from an image of golfer 207 leaving a blank background 209.

Figure 19:
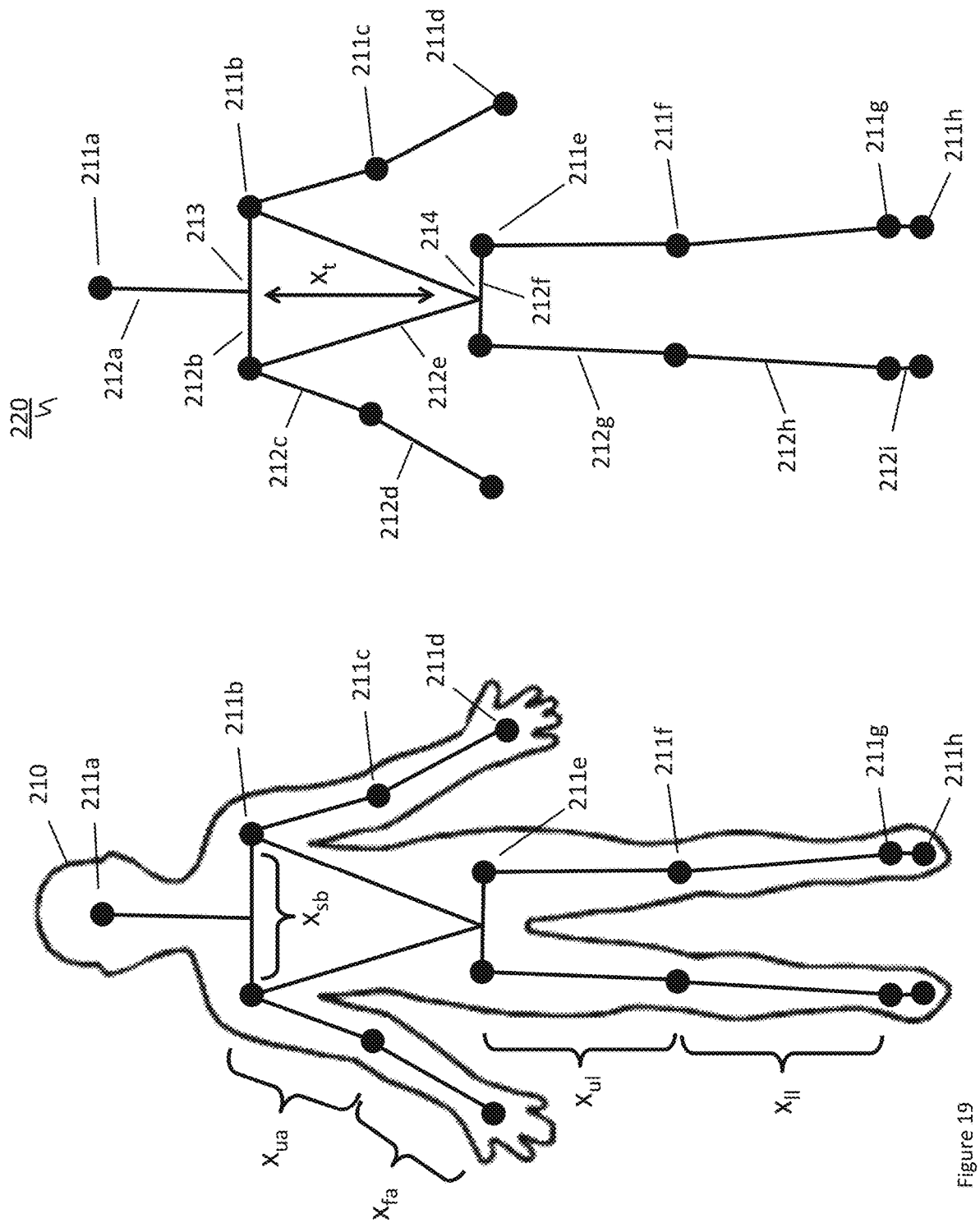
FIG. 19: DJS model extraction of a human.

The output of this filtering process 201 is then fed into an AI processor operation 202 to extract a DJS model file 203, a dynamic jointed skeleton that captures the key features of the reference image, specifically, the expert or coach and any associated equipment involved in the motion. Exemplified in FIG. 19, the use of artificial intelligence is able to identify the shape of a human body 210 and identify human body parts including the head 211a, shoulder joint 211b, elbow 211c, hand 211d, hip joint 211e, knee 211f, ankle 211g, and toes 211h. Once extracted, the resulting DJS model 220 connects the identified joints with connectors representing inflexible components, such as neck bone 212a; scapula or shoulder blade 212b; upper-arm bone or humerus 212c; the forearm bone 212d, the spine and rib cage 212e; the hip bone or pelvis 212f; the femur or upper leg bone 212g; the lower leg bone 212h comprising the tibia and the fibula, and various bones collectively comprising the foot 212i. To identify stick or skeleton models including joints, we refer to the skeletal model 220 as a 'jointed' skeleton to highlight that joints between bones are explicitly identified.

During the parameter extraction process these physical attributes are parameterized, i.e. the dimensions of the body parts are converted into numerical variables defining the reference athlete's body shape. The dimension of each parameter value is then measured and a file created for the unscaled model accurately matching the reference image. These parameters may, for example, include without limitation:

The variable $x_{sb}$, describing the width of the shoulder blade 212b,

The variable $x_{ua}$, describing the length of the upper arm 212c,

The variable $x_{fa}$, describing the length of the lower arm also known as the forearm 212d, The variable $x_t$, describing the length of the body's trunk or torso as measured from the shoulder blade 212b and the waist 212f, The variable $x_{ul}$, describing the length of the upper leg 212g also referred to by their attached muscles quadriceps, The variable $x_{ll}$, describing the length of the upper leg 212h also referred to by their attached muscles the calves, These variables are used to define the relative size of an athlete's body parts and their overall size. By parameterizing the DJS model as described, the scalable model is created—a model that can be adjusted to match the size and shape of any athlete. Combining the scalable model with classical physics, the method is capable of predicting the impact of a change in an athlete's physical attributes from the original reference model. For example, if an athlete's legs are shorter, the model can be used to predict changes in force and launch angle of a golf ball during tee-off, and adjust the swing accordingly to produce the same result as the expert despite the fact that the golfer is taller or shorter than the expert used to create the reference model.

The model therefore is not simply adjusted for an athlete's size but must also be adjusted in accordance with physics to achieve the desired performance, compensating for any size changes. In essence the question is not simply "how would Tiger Woods swing the club if he were my height?" but more importantly "how would Tiger Woods have to adjust his swing to produce the same result if he were my height?" Only by simplifying an expert's movements, i.e. their dynamics, into a dynamic jointed skeleton model, can force, club acceleration and ball velocity be modeled in a succinct and rapid manner using a minimal number of calculations. A static model cannot predict force.

In mathematic vernacular, the joints of a DJS model are referred to as 'vertices' and the connecting bones are defined as 'edges.' As in any physical system subject to Newtonian mechanics, i.e. classical physics, the relation of movement of edges at a vertex are subject to physical laws of motion in response to force or torque. As such physics can be used to govern the dynamic movement of the model in time, hence the acronym DJS for 'dynamic' jointed skeleton. Given that the DJS is governed by physics, an extracted model can be analyzed for linear and angular position, velocity, and acceleration by analyzing the time movement of the graph edges with respect to the vertices and other edges. To extract forces in an analysis, [https://en.wikipedia.org/wiki/Newton%27s_laws_of_motion], we must employ Newton's $2^{nd}$ Law which states the linear vector equation F=ma for linear motion, where m is mass, a is an acceleration vector, and F is a vector force. Alternatively for angular or rotational movement like swing a golf club or a baseball bat, it is convenient to use the rotational version of the $2^{nd}$ law $\tau=I\alpha$ where $\tau$ is a torque vector, I is the moment of inertia, and $\alpha$ is an angular acceleration vector [https://brilliant.org/wiki/rotational-form-of-newtons-second-law/]. Given the description of body mass for the athlete derived by knowing his weight, and the mass of material and density composition of the equipment specified in an equipment specification library 206 shown in FIG. 17, AI operation 204 employs artificial intelligence to extract vector force model parameters 205 for further analysis. The relevant force model parameters depend on the action being performed. For example, in a golf tee-off, an extracted force analysis involves the force which the ball is hit and the force with which the club strikes the ball. Through the use of physics such information can be used to compare one athlete's performance to another or to evaluate how the ball will travel on a given course. Since the mass of the golf club affects momentum transfer and ball launch velocity, the precise weight characteristics can be downloaded from an equipment specification library 206 in order to improve the absolute accuracy of the vector force model parameters 205 used in compact dynamic DJS model 225.

Figure 20:
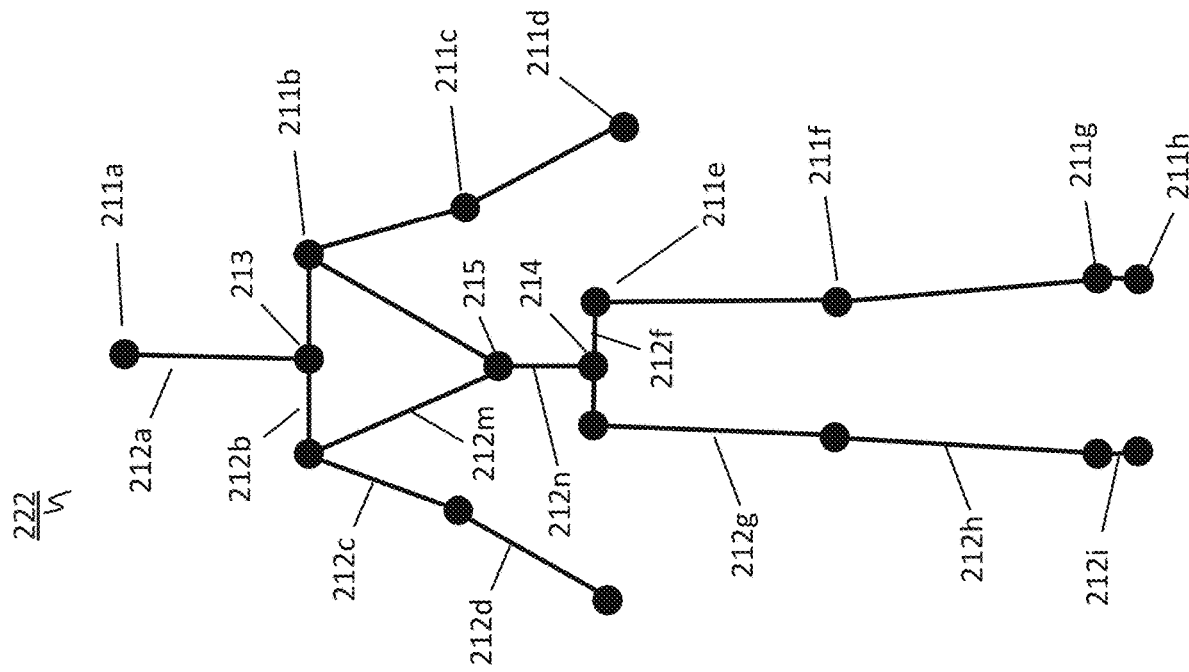
FIG. 20: Alternative DJS models useful for human motion modeling.
Figure 20:
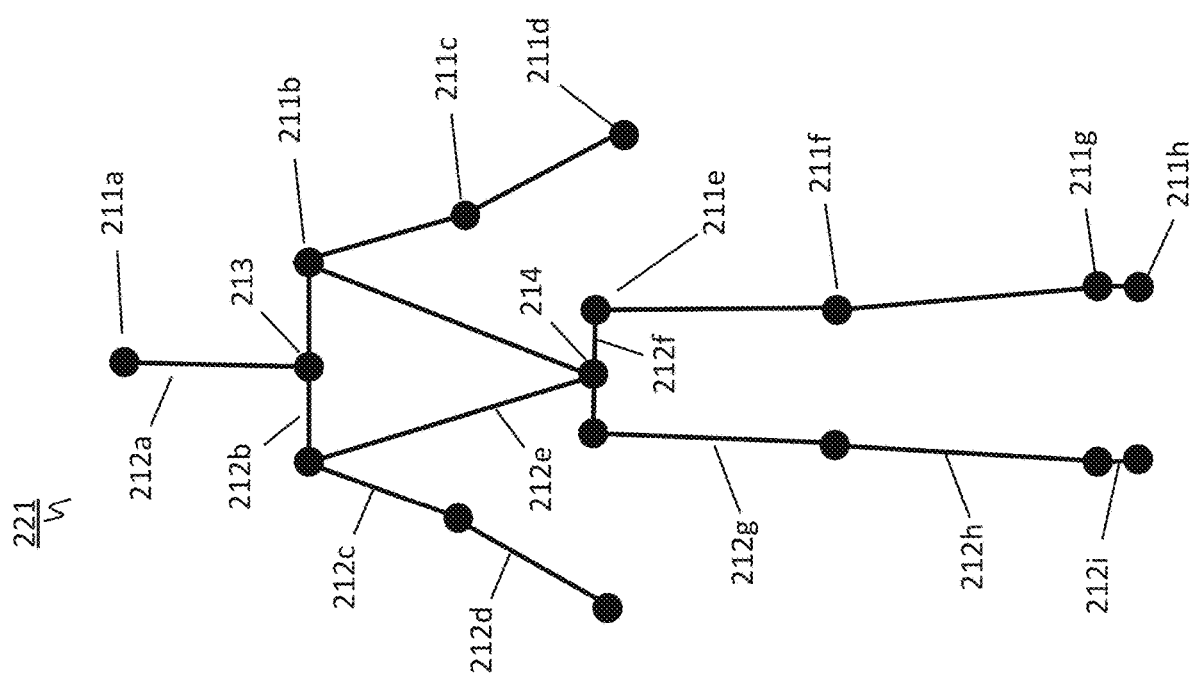

In general, all motion occurs at explicitly identified joints. In the DJS depiction shown in FIG. 19 two exceptions to the rule that motion only occurs at a joint should be mentioned. First of all, the unidentified virtual neck-shoulder joint 213 between neck bone 212a and shoulder blade 212b does allow a limited degree of rotational movement. Variables may be used to specify any body dimension including the length of the athlete's forearm $x_{fa}$, the length of their upper arm $x_{ua}$, the width of their shoulder blade $x_{sb}$, the length of their torso $x_t$, the length of their upper leg $x_{ul}$, and the length of their lower leg $x_{ll}$. A precise physical description is not needed to predict movement. For example, the spine-ribcage 212e is depicted graphically as a triangle meeting the hipbone 212f at a single unidentified virtual hip-spine joint 214, whereby a limited range of rotation is allowed. An alternative representation is shown in FIG. 20 where the neck-shoulder joint 213 and hip-spine joint 214 are explicitly illustrated in DJS model 221. A more accurate DJS model 222 explicitly separates spine and rib cage 212e into two components—an upper thoracic spine and rib cage 212m, and a lower spine or lumbar 212n.

The addition or more vertices complicates the DJS model, slowing simulation and real-time animation. As such, care should be taken not to add any vertices unless it is needed to properly model a movement. For example, modeling the foot may or may not improve model accuracy. Overly complex models make timely calculations difficult and do not necessarily improve accuracy, as they require more variables to be used in the parameter extraction and model creation process.

Figure 21:
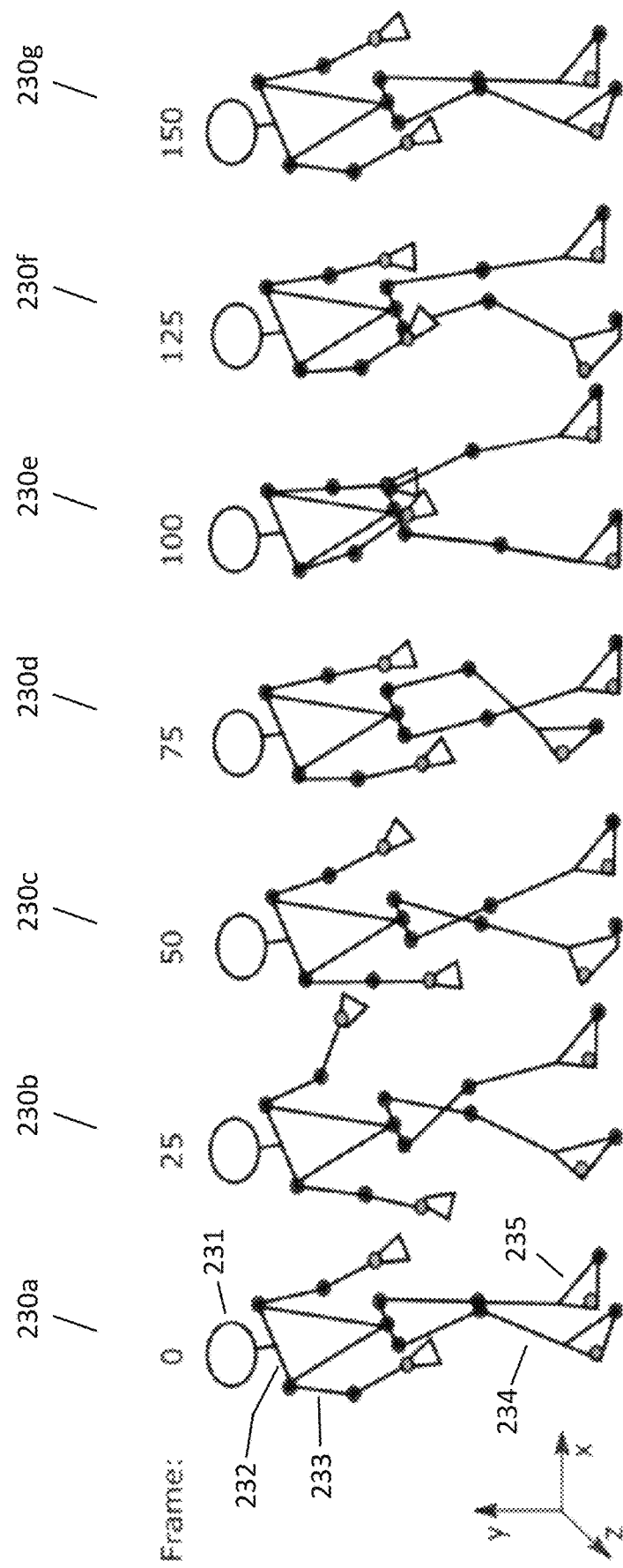
FIG. 21: Demonstration of a simple jointed skeleton model emulating walking.

Once extracted, a DJS file can be used to imitate the motion of any person as a kinematic model able to generate a video file of the motion or action such as the DJS model for walking depicted in FIG. 21. Although the methodology of a moving stick model was first realized by Walt Disney in 1929 [https://www.youtube.com/watch?v=oyrGwRWKtJg] the ability for intelligence to automatically analyze a picture and extract a multi-jointed skeleton model didn't occur till the development of robotic vision in the 1990's in a process referred to a digital thinning algorithm referred to as "skeletonization" [http://homepages.inf.ed.ac.uk/rbf/HIPR2/skeleton.htm]. The process of AI-based skeletonization, using artificial intelligence to identify components of a human, animal, or machine and extract a skeleton is recent and still ongoing as a subject of deep learning research [https://www.youtube.com/watch?v=3ZhQKmSbNug].

The extraction of dynamic jointed skeleton (DJS) models for psychomotor learning disclosed herein is however unique, as it requires the extraction to extract physical characteristics that affect precision movement for a specific result according to the laws of physics and to preserve these subtle differences in the model. For example, creating a simple model of a person swinging a golf club is no different than animation, but modeling an athlete's action to predict performance requires physics based models. Animation, by contrast, need not follow the laws of physics. For a kinematic model for psychomotor learning to be useful, however, it must be physically accurate.

Capturing the precise movements of a tennis pro athlete, a master golf pro, or a world-class neurosurgeon requires a high resolution extraction of precise movements, stored with any associated equipment specifications involved in the action. For example, the length and weight of a golf club or of a tennis racket affects which DJS model needed to precisely predict the desired motion. The shape of a scalpel could be the difference between a successful surgery and inadvertently severing a nerve.

And although a library of good DJS models is a key element in quality psychomotor training, it alone is not enough. It is also important to movement by separating intervals of smooth movement and interruptions by discrete time segments identified by start and stop "triggers".

Figure 22A:
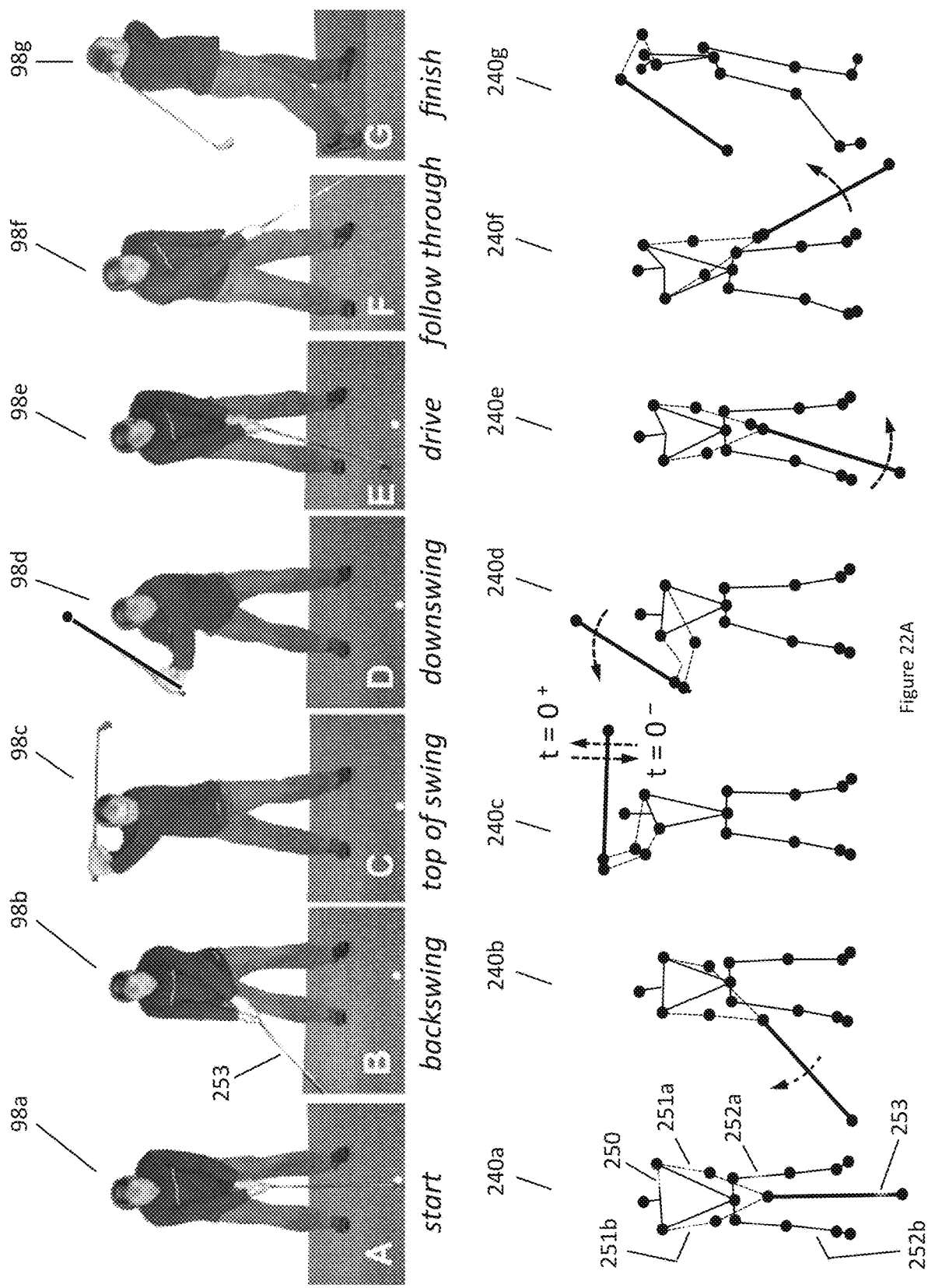
FIG. 22A: Conversion of a video capture of a golf swing into a dynamic jointed skeleton sequence.

Motion capture of a golf swing are shown in successive images of FIG. 22A including start A, backswing B, and top of swing C corresponding to images 98a, 98b, and 98c respectively. The conclusion of the backswing in image 98c occurs at a time referred to a t=0$^-$, just an instantaneous moment before t=0 where the club's velocity is zero, i.e. v=0.

As a separate movement from the backswing, the downswing commences at an instantaneous moment called t=0$^+$ after the completion of the backswing at t=0, also represented by image 98c. Following top of swing C, the downswing progresses through downswing D into drive E when the club strikes the ball, to follow-through E and ultimately to finish G, a sequence represented by images 98c, 98d, 98e, 98f, and 98g respectively. The equivalent dynamic jointed skeletons include shoulder 250, left arm 251a, left leg 252a, right arm 251b, and right leg 252b along with club 253. As shown, the video sequence 98a to 98g corresponds to skeletal models 240a through 240g respectively.

Figure 22B:
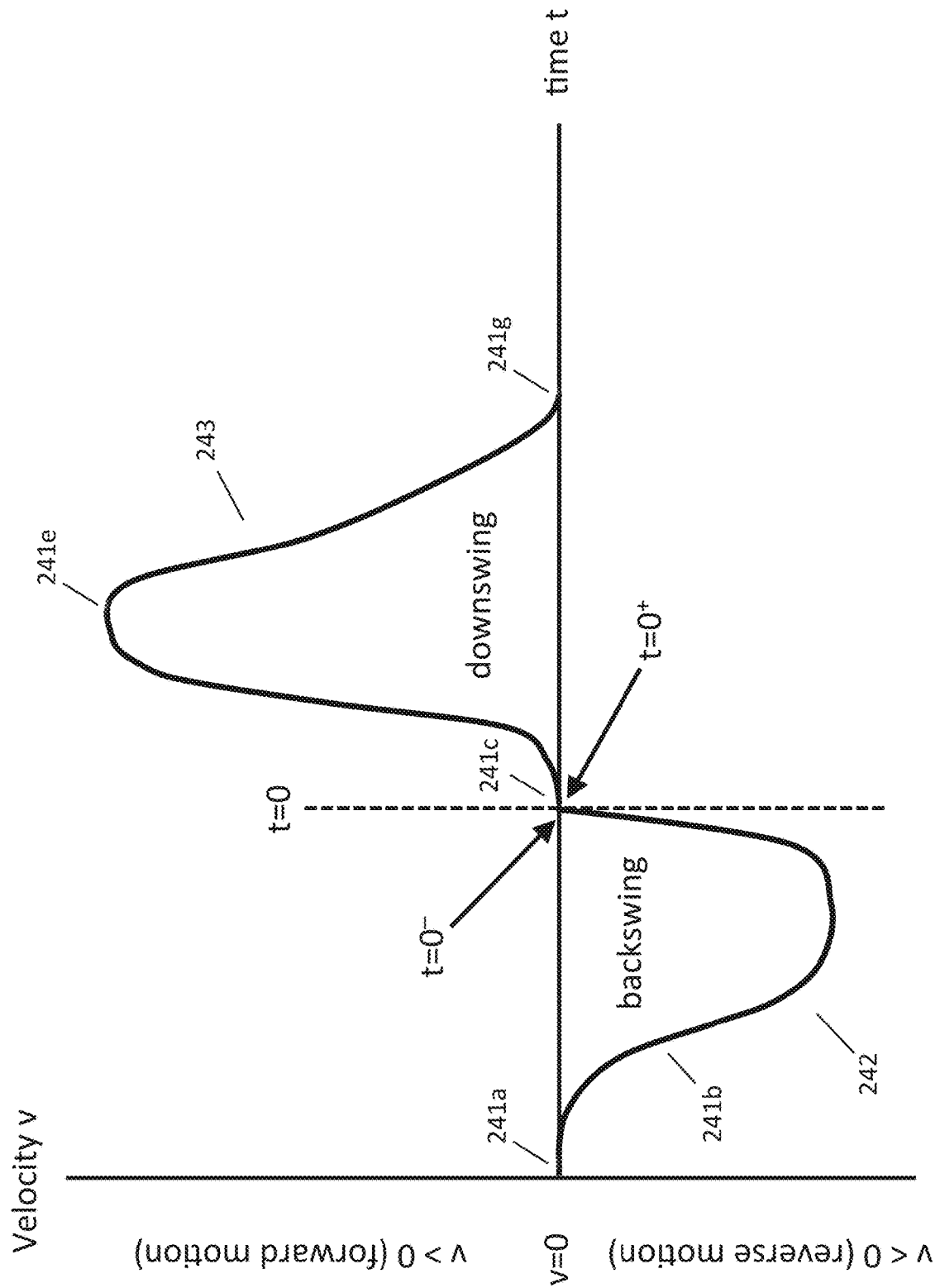
FIG. 22B: Graph of golf club velocity for a smooth continuous-motion swing.

The golf club velocity corresponding to these positions is shown in FIG. 22B where velocity 241a represents the commencement of the backswing 242 represented by negative velocities (v<0) and by negative time, (t<0, i.e. times before t=0) corresponding to position 240a, velocity 241b corresponds to position 240b and velocity 241c corresponds to position 240c at time t=0, just after the completion of the backswing 242 at time t=0$^-$ and just before the beginning of the downswing 243 at time t=0$^+$.

At the t=0, club velocity (in calculus, the first time derivative of position) changes polarity from negative to positive, and club acceleration (in calculus, the second time derivative of position or the first derivative of velocity) changes from negative (deceleration at the top of the backswing) to positive (accelerating at the commencement of the downswing). As such, either velocity or acceleration data can be extracted from successive video frames and used to identify the instant the backswing ends or the downswing commences. Downswing 243 is thereby graphically represented by positive values (v>0) including peak velocity 241*e* corresponding to position 240*e* and finishing at velocity 241*g* when the swing follow-through is complete. As such backswing 242 and the downswing 243 can be modeled as two smooth actions separated by a polarity reversal in direction and acceleration. This polarity transition can be used as a "trigger" beneficial in controlling model playback for the purpose of synchronization.

Figure 22C:
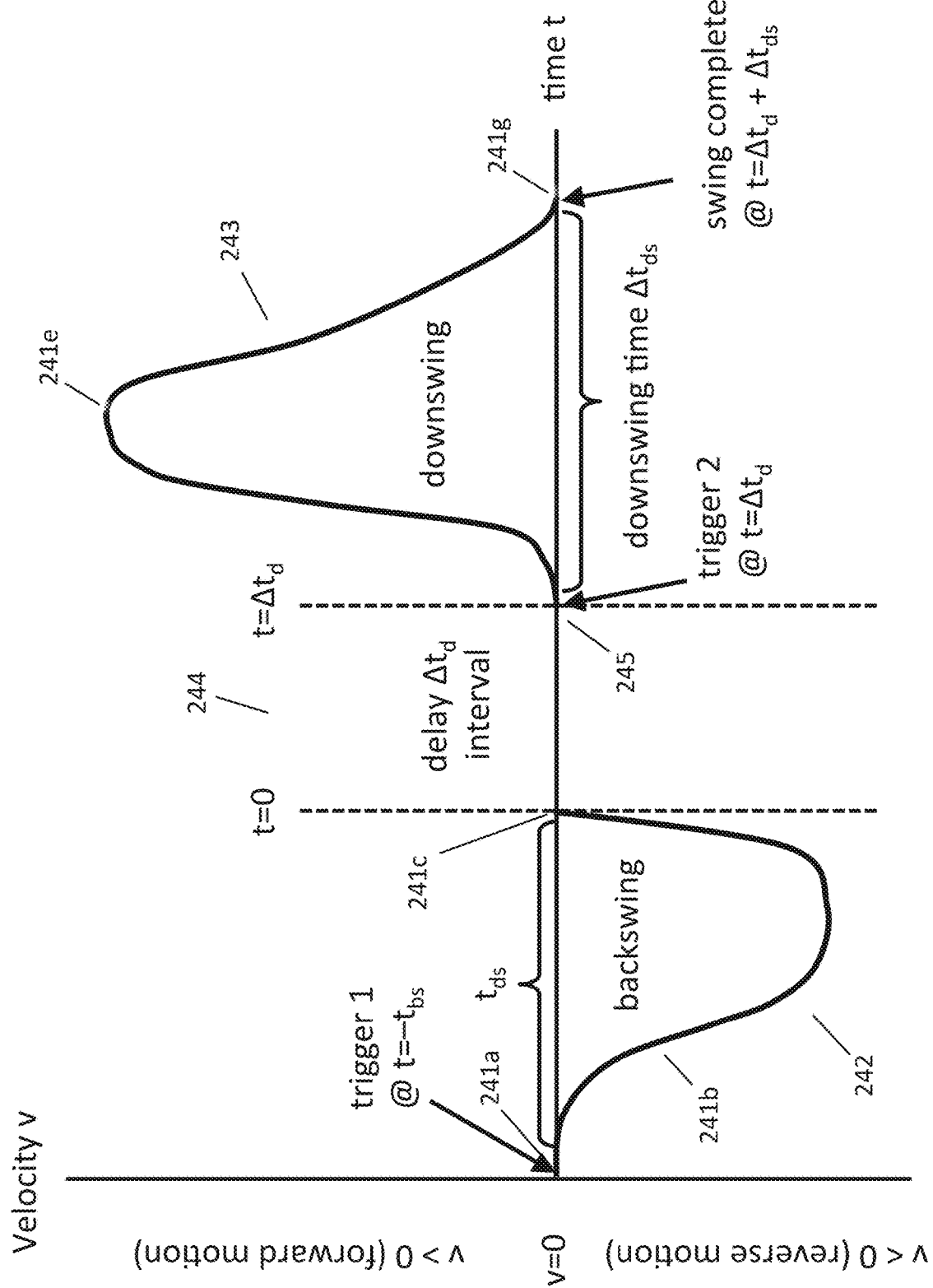
FIG. 22C: Graph of golf club velocity for a discontinuous-motion swing with a variable delay between backswing and downswing.

One example of the need for a triggered DJS model is to accommodate discontinuous movement. For example, some golfers stop for a moment at the top of their backswing before commencing their downswing, rather than immediately commencing the downswing as one continuous motion. This case is represented in the graph shown in FIG. 22C where downswing 243 doesn't instantly follow backswing 242, but instead is delayed by delay interval 244 of a duration $\Delta t_d$. The delay varies dramatically with athletes, ranging from 100 ms (almost instantaneously) to up to 10 seconds.

An athlete who feels comfortable waiting five seconds at the top of their swing cannot comfortably learn psychomotor skills from watching a video of an athlete who holds his club for less than a second at the top of their swing because they will feel rushed trying to catch up with the video. By partitioning the DJS model into discrete pieces of continuous movement defined by event triggers, delays and motion interruption can be matched to the student's needs. Consistent with FIG. 22B, in FIG. 22C time t=0 represents the end of the backswing 242. Therefore the backswing commences (when velocity 241*a* is zero) at the time t=$-t_{bs}$ corresponding to trigger 1 and concludes at time t=0. Downswing 243 however does not commence until trigger 2 after a variable delay $\Delta t_d$ depicted by interval 244. Starting at velocity 245 equal to zero, downswing 242 therefore does not commence until time t=$\Delta t_d$. Lasting a duration $\Delta t_{ds}$ downswing 242 does not conclude until the time t=$\Delta t_d$+$\Delta t_{ds}$ when velocity 242*g* reaches zero. The integration of trigger 1 and trigger 2 into the DJS model therefore allows model playback to be broken into two pieces backswing 242 and downswing 243 separated by a variable delay 244 specified by detecting a condition, e.g. a student commencing their downswing, and commencing playback by activating trigger 2. In this manner, the student went feel rushed or pressured into trying to match the reference video of another athlete.

The same principle of trigger based discontinuous playback can be adapted to learning other psychomotor skills such as surgery, where an incision is made in two strokes rather than in one continuous movement.

Figure 23:
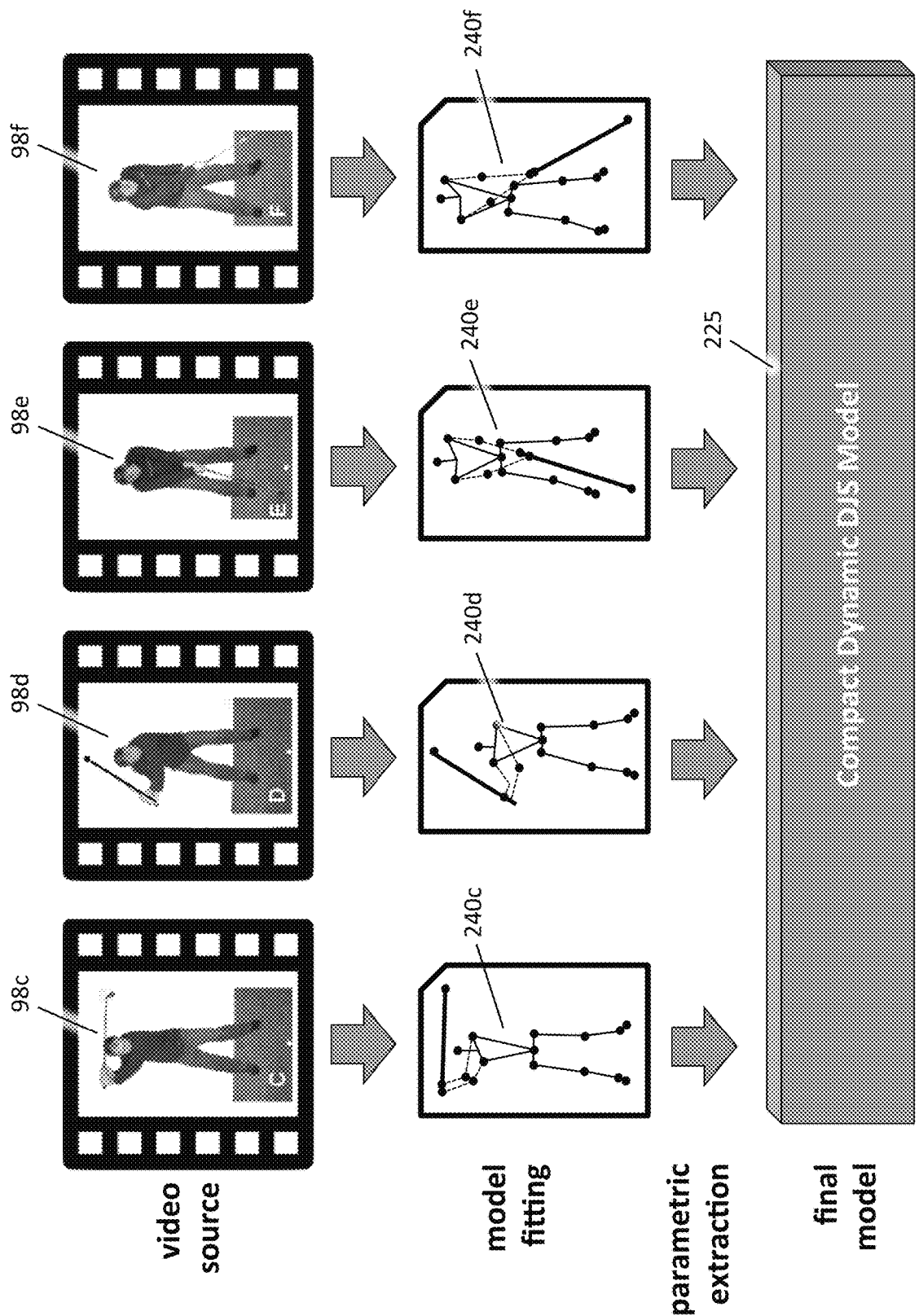
FIG. 23: DJS model parameter extraction to generate compact dynamic model.
Figure 24:
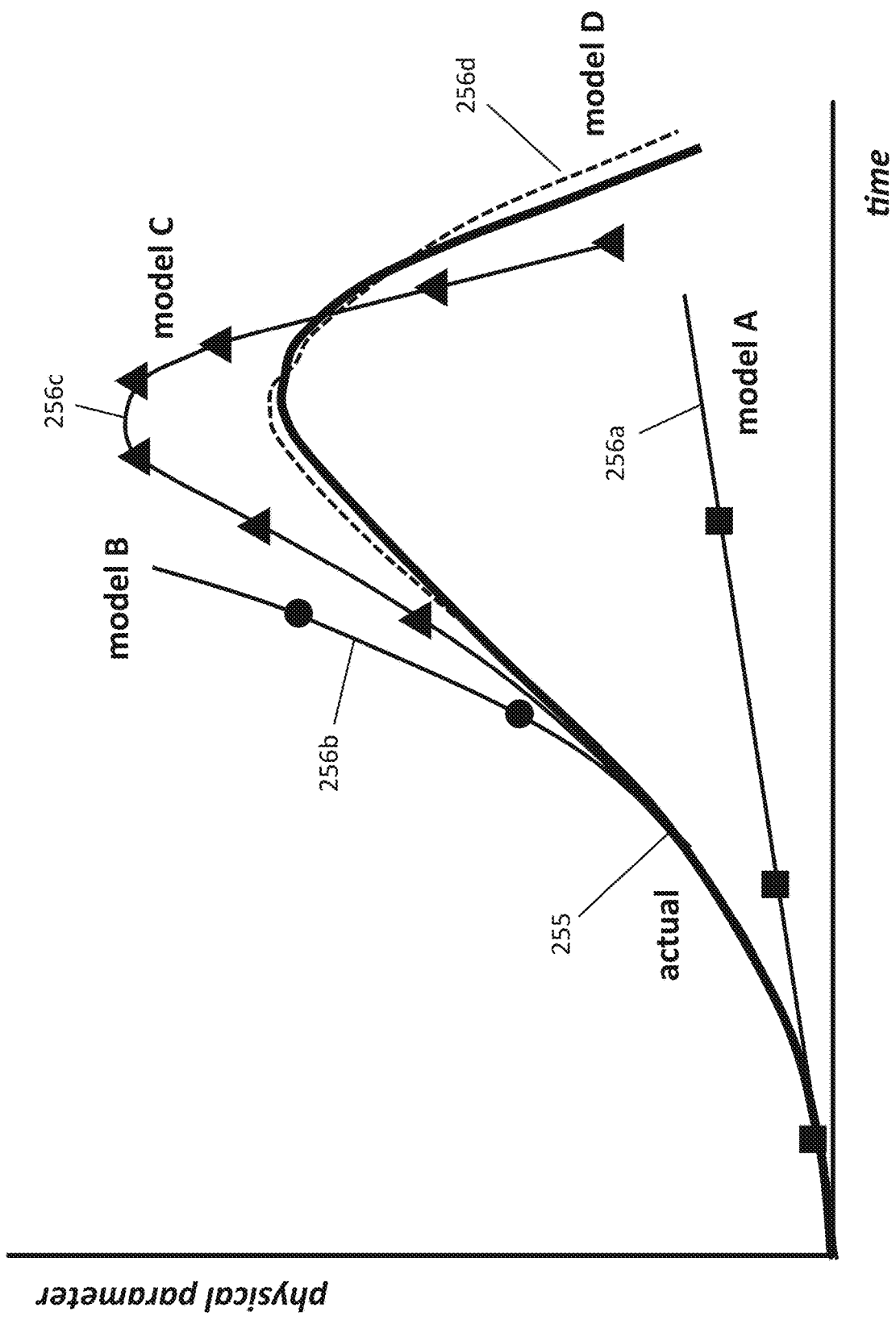
FIG. 24: Curve fitting of various mathematical models to measured data.

As shown in the exemplary video frames and extracted skeletal models of FIG. 23, a compact dynamic jointed skeletal model 225 minimizes the error in predicting all the respective movements in captured motion sequence 255, shown in FIG. 24. Mathematical models to describe actual measured data of curve 255 include linear model A shown by curve 256*a*, exponential model B shown by curve 256*b*, polynomial model C shown by curve 256*c*, and higher order polynomial D shown by curve 256*d*. Constants in the mathematical model are adjusted to minimize overall errors to maximize the curve fit accuracy to actual data represented by curve 255. The adjustment of model curve fitting parameters to minimize errors is referred to parameter extraction. Parameter extraction is an imperfect process where the accuracy of a curve fit over a limited range may be increased by sacrificing accuracy over the full interval, or vice versa. Using an artificial intelligence engine to interpret a series of graphical images, however, errors can be minimized over repeated events or video sources, allowing the system to better "learn" what it is looking at.

Figure 25:
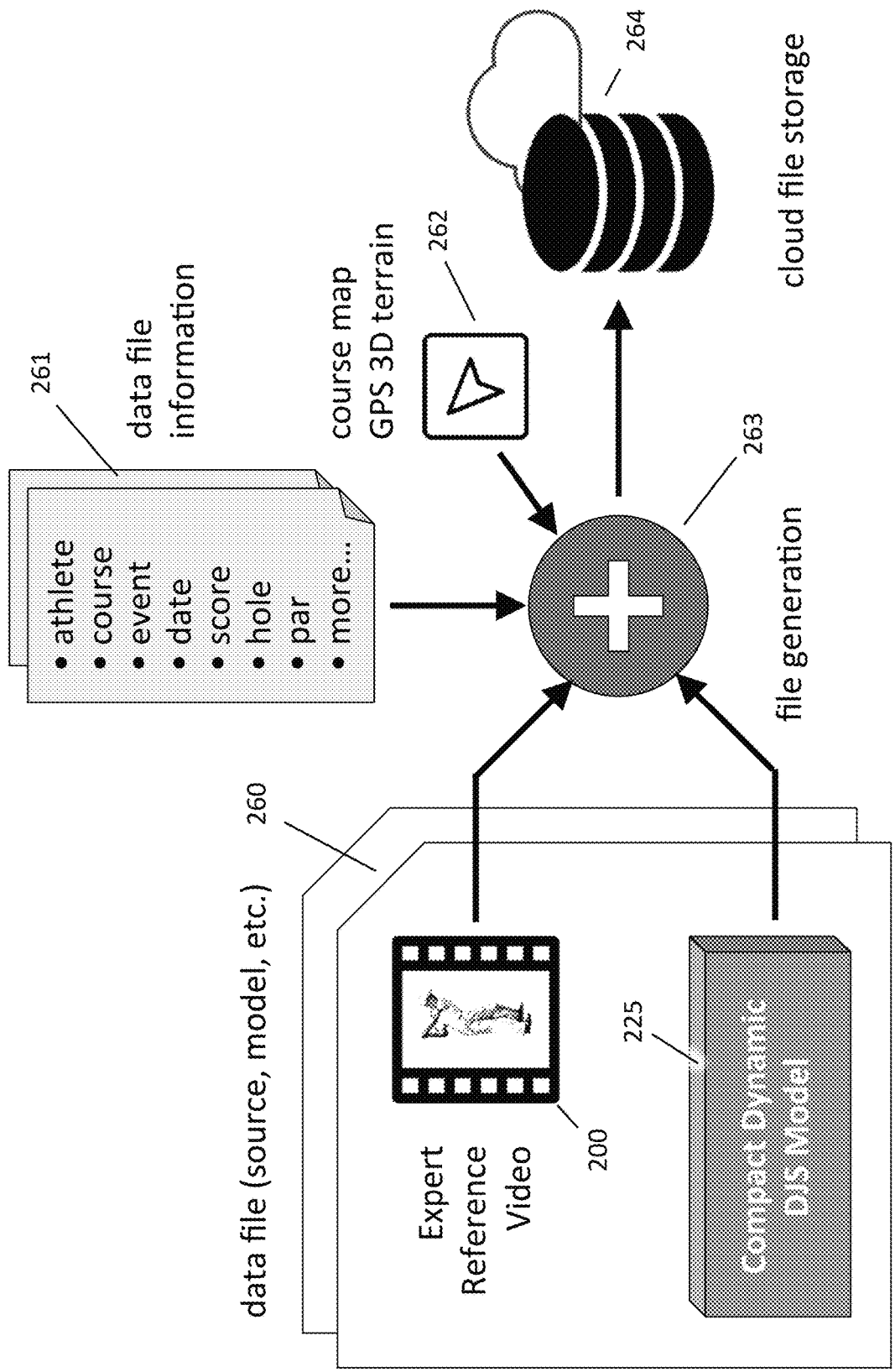
FIG. 25: File generation comprising reference video with extracted DJS model, course map, and file data

As shown in FIG. 25, once a compact dynamic DJS model 225 is extracted, its reference source video 200, i.e. source data file 260 is combined in file generation process 263 with GPS 3D terrain course map 262 and file source data information 261 to file 264 for cloud storage. Source data information 260 may include the name of an athlete, the specific golf course, the name of the event, the date of the event, as well as the athlete's score for each hole (measured against the hole's par), and more. Terrain information 262 may also be included and may optionally include wind information by time (although this data is difficult to extract from pre-recorded files where weather information is unavailable).

Figure 26:
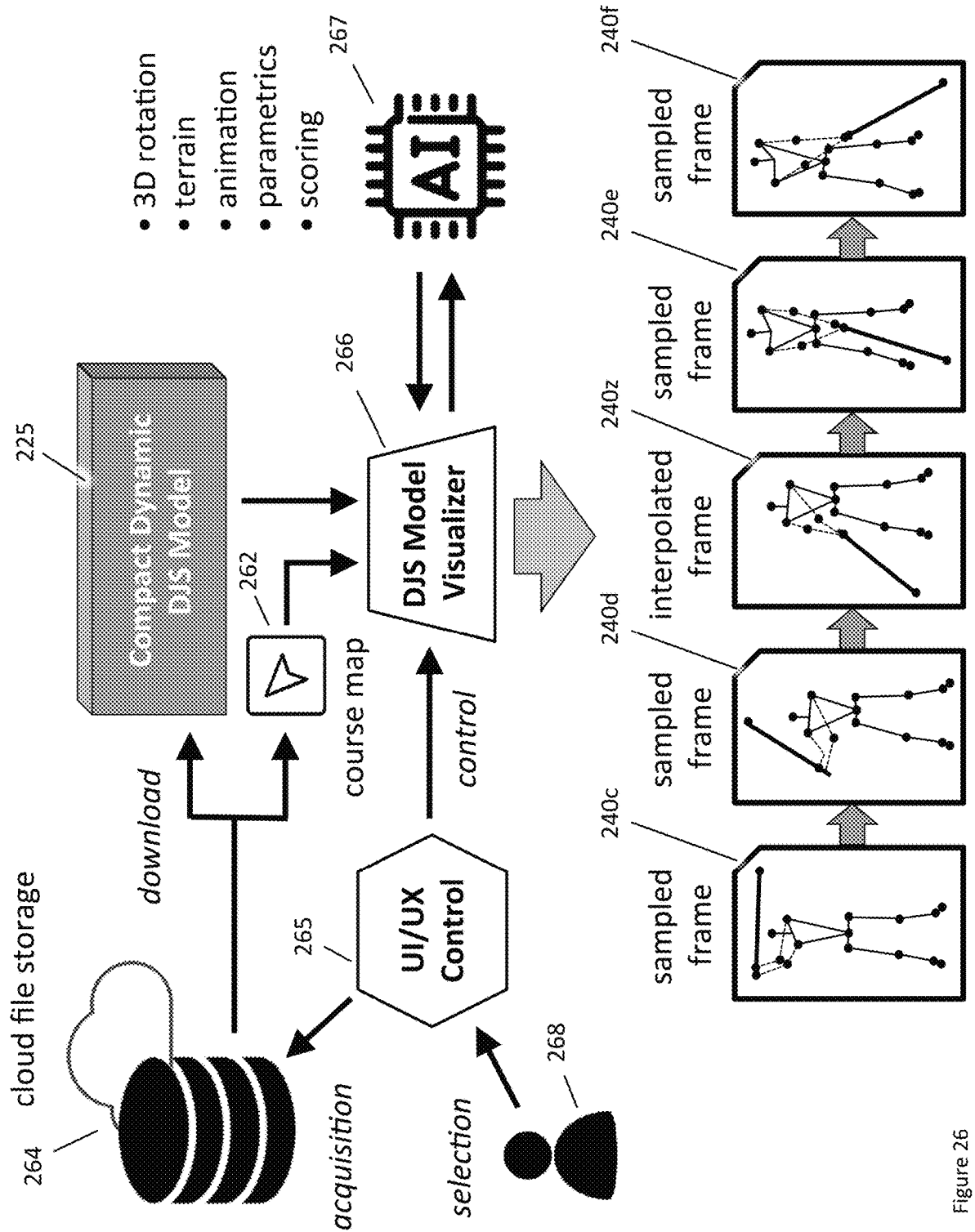
FIG. 26: AI based model visualization UX including rotation and frame interpolation.

As depicted in FIG. 26, playback of stored files comprises user 268 selecting a specific expert file from cloud file storage 264 via user interface 265. The download comprises compact model 225 and course map 262. UI/UX control 265 instructs DIS model visualizer 266 to process the data and model using artificial interface (AI) engine 267. AI processing includes 3D rotation, terrain, animation, parametrics, and calculation of performance evaluation, i.e. scoring. The generated video from the DJS model 225 may include sampled frames 240*c*, 240*d*, 240*e*, and 240*f*, and interpolated frames such as 240*z* generated from the DJS model. The model can be "played" like a movie by executing an evaluation of movement on a frame-by-frame basis over time. The model can be synchronized to live video trigger or run autonomously.

Figure 27:
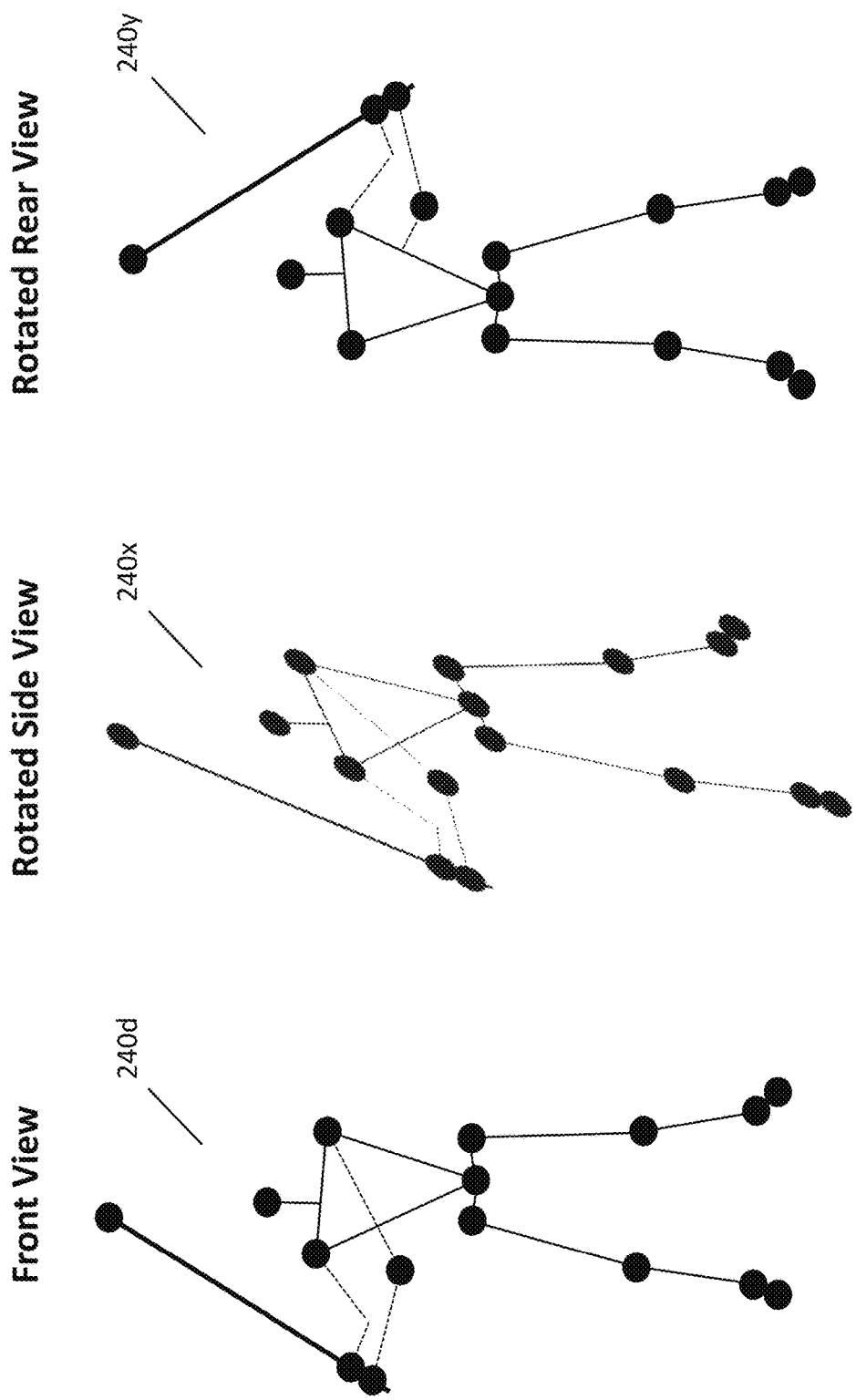
FIG. 27: Rotation of jointed skeletal model.

Another feature of DJS model 225 with AI engine 267 shown in FIG. 27 includes 3D rotation of image 240*d* for side view 240*x* or rear view 240*y*. Based on physical models the rotation can be performed even though only a single camera is used to capture a video image. In this manner, the DJS model always can be rotated to match any available video source or even compared against multiple video sources.

Figure 28:
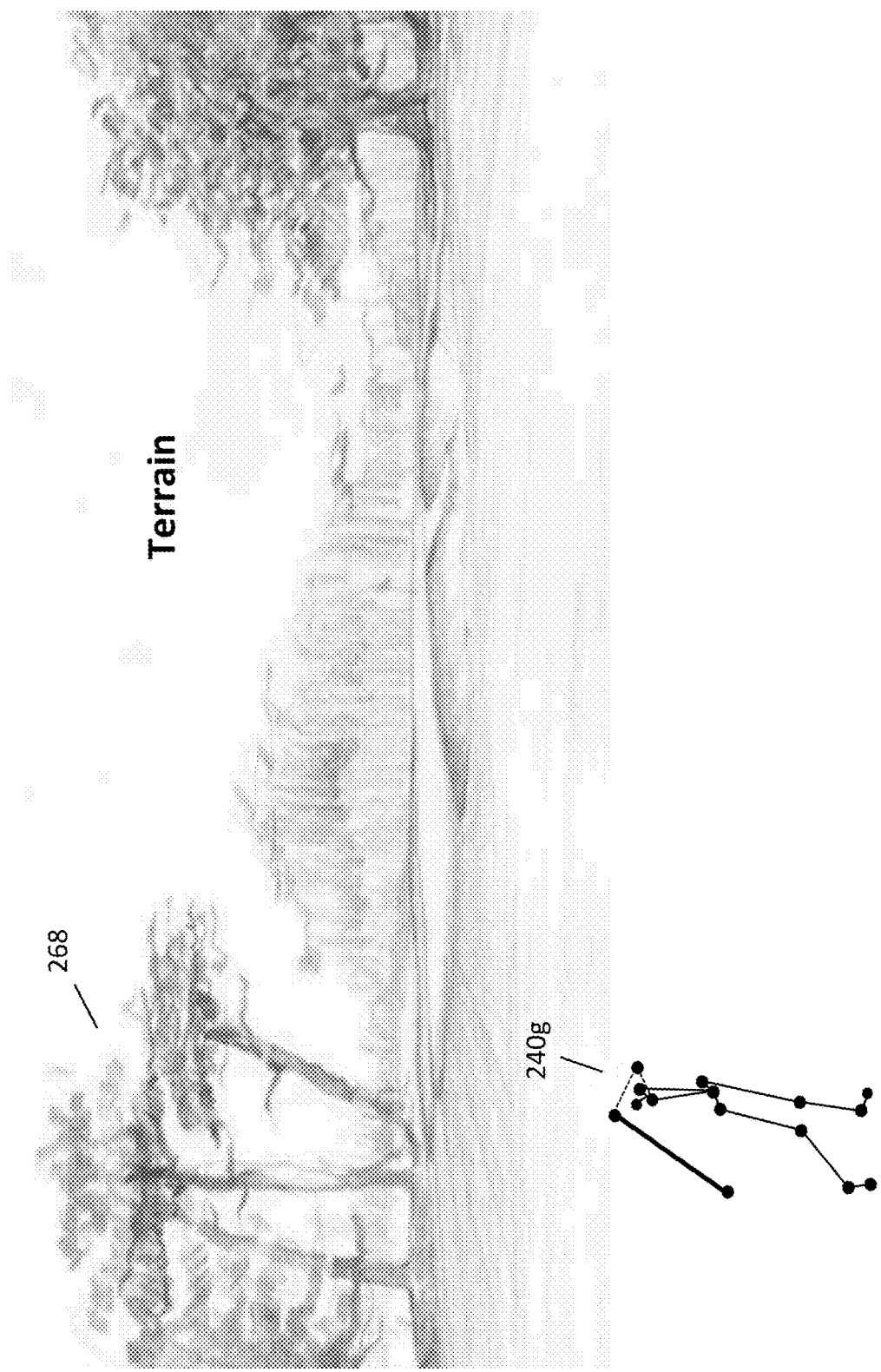
FIG. 28: Simulation of DJS model including terrain data.

In FIG. 28, AI engine 267 is able to combine DSJ model 240*g* with terrain 268. By combining a golf course terrain with a DJS model, a student can analyze how an expert played a particular hole. Beneficially a student can play the hole themselves, comparing their performance against the expert.

Figure 29:
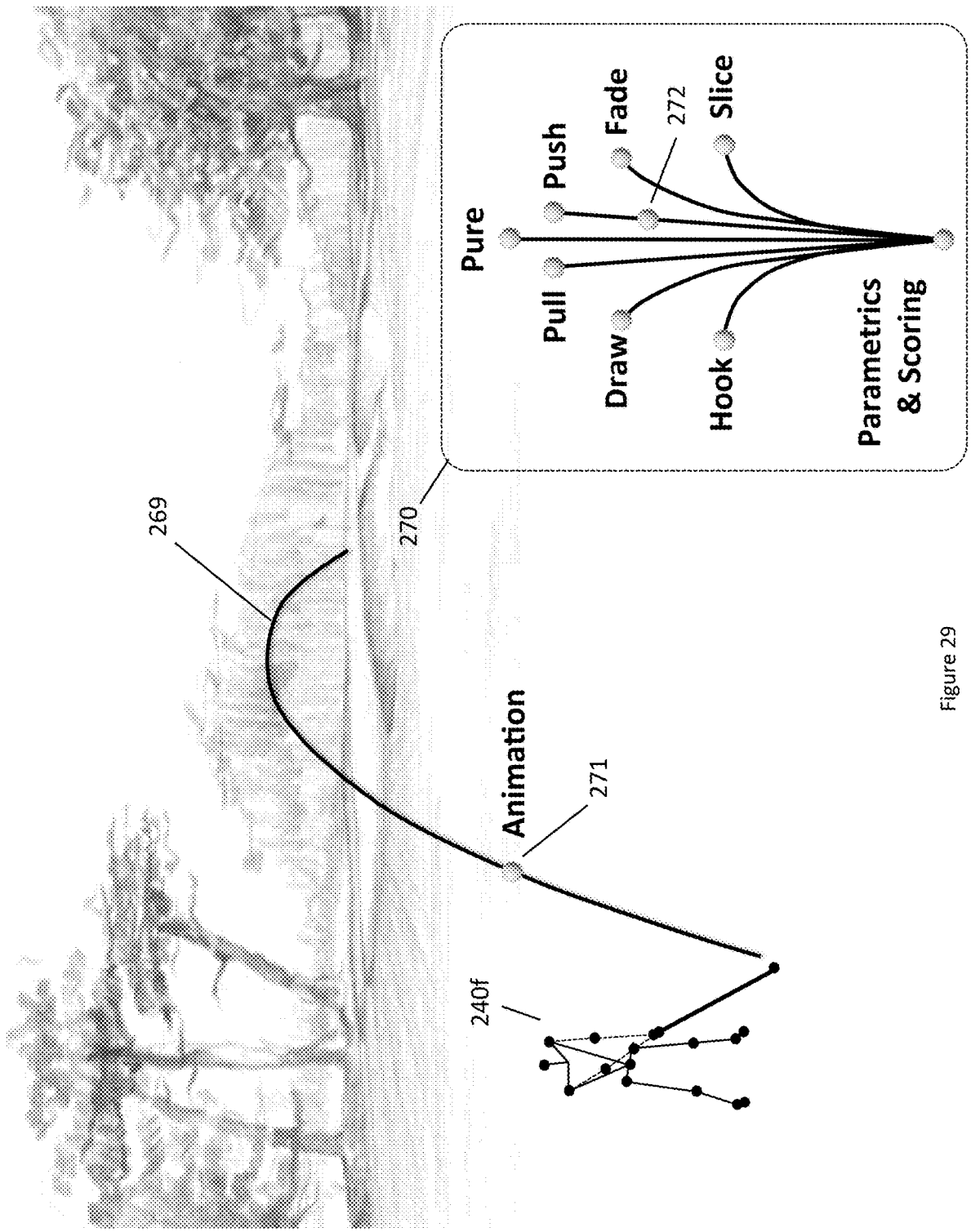
FIG. 29: DJS model derived trajectory animation.

In FIG. 29, DSJ model 240*f* is combined with drive animation 271 to display ball trajectory 269. The analysis of any video can categorize 270 the trajectory result 272 parametrically as a slice, hook, fade, draw, push, pull or a perfect "pure" stroke. Scoring may also be assigned to the drive and used in evaluating competitive performance.

Image Overlay and Augmented Cognition—

Figure 30:
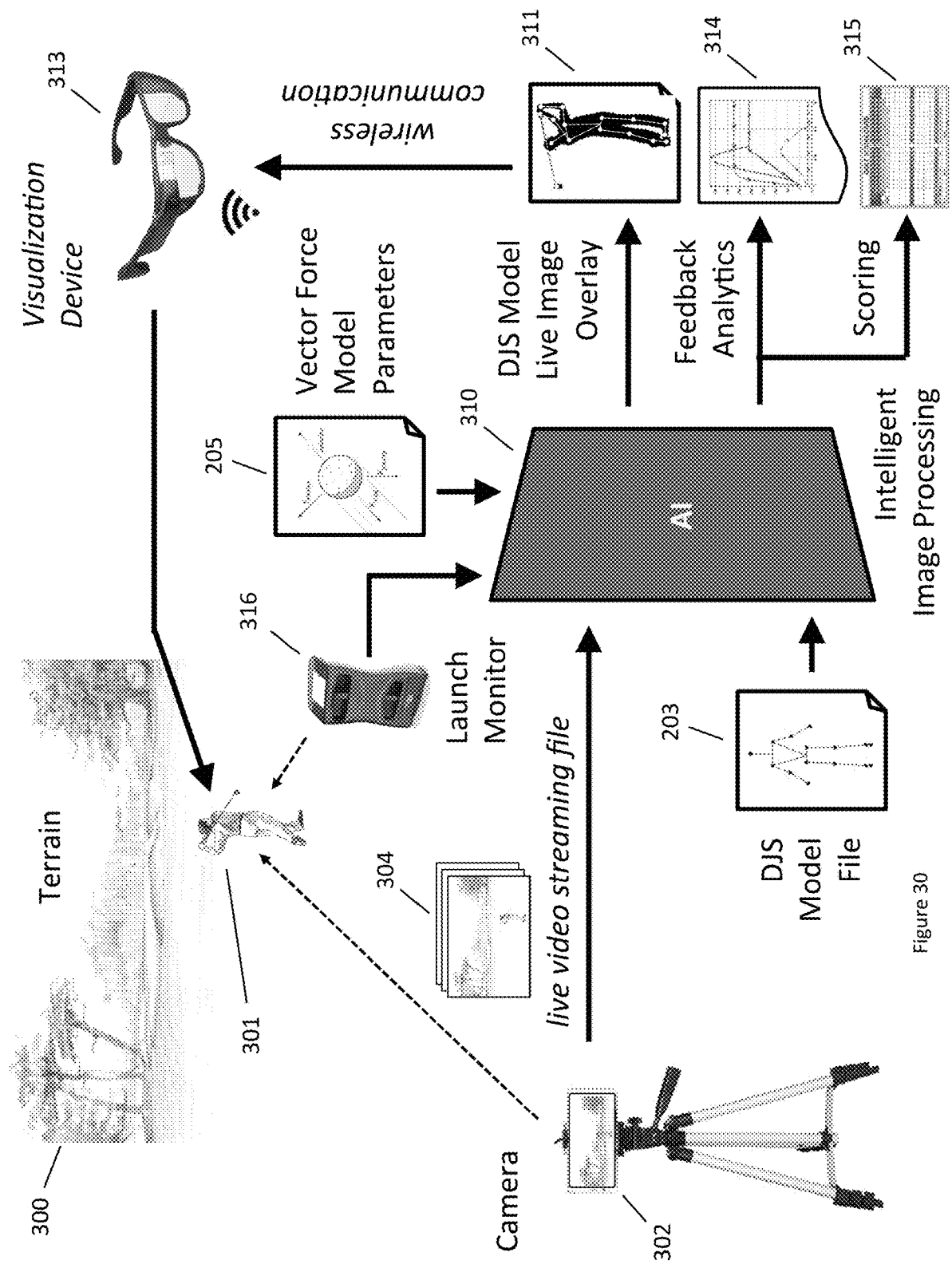
FIG. 30: Block diagram of image DJS overlay and augmented cognition system and process.

The process and apparatus of augmented cognition for psychomotor learning using a kinematic DJS model with contemporaneous feedback via A-B image DJS overlays is illustrated in FIG. 30. As shown, golfer 301 on golf course 300 wishes to learn, for example, how a pro played the same course. By placing smartphone 302 on a tripod to monitor the golfer's swing, a live video file 304 is processed by an artificial intelligence using intelligent image processing within AI engine 310, preferably implemented within smartphone 302, although a separate or dedicated AI processor engine may also be used. Operations within AI engine 310 occur live, i.e. in real time, involving a complex and inventive sequence of operations as follows:

AI-engine 310 downloads DJS model file 203 of a selected expert for training purposes.

AI-engine 310 receives live video streaming file 304 of golfer 301 as a continuous input.

On the fly, i.e. continuously, AI-engine 310 removes superfluous background content of golf course 300 from live video streaming file 304.

Optionally, launch monitor 316 measures parametric data from golf tee-off and provides its measurements to AI-engine 310.

AI-engine 310 identifies the image of golfer 301 in the video stream using artificial intelligence-based pattern recognition.

A sample of the video images from video streaming file 304 is analyzed to extract the height and the body proportions of golfer 301 including the golf club, lengths of upper and lower legs and arms, torso length, etc.

A DJS model 203 selected from the model library loaded into AI-engine 310 is adjusted to match the height and body proportions of golfer 301.

A set of vector force model parameters 205 (including any equipment related specifications) is loaded into AI-engine 310 and the DJS model is adjusted for the proper acceleration needed to calculate the same force and ball trajectory as the original reference library expert's performance.

In real time, AI-engine 310 outputs overlay 311 comprising the live image of golfer 301 and the scaled version of DJS model 203 at the same size and body proportions as golfer 301 but with motions matching the performance of the expert in the DJS reference library.

The DJS overlay 311 is wirelessly transmitted to visualization device 313 worn by golfer 301 allowing the athlete to compare their live motions to the DJS skeleton image overlaid upon their own live video image.

The image overlay 311 of the DJS model is synchronized to the motions of golfer, triggered by the golfer's motions including for example the commencement of the backswing and again at the commencement of the downswing. DJS model playback pauses until the golfer's next swing. AI-engine 310 dynamically changes its instruction images to gradually become more closely matching the expert captured in the reference model, AI-engine 310 also outputs feedback analytics 314 which may be a report summarizing the golfer's performance or may include real time analytical data such as club angles, swing planes, etc. displayed as part of image overlay 311.

Figure 31:
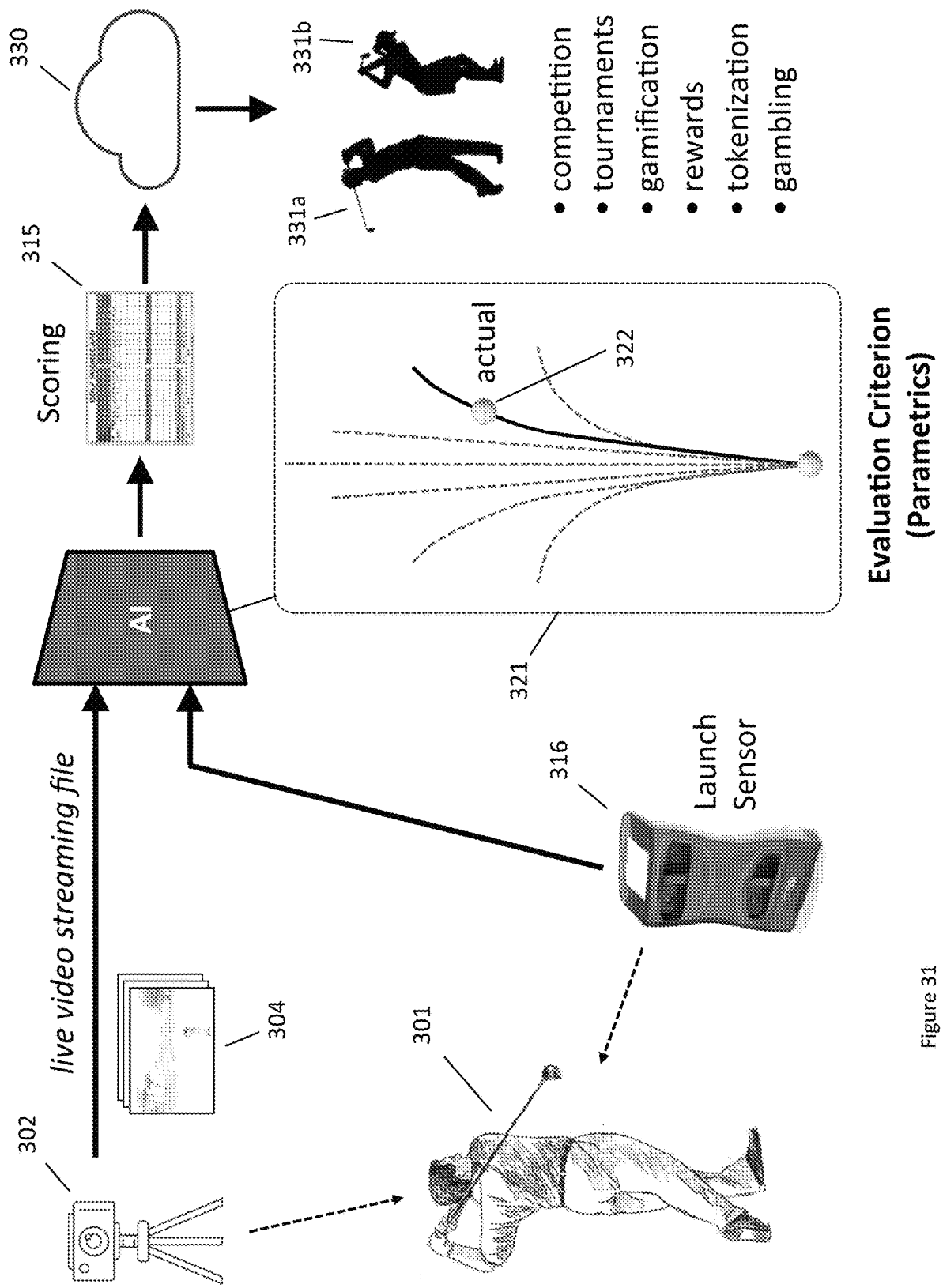
FIG. 31: Block diagram of data acquisition and scoring combining live video and launch sensor data.

As shown in FIG. 31, AI-engine 310 optionally scores feedback analytics from launch sensor 316 data and video streaming file 304, where the calculated score 315 may be used to measure the golfer's performance, including comparing the golfer's swing to the swing of an expert. The measured data may also be used to measure the golfer's tee-off performance 322 against some evaluation criteria (e.g. angle, speed, calculated drive distance, etc.). The use of evaluation criteria provide a quantifiable measurement of an athlete's performance, including the following features:

Scoring 315 may be uploaded to data cloud 330 for comparing golfers 331a and 331b for competition, tournaments, gamification, rewards, tokenization, and gambling.

Figure 32:
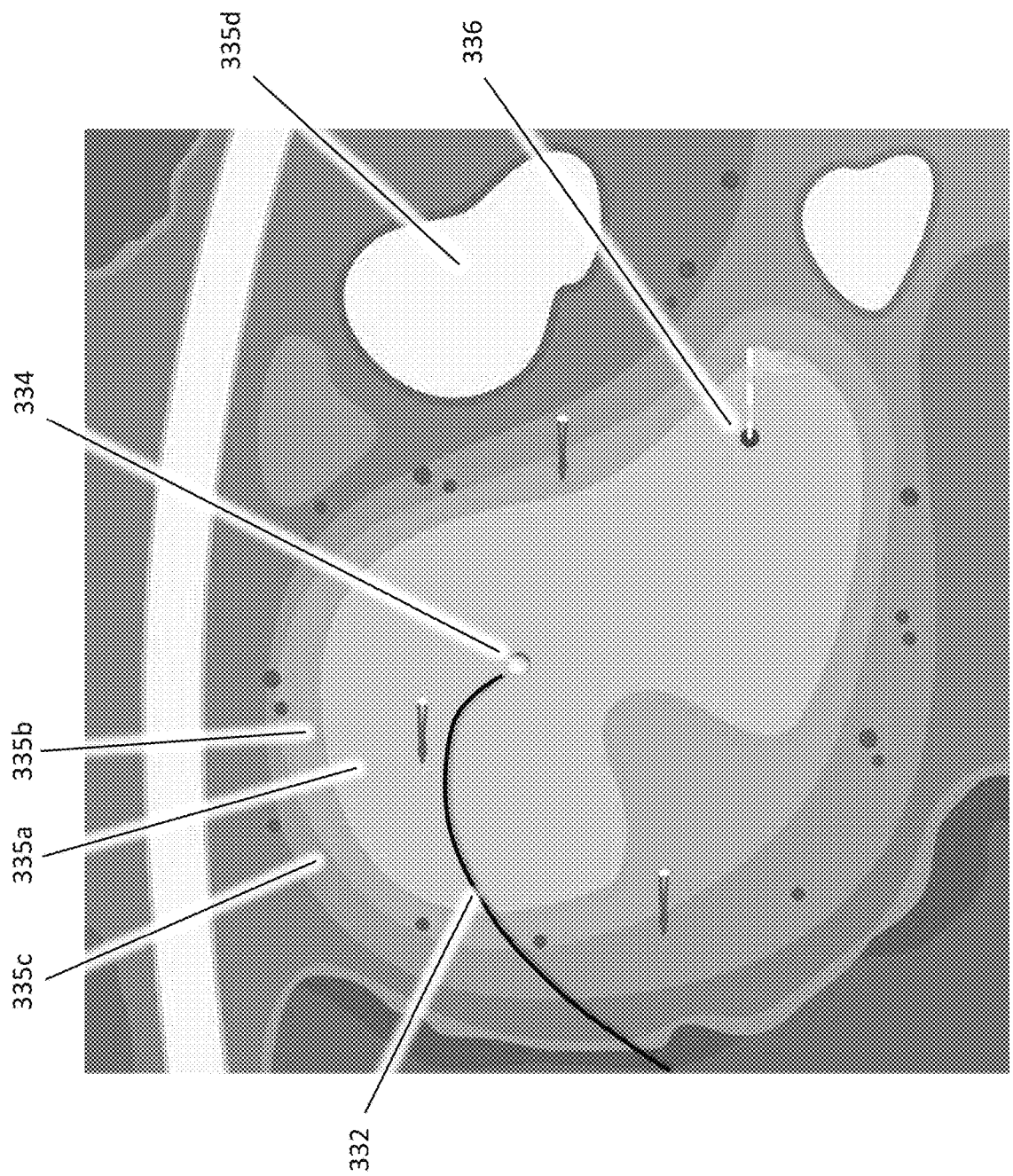
FIG. 32: Ball drop position and scoring based on DJS model derived trajectory simulation.

Combined with map details shown in FIG. 32, the launch analytics may also be used to calculate ball trajectory 332 across a course and parametrically scored 315 for the ball's final destination 334 including the distance to the hole 336, landing on or off the green 335a or in the rough 335b or 335c, landing in a water or sand trap 335d, etc.

Performance evaluation can be used on a real golf course. Alternatively, the evaluation method can be applied to a golf simulator, where the athlete practices by hitting the ball into a net and but the system evaluates the tee-off performance as if the athlete was on a real golf course. In this manner, a golfer can practice by following the actions of a professional or expert depicted by the MS model but evaluate their performance against the course or against other golfers using the simulator.

Figure 33:
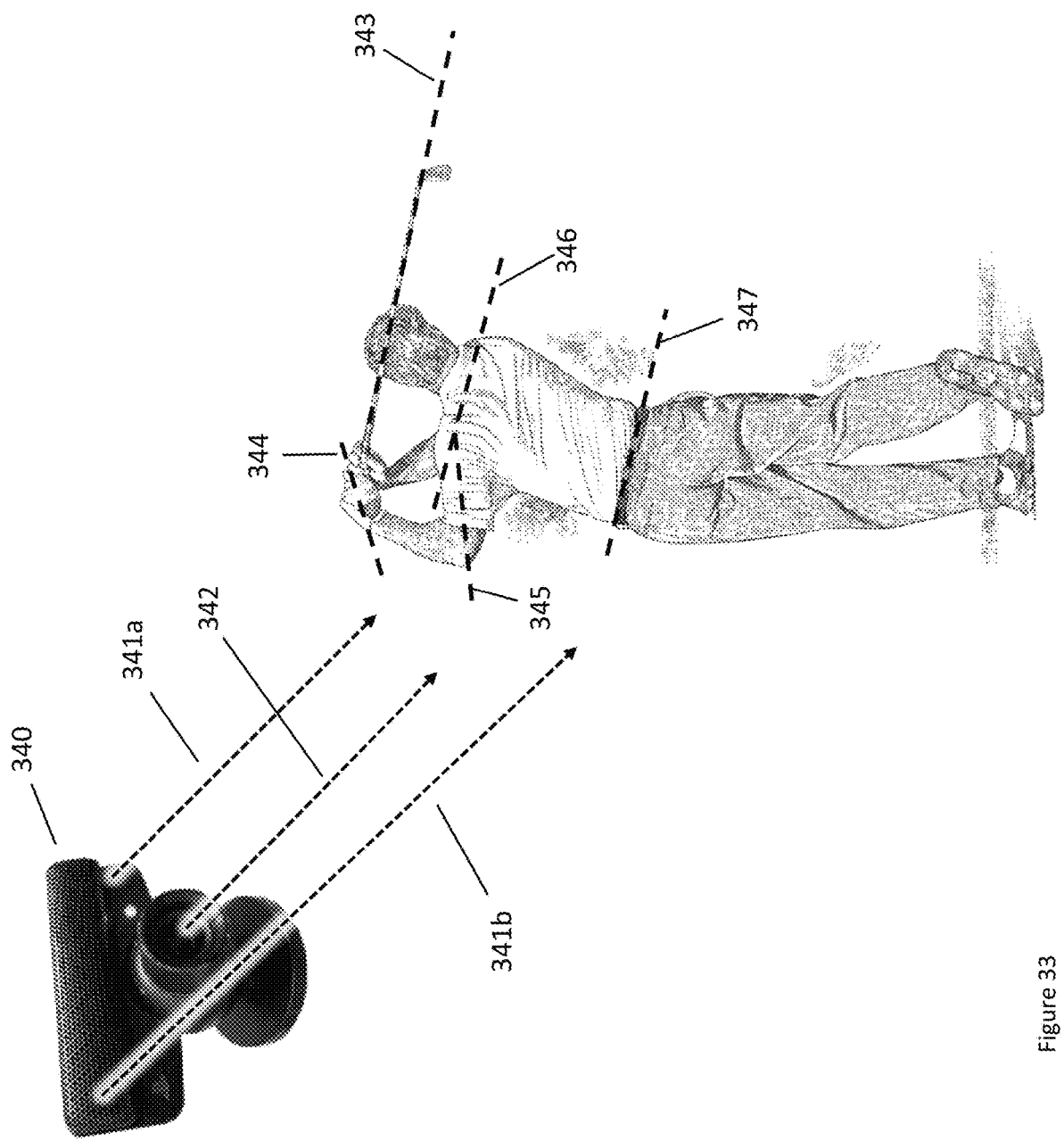
FIG. 33: Combined video and ultrasonic launch sensor data capture.
Figure 34:
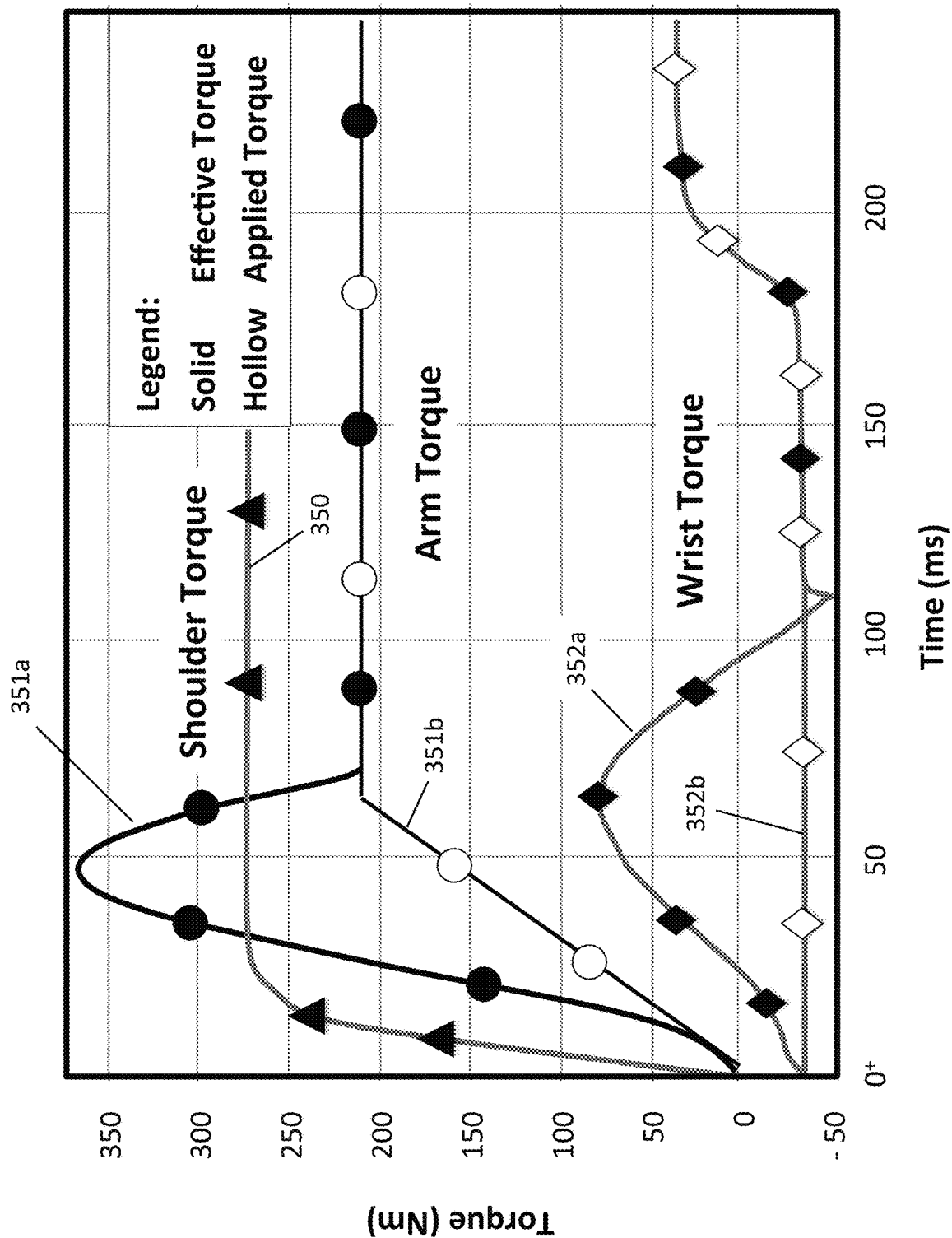
FIG. 34: Torque data extraction from video and ultrasonic launch sensor data.

Although a smartphone or video camera combined with artificial intelligence can be used to evaluate an athlete's performance, other sensors may also be used in combination with the disclosed psychomotor learning system. For example, launch sensor 340 shown in FIG. 33 combines video image 342 with differential ultrasound or LIDAR (laser light-based radar) signals 341a and 341b to more precisely measure a golfer's swing than video alone can extract. Processed by AI-engine 310, the launch sensor 340 data can be used to precisely detect hand-angle 344 and club position 343, shoulder position 346, arm position 345, and waist angle 347. By analyzing a sequence of frames over time, positional data can be used to calculation swing speed and torque, including effective and applied arm torque 351a and 351b, effective and applied wrist torque 352a and 352b, and shoulder torque 350 as depicted in FIG. 34.

Figure 35:
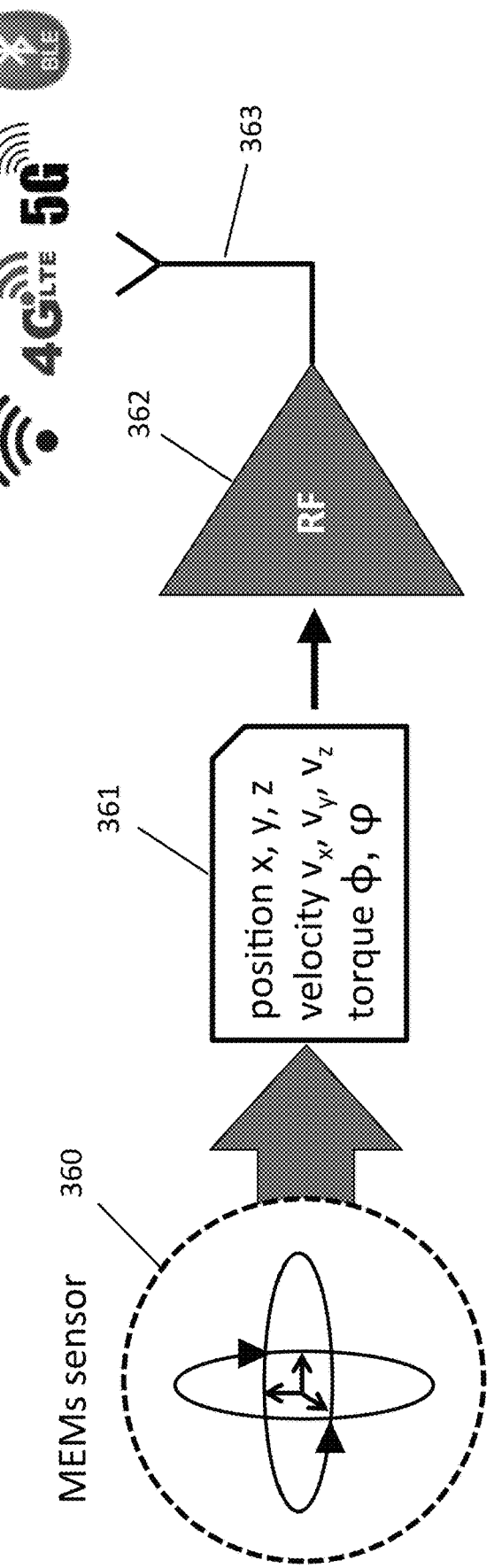
FIG. 35: MEMs sensor position, velocity, and torque data extraction.
Figure 36:
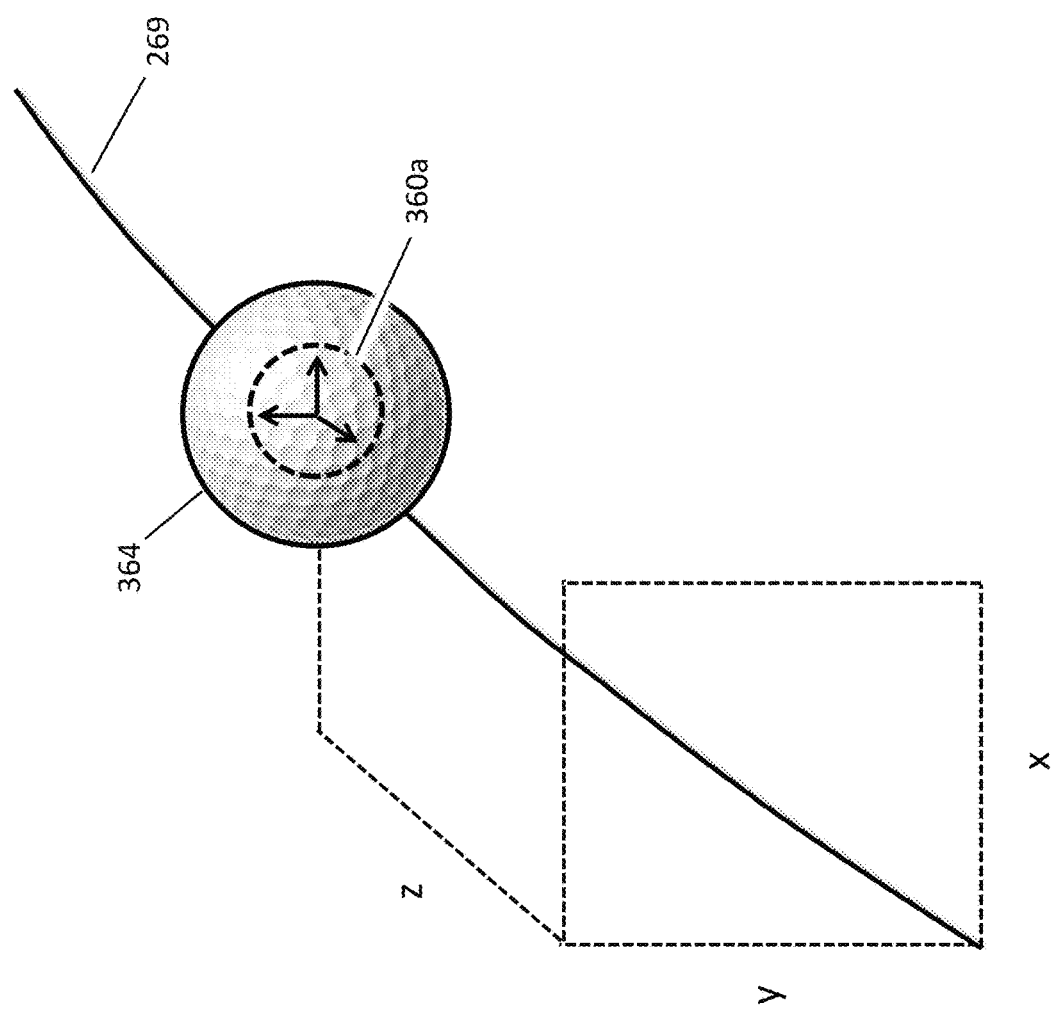
FIG. 36: Golf ball drive position and velocity MEMs sensor data.

Torque, acceleration, and positional data optically measured by camera, while conveniently monitored, lacks accuracy. Additional accuracy can be gained by including microelectronic machine (MEMs) sensors in balls, clubs, and other equipment. As shown in FIG. 35 MEMs sensor 360 is able to measure a number of parameters 361 including position, velocity, acceleration, and torque versus time. The sensor relays its data to a receiver via a low power RF link 362 and internal antenna 363 using low power Bluetooth, low power WiFi (such as 802.11ah), or telephonically using 4G/LTE or low bandwidth power-saving modes of the 5G communication protocol. In FIG. 36, down-range flight trajectory 269 of golf ball 364 can be detected using MEMs sensor data 360a including signal delay, air pressure, etc., and relayed back to a receiver using RF communication. Since golf ball 364 has a dimpled but otherwise uniform surface (spherical symmetry), torque information is not important in predicting a ball's trajectory. As such, sensor 360a need only detect relative position and acceleration for not rotational velocities.

Figure 37A:
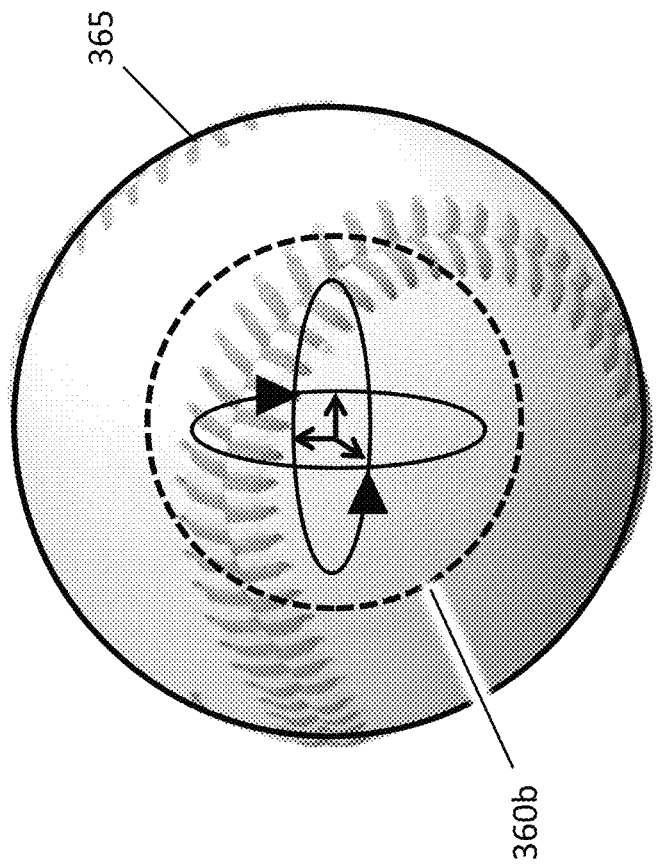
FIG. 37A: Ball sensor data acquisition.
Figure 37A:
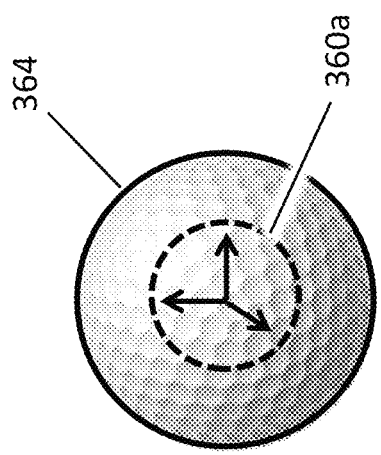
Figure 37B:
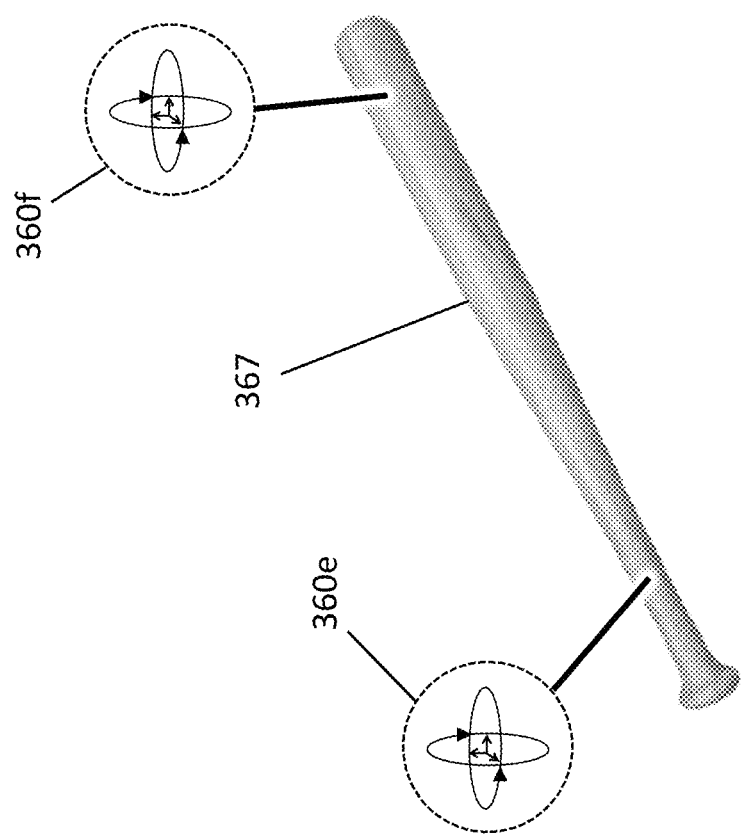
FIG. 37B: Club sensor data acquisition.
Figure 37B:
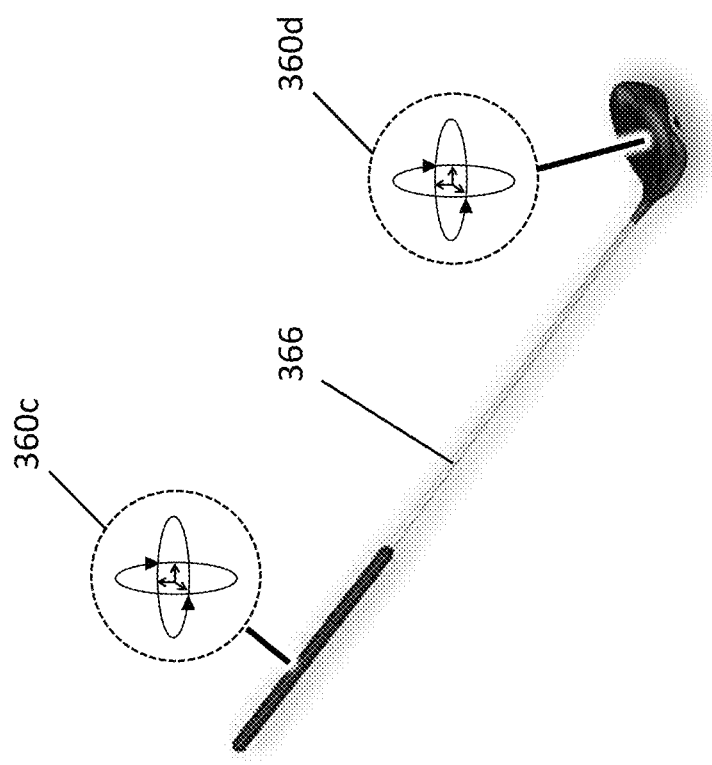

As shown in FIG. 37A, baseball 365, however, is not spherically symmetrical because of its stitching. Baseball sensor 360b must measure torque in order to predict ball trajectory. This information is difficult to measure using a camera. As shown in FIG. 37B, sensors 360c and 360d in golf club 366 and sensors 360e and 360f in baseball bat 367 must detect torque to precisely describe a ball's trajectory.

Figure 38A:
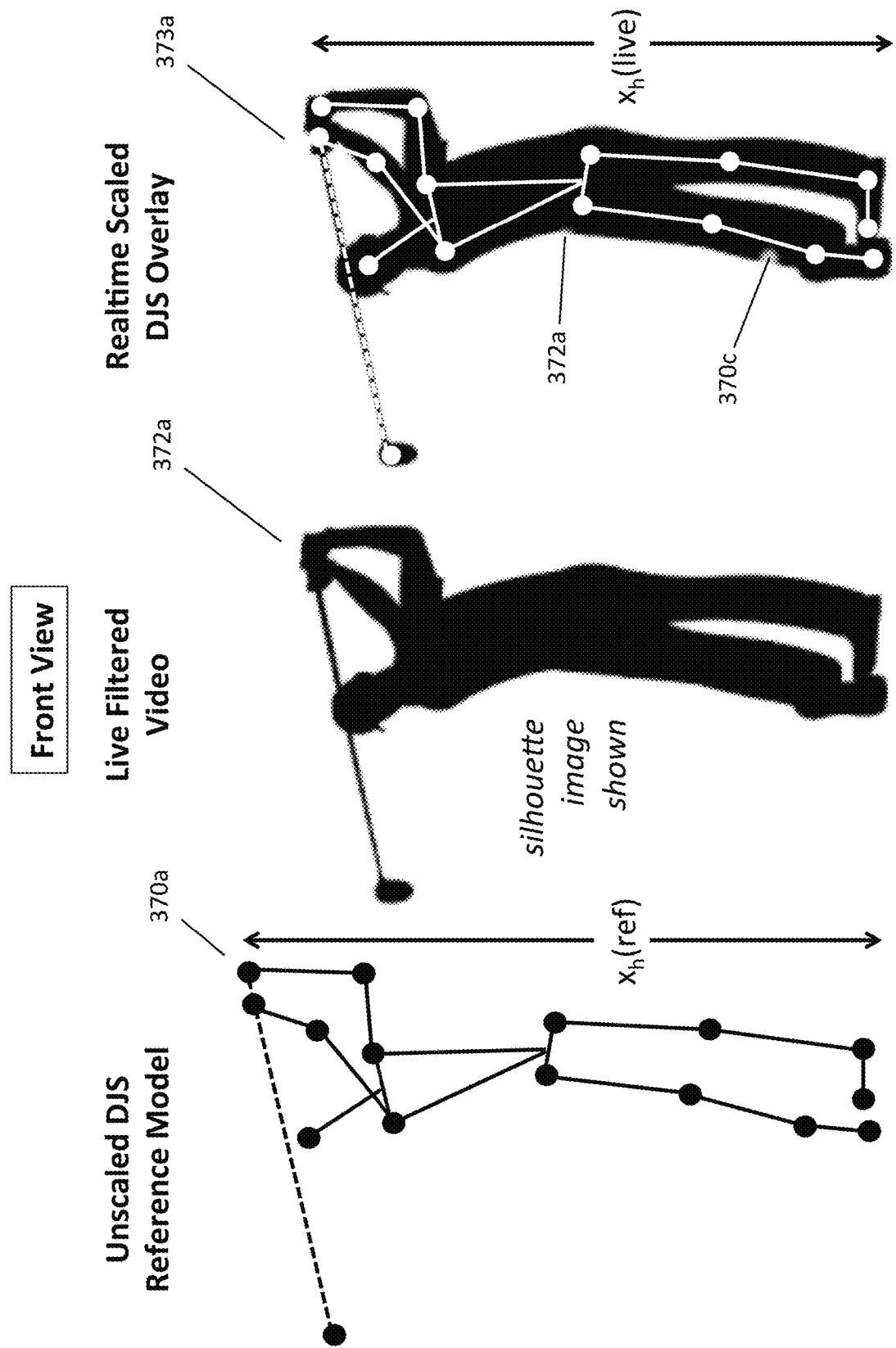
FIG. 38A: Graphical components of realtime DJS overlays (front view).

As described, the AI-based system exhibits augmented cognition whereby the behavior of the golfer is trained to match the expert's performance while the AI-engine learns best how to gradually improve the golfer's performance. In the described system, the golfer can compare their actions to an expert reference using a real-time DJS overlay. As shown in FIG. 38A a front side view combines DJS reference model 370a with live filtered video 372a, e.g. a silhouette image, to produce realtime DJS overlay 373a.

The process of scaling the DJS model to the live athlete or student allows the unscaled original DJS model 370a, having a height $x_h$(ref) to be scaled in size to fit the height $x_h$(live) of the live athlete image 372a. The resulting composite image, i.e. overlay 373a, thereby comprises a representative image of the live athlete 372a at full size and a scaled version of the DJS reference model 370c both consistent with the height $x_h$(live) of the live athlete image 372a. Using artificial intelligence this scaling can be performed once at the onset of the live session or can be performed dynamically and repetitively to gradually improve the accuracy and fit of the model during each practice session.

Figure 38B:
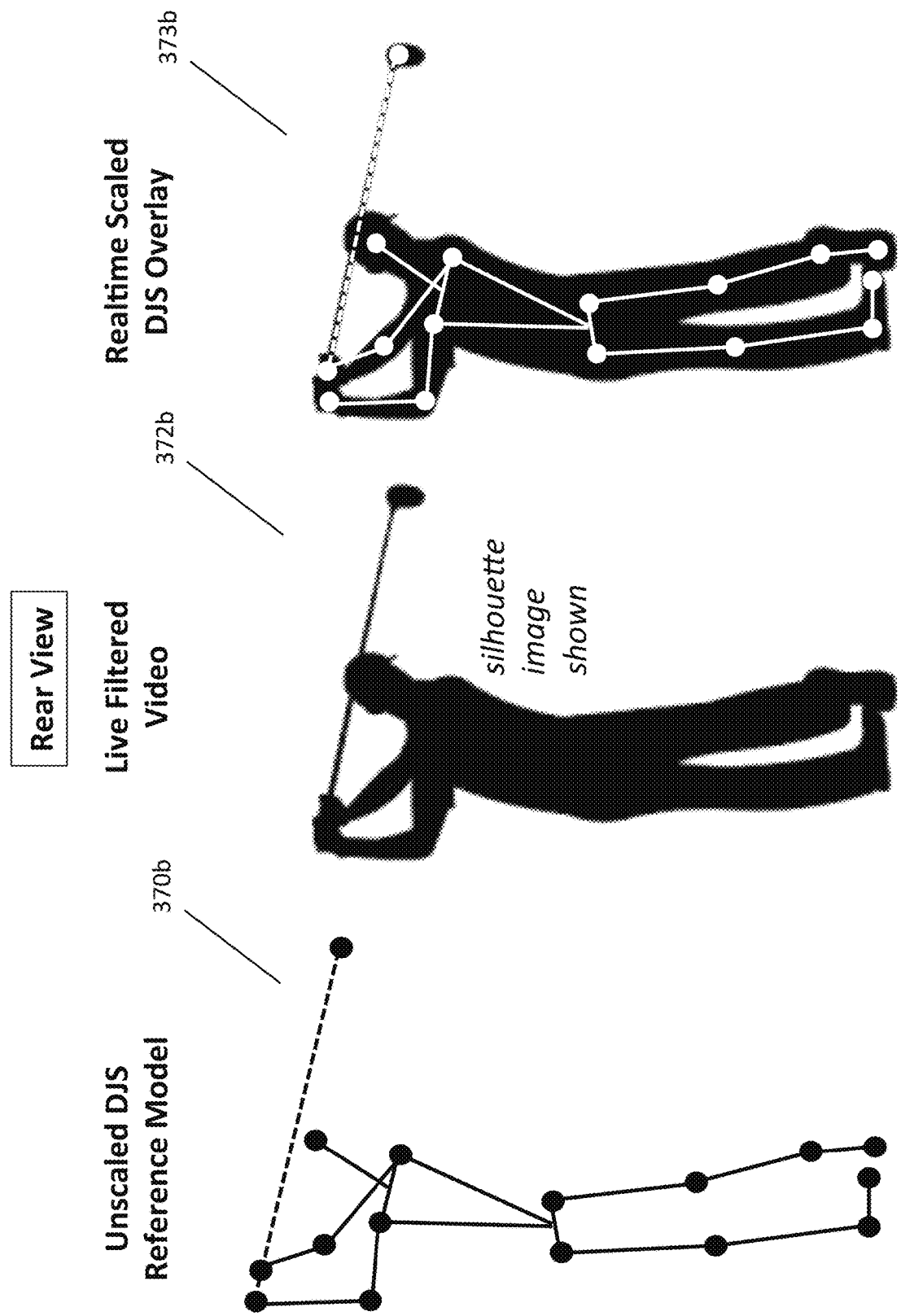
FIG. 38B: Graphical components of realtime DJS overlays (rear view).

Even without a rear-view camera, the AI system can also calculate and display the rearview image of the golfer in real time as depicted in FIG. 38B, combining a 180° rotation of DJS reference image 370b with a rotated image 372b, to produce real-time DJS overlay 373b. As such a DJS model can easily be rotated to match any image perspective of a live video feed, where video images cannot.

Figure 38C:
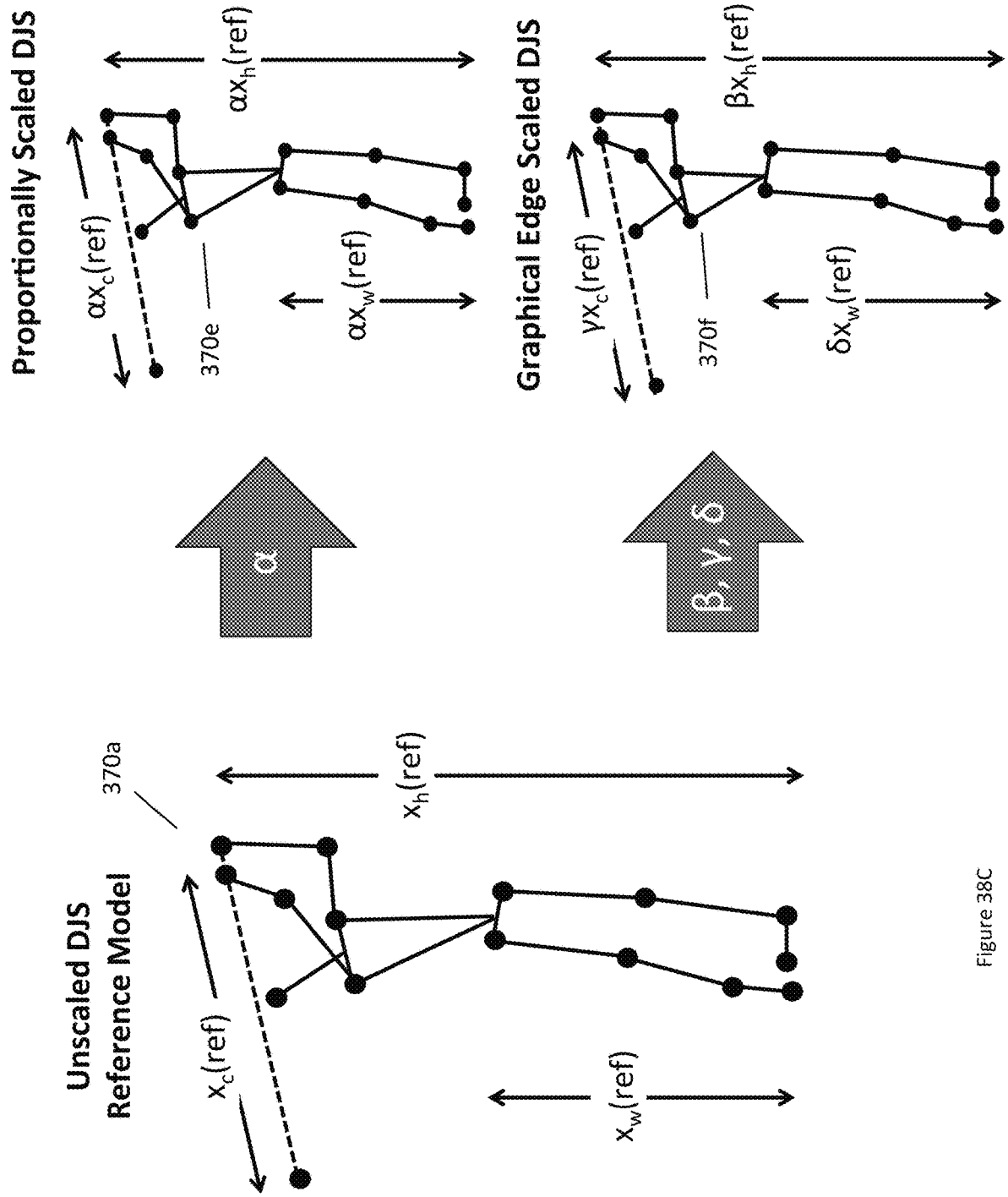
FIG. 38C: Scaling graphical components of DJS model to different sizes using proportional and graphical edge methods.

Aside from its advantage in image rotation, an AI-based graphics processor can execute scaling of a DJS model to match a live image or video feed of a student athlete in several ways. As shown in FIG. 38C, the unscaled DJS model 370a can be scaled proportionally or piecemeal using graphical edges, the segments between skeletal vertices. In proportional scaling all the DJS model elements including the arms, legs, and torso are scaled by a the same proportionality factor $\alpha$ whereby the height $x_w$(ref) of the model's waist from the ground is scaled to a value $\alpha x_w$(ref) and the total height is scaled from a value $x_h$(ref) to $\alpha x_h$(ref). The golf club length $x_c$(ref) may also be scaled proportionally or alternatively be scaled to match the actual length of the club as specified by the manufacturing data sheet.

In a graphical edge scaled DJS model, every edge in the model is scaled separately to match the video frame of the live athlete, whereby the height $x_w$(ref) of the model's waist from the ground is scaled to a value $\delta x_w$(ref) and the total height is scaled from a value $x_h$(ref) to $\beta x_h$(ref) including separate scaling factors for the upper and lower legs, the torso, and the upper and lower arms. Even the golf club can be scaled separately from $x_c$(ref) to $\gamma x_c$(ref).

Although filtered video images 372a and 372b are conveniently displayed as silhouettes, shadow or glow, the filtered image can also comprise an outline, a low-resolution video, or an animated depiction of the golfer. Key advantages of this approach compared to any available training aid today include

- The DJS reference model is scaled in size to the golfer or athletic trainee. Reference videos cannot easily be scaled especially when the source data comes from video archives, some videos dating back several decades ago.
- The DJS reference model can be rotated to match the camera angle of the live image of the golfer or athletic trainee.
- The DJS model is overlaid atop the live image of the golfer or athletic trainee so the athlete doesn't have to compare two side-by-side images, which requires the eyes to pan back and forth between the two images thereby distracting the athlete.
- The DJS model skeleton eliminates unnecessary detail of the reference image of the expert athlete (such as hair, hats, clothes, etc.), which can clutter the overlay and obscure details of movement.
- The video representation eliminates unnecessary detail of the live athlete (such as hair, hats, clothes, etc.), which can clutter the video and obscure details of movement.

Figure 39:
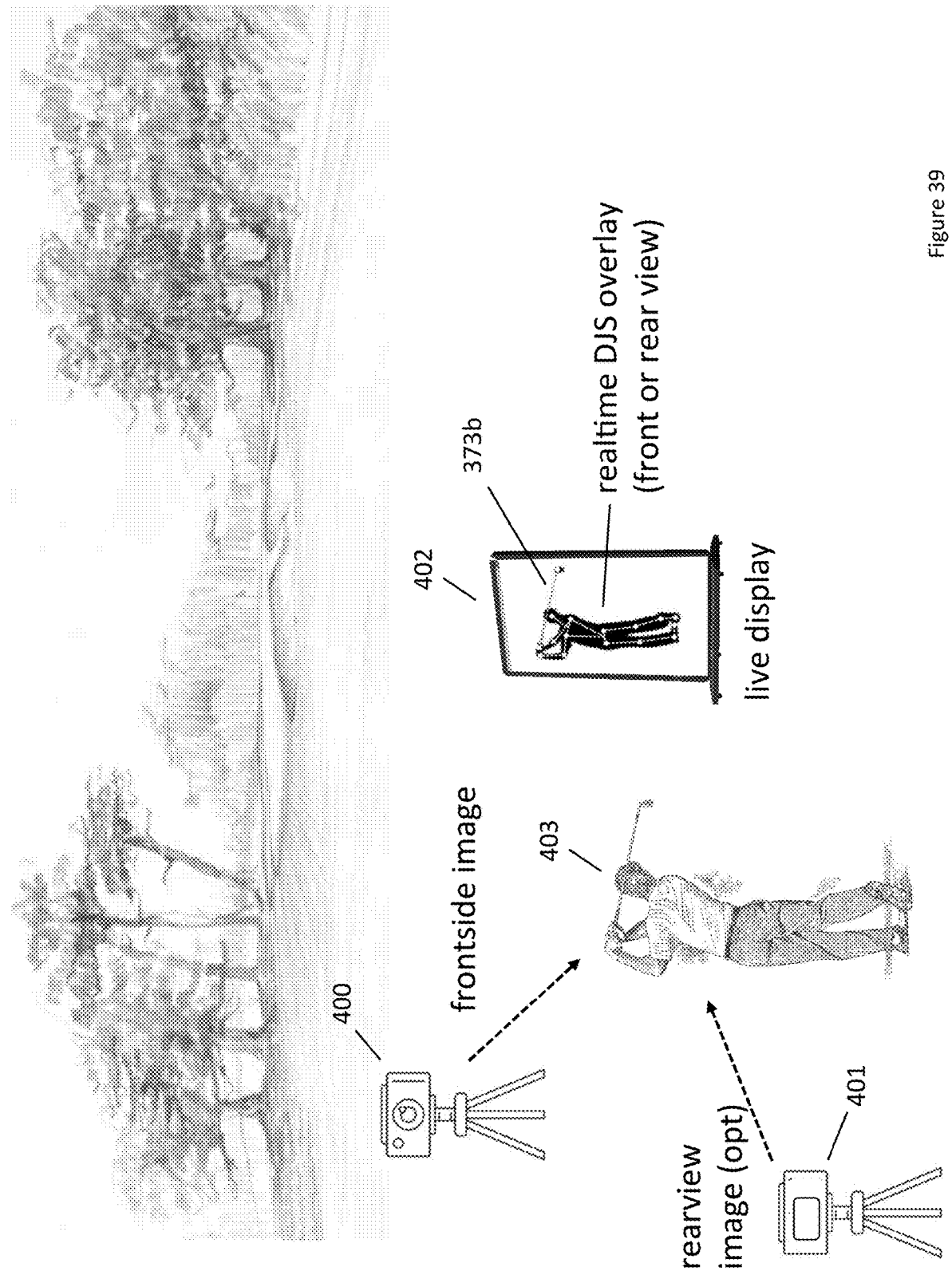
FIG. 39: Image capture and DJS screen display on golf course.

In one embodiment shown in FIG. 39, display of the overlay image 373b can be conveniently realized using a standing video display 402. The live video of golfer 403 used to create the overlay can be captured using a frontside camera 400 but may optionally include a rearview camera.

Figure 40:
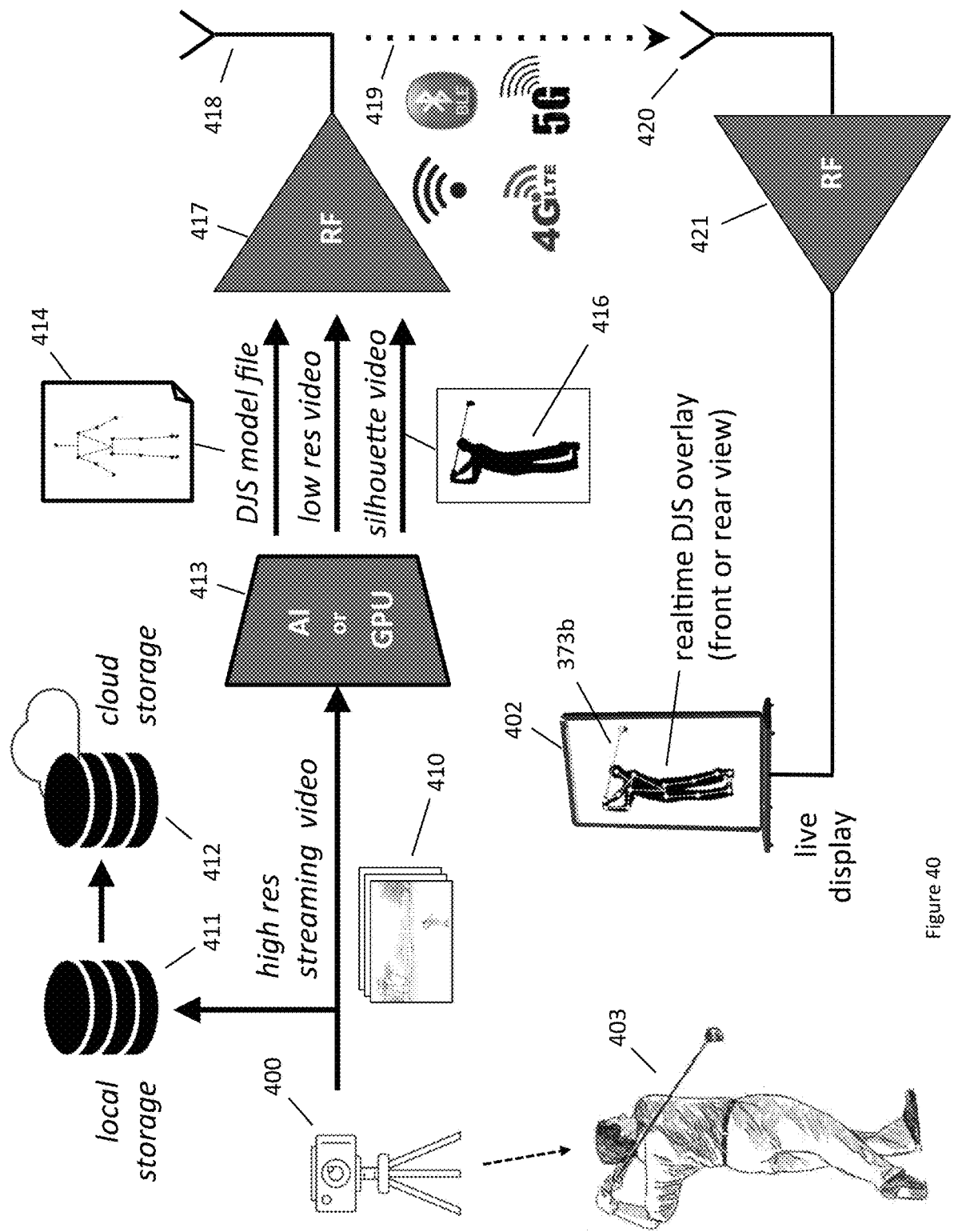
FIG. 40: AI-based separation of high-resolution video into DJS model, low-resolution video, and silhouette video.

As shown in FIG. 40, overcoming bandwidth limitations of real-time communication, high-resolution video 410 from camera 400 can be recorded and stored locally in non-volatile memory 411 while AI-engine 413 filters the data stream to produce either/or (i) low-resolution video and (ii) silhouette video 416 for limited-bandwidth transmission 419 between RF-amplifier 417 ad RF receiver 421 via antennas 418 and 420 respectively. AI-engine 413 also can create a real-time DJS overlay video 373b based on DJS model 414. Display 402 therefore can be used to display any combination of the video sources.

Figure 41:
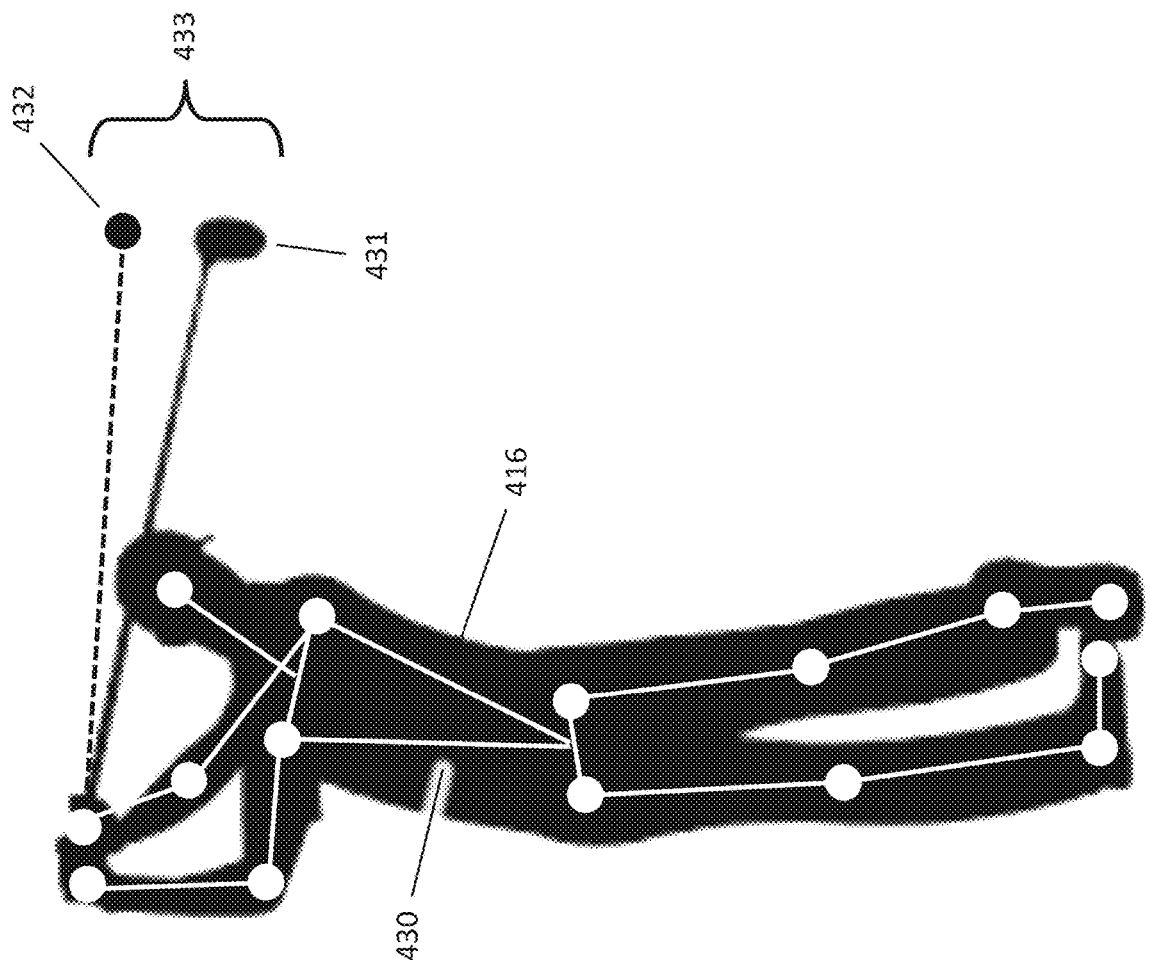
FIG. 41: Overlay comparison of silhouette video to expert DJS model.

In particular the DJS overlay of a live golfer's silhouette 416 and a skeletal model 430 of a reference or expert shown in FIG. 41 allows an athlete to immediately see what they are doing wrong and how their motion differs from a master athlete, e.g. the difference 433 between the student's club position 431 and the expert's club 432 positioning. The value of contemporaneous feedback is that the student or trainee can improve their swing or stroke with each attempt. Unlike a looping video, the expert only swings when the student swings their club. The movement is natural, where the expert's swing pauses at the top at $t=0^-$ and doesn't resume till it is triggered by the beginning of the student's downswing at $t=0^+$. At the beginning of training, the AI-engine accommodates the student's slow pace, learning what is comfortable to the student. Gradually however, the AI-engine incrementally accelerates the pace until the student is matching the expert's timing and performance till the skill is learned.

Figure 42:
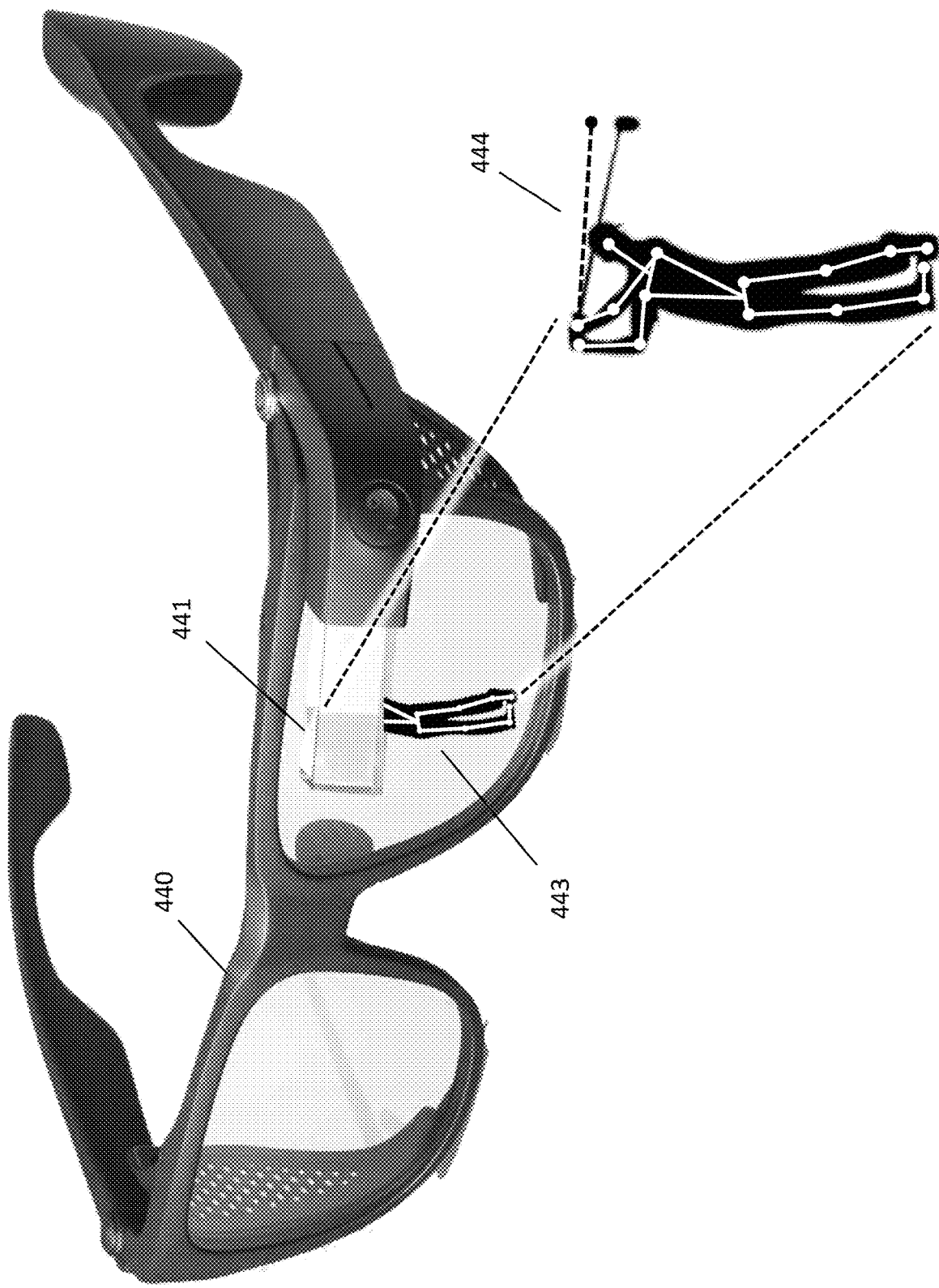
FIG. 42: DJS overlay image projected onto heads-up display glasses.

As shown in FIG. 42, the DJS overlay image 444 can be displayed 443 in a heads-up display 440 using a projector 441 or other heads up or holographic display techniques.

The benefit of contemporaneous feedback in psychomotor learning using augmented cognition is applicable to a wide range of activities including sports such as diving, skating, skiing, golf, tennis, basketball, hockey, weight lifting, archery, and baseball, as well as precision professional skills such as automotive repair, surgery, sign language, and defense related activities such as marksmanship, marshal arts, etc.

The invention claimed is:

1. A method for teaching a psychomotor skill to a student athlete, the method comprising:
   generating a dynamic jointed skeleton (DJS) reference image of an expert performing the psychomotor skill;
   after the DJS reference image has been generated, using a camera to generate a silhouette image of the student athlete performing the psychomotor skill; and
   as the student athlete is performing the psychomotor skill and the silhouette image thereof is being generated, displaying to the student athlete a composite image, the composite image comprising the DJS reference image of the expert performing the psychomotor skill overlain onto and enclosed within the silhouette image of the student athlete performing the psychomotor skill, thereby allowing the student athlete to make a contemporaneous real-time visual comparison of the student athlete's positions and movements with those of the expert as recorded in the DJS reference image.

2. The method of claim 1 wherein generating the DJS reference image comprises scaling a DJS of the expert proportionally to the height of the student athlete.

3. The method of claim 1 wherein generating the DJS reference image comprises scaling a DJS of the expert such that each graph edge representing a body part of the expert is adjusted to match the dimension of a corresponding body part of the student athlete.

4. The method of claim 3 wherein the psychomotor skill comprises swinging a golf club and wherein the student athlete adjusts acceleration of the golf club during the swing to produce the same ball launch velocity and angle as the ball launch velocity and angle shown in the DJS reference image.

5. The method of claim 1 wherein the composite image comprises a silhouette image of the student athlete overlaid by a DJS reference image of contrasting color.

6. The method of claim 5 where the composite image comprises a graphical image representation of a golf course superimposed on the student athlete's silhouette image and the DJS reference image.

7. The method of claim 1 comprising pausing the DJS reference image until a trigger event occurs.

8. The method of claim 7 wherein the psychomotor skill is swinging a golf club and the trigger event is commencement of a backswing.

9. The method of claim 7 wherein the psychomotor skill is swinging a golf club and the trigger event is commencement of a downswing.

10. The method of claim 7 wherein the trigger event is derived from the silhouette image of the student athlete performing the psychomotor skill.

11. The method of claim 1 wherein the psychomotor skill involves the use of equipment and wherein information concerning the equipment is used in generating the DJS reference image.

12. The method of claim 1 comprising evaluating the performance of the student athlete against a specified list of criteria.

13. The method of claim 12 comprising using a performance rating of the student athlete in gaming to determine rank or meritorious awards.

14. The method of claim 1 comprising transmitting the composite image to a visual display viewable by the student athlete in real time as the student athlete is performing the psychomotor skill.

15. The method of claim 1 wherein the psychomotor skill comprises swinging a golf club.

16. The method of claim 14 wherein the visual display comprises a heads-up display or augmented reality glasses.

17. The method of claim 14 wherein the visual display comprises a TV or monitor.

18. The method of claim 1 comprising retaining the silhouette image of the student athlete performing the psychomotor skill for later retrieval and analysis.

19. A method for teaching a psychomotor skill to a student athlete, the method comprising:
  generating a dynamic jointed skeleton (DJS) model of an expert performing the psychomotor skill, the DJS model consisting of vertices connected by edges, the vertices representing the joints of the expert, the edges representing the bones of the expert;
  generating a silhouette image of the student athlete performing the psychomotor skill;
  generating a DJS overlay, the DJS overlay comprising of the DJS model of the expert performing the psychomotor skill overlaid onto the silhouette image of the student athlete performing the psychomotor skill, the DJS model of the expert being enclosed entirely within the silhouette image of the student athlete in the DJS overlay; and
  displaying the DJS overlay to the student athlete as the student athlete is performing the psychomotor skill, thereby allowing the student athlete to make a contemporaneous real-time visual comparison of the student athlete's positions and movements with those of the expert as recorded in the DJS model.

20. The method of claim 19 wherein the DJS model comprises edges representing the upper arm bones, forearm bones, upper leg bones and lower leg bones, respectively, of the expert.

21. The method of claim 20 wherein the DJS model comprises vertices representing the shoulder joints, elbows, knees and ankles, respectively, of the expert.

* * * * *